US010082862B2

(12) United States Patent
Hawkins

(10) Patent No.: US 10,082,862 B2
(45) Date of Patent: Sep. 25, 2018

(54) INPUT CUEING EMMERSION SYSTEM AND METHOD

(71) Applicant: Robert W. Hawkins, Redmond, WA (US)

(72) Inventor: Robert W. Hawkins, Redmond, WA (US)

(73) Assignee: Hawkvision Emmersion Computing LLC, Grandby, CT (US)

( * ) Notice: Subject to any disclaimer, the term of this patent is extended or adjusted under 35 U.S.C. 154(b) by 0 days.

(21) Appl. No.: 14/312,484

(22) Filed: Jun. 23, 2014

(65) Prior Publication Data

US 2015/0160724 A1  Jun. 11, 2015

Related U.S. Application Data

(62) Division of application No. 12/786,324, filed on May 24, 2010, now Pat. No. 8,760,391.

(60) Provisional application No. 61/180,753, filed on May 22, 2009.

(51) Int. Cl.
G06F 3/01 (2006.01)

(52) U.S. Cl.
CPC .................... G06F 3/011 (2013.01)

(58) Field of Classification Search
CPC ............... G06F 3/011; G06F 3/0425
USPC ............ 178/18.01–19.07; 345/156–178
See application file for complete search history.

(56) References Cited

U.S. PATENT DOCUMENTS

2010/0214226 A1* 8/2010 Brown et al. ............ 345/168

* cited by examiner

Primary Examiner — Michael Pervan
(74) Attorney, Agent, or Firm — Sheppard Mullin Richter & Hampton LLP

(57) ABSTRACT

An input cueing system and method that allows a user to manually draw an image, input text, interface and gesture on an input surface, which is then brought into a computer such that the visual output from the computer is combined in an overlapping manner with the visual imagery of the user's hands, and then shown on a display. Located above the drawing surface is an image capturing device that captures live video images of the user's hands or other objects placed on the drawing surface. One or more reflectors and/or image repeating devices are disposed between the input surface and the image capturing device to effectively reduce the height and/or focal length so that the visual image is properly aligned and oriented to provide a real 'live' view of the users hands and/or action on the display. A combiner module combine the visual action on and/or about the input surface with the visual output from a computer or computing device, so that the resulting combined visual imagery may be simultaneously transmitted and on a display, with the users hands, fingers and/or tools shown in a semi-transparent and/or opaque manner.

4 Claims, 60 Drawing Sheets

INPUT CUEING EMMERSION PAINTING METHODS

DOTTED LINES SHOW AREA CAPTURED AND VIEWED ON MONITOR

**HAND HELD VERSION 2
(ONE MIRROR)**

FIG.33 JAPENESE KEYBOARD

FIG. 34 FRENCH KEYBOARD

INPUT CUEING EMMERSION SYSTEM AND METHOD

RELATED APPLICATION

This application is a divisional patent application and claims the benefit of U.S. Utility Patent Application (application Ser. No. 12/786,324), filed May 24, 2010 and claims the benefit of U.S. Provisional Patent Application (Application No. 61/180,753 filed May 22, 2009.

FIELD OF THE INVENTION

The present invention is related to drawing tables and text entering devices, and more particularly to such tables and devices coupled to a computer or data processing device that enables the drawing and/or text to be transmitted and viewed in combination with the input action on the computer's display monitor.

DESCRIPTION OF THE RELATED ART

Humankind has always relied on their hands. The dexterity of the fingers, in close sync with their cerebral intensive vision, has given them the ability to make an arrowhead, form pottery and hone the polishing touches on the "Michelangelo." This is the way a human being naturally wants to use a computer: seeing your hands, working with a tool, to do work.

Many artists prefer to make drawings with a pen or pencil while sitting at a drawing table or board. While some portions of the drawing may be done free-handed, other parts of the drawing may be competed using a T-square, various angle guides, various French curves, a ruler, a compass, and various circular and elliptical templates. For some artists, preparing drawings on paper located directly in front of them is easier and more rewarding than preparing a drawing on a computer display.

There are millions of individuals who like to draw as a hobby. Most skilled artists spend thousands of hours practicing their drawing skills using pencils, pens, brushes on paper located on a drawing surface located in front of them. When drawing, the viewing perspective of the artist of the drawing and the location of the artist's hands, fingers and the drawing implements all have important roles in the drawing experience and the overall quality of the drawings.

Many artists are not interested in learning a software drawing program that allows them to create electronic drawings on a computer Not only are such programs sometimes difficult to master, but they are can also be relatively expensive, require advance training, and advance computer hardware. Even when these drawbacks are solved, many artists believe that the quality of a drawing generated by a software program is less than the quality of a drawing prepared by the hands.

Portable devices, such as a laptop computer, Slate, Tablet, PDA, or a multiple function cellular telephone are very popular. Because such devices have small keyboards, most user's employ a single finger or thumb on each hand and input letters and numbers via a 'hunt and peck' method. The 'hunt and peck' method normally requires that the user look at the keys on the keyboard.

BRIEF SUMMARY OF EMBODIMENTS OF THE INVENTION

Various embodiments of the present invention provide a hand cueing input system and method that enables input from the user's hand(s), finger(s), tool(s) or other inputting means to an information processing system such as a computer, to be transmitted and viewed immediately on an output display of the computer such as but not limited to a computer display monitor or visual display unit referred to as a display, with the input being matched and or combined with the output of the computer to enable a real time, intuitive and meaningful cueing to the user from the display for a more process efficient, time improved, more ergonomically correct and overall more enjoyable experience on the computer.

According to some embodiments of the invention, an input cueing emmersion device is used in combination or not with a computer and output display that allows an operator to input and capture drawings, text, gestures, point clicking and other interaction activities (similar to the functions of a normal touch screen). Visual images of pictures, drawings, text, or other graphic media can be easily inputted, viewed and or changed, and stored into an information processing system such as a computer, and/or the input cueing emmersion device itself.

According to some embodiments of the invention, a hand input system is provided, e.g., for portable devices, that enables users to view a their hand(s), finger(s) tool(s) or other inputting means, active or passive, either on the device itself or in combination with a computer to simultaneously watch the relative positions of the their hand(s), finger(s) tool(s) or other inputting means (hereinafter, "hands") on an input surface while the image is created on the display.

The anatomical, physiological and biomechanical study of the human species' interaction of and as part of a system and the importance of proper ergonomics as a requirement to the reduction of injury and aid in overall performance, is a well documented subject matter most notably discussed in publications such as but not limited to Military MIL-STD-1472, MIL-STD-2525B, NASA ANSI-HFS-100-1988 Department of Energy FEOSCH, OSHA.

Further embodiments provide an input cueing emmersion system that operates within these preferred guidelines enabling the drawing artist(s), computer operator(s) and other user(s) to manually draw artwork, type text, press/click objects, fields, icons and/or otherwise targets, on a relatively flat, more horizontal drawing, keyboard, and or input surface in front of them, being ergonomically correct at elbow height with their forearm at an ergonomically correct 90 degree angle to their upper arm with their wrist and hands in a more ergonomically proper relaxed straight position with their eyes looking forward in a more ergonomically correct perpendicular fashion to the drawing surface.

Further embodiments provide an input cueing emmersion system that operates within the preferred guidelines discussed in the publications that show a peripheral vision location at 100 degrees to 110 degrees below the normal forward horizontal gaze enabling meaningful "subtle cueing such as but not limited to typed keys visually indicating being struck correctly or not by the users hands.

Additional embodiments provide a hand cueing input system for a computer (or any type of data processing device, machine, etc.) that enables a user to manually or automatically input data onto an input surface coupled to the computer and allows the user to simultaneously observe the position of his hands (and/or fingers, writing implement, drawing implement, or other objects/tools on/in/about/above the input and/or surface) combined with an image created on a display by an operating system (and/or turnkey firmware, drawing software program, text word processing field, spreadsheet, database, Web browser etc.) loaded into the working memory of the computer.

Additional embodiments provide a hand cueing input system for a computer (or any type of data processing device, machine, etc.) that enables a user to manually or automatically input data onto an input surface interacting with but not limited to visual imagery graphics virtual keyboards or keying schema or in combination or not with other physical objects, such as but not limited to, styluses or other pen-shaped instruments, keyboards, texting devices and writing devices coupled physically and/or visually to the computer and allows the user to simultaneously observe the position of his hands on/in/about/above the input and/or surface and/or other physical objects, combined with an image created for the display by a computer. This may be virtual representations from physical objects, or the combination of booth being aligned and/or matched up or not, such as but not limited to, physical styluses, styluses or other pen-shaped instruments, keyboards, texting devices and writing devices "Point-and-click" is a 2-action process where a computer user moves a cursor using a physical object held under one of the user's hands, with one or more buttons, to a target location on a screen (point) and then after arriving at the target, presses a button, (click) which then completes the action.

Point-in-clicking is a faster, more accurate, more precise, more sub-conscious (less cognitive taxing), more of a straight angle "one vector" movement, to the desired target. Press-and-click is a "2-vector" movement that requires first, finding and moving a disembodied pointer in the first vector, on the x/y plane (hands moving horizontally) to a desired target, usually a small discrete region, commonly overshooting the target one or more times, checking and then correcting if necessary until the desired area is satisfactorily reached. Only when this is accomplished, the second vector movement on the z-axis (a button pressing usually in the vertically down direction) is performed.

The increase in performance of a input cueing emmersion system can be observed using the following equation:

$$MMT = a + b \log_2(1 + A/W)$$

wherein MMT is the average mean movement time taken to complete the movement, wherein a is the start/stop time of the device, wherein b is the speed of the device, wherein A is the distance from the starting point to the center of the target, and wherein W is the width of the target measured along the axis of motion.

wherein the final point of the motion falls within ±W/2 of the target's center.

In additional embodiments, a system is provided that enables the user to adjust of the viewable area on the input surface that is shown on the display or non-visual output mechanism.

According to variance embodiments of the invention, the displays set forth herein may be foldable, collapsible and/or portable.

Some embodiments of the invention provide a system that enables an artist's hands to be shown in a semi-transparent or opaque, transposed manner over the image generated by a drawing tablet and shown on a display so that the total image shown on the display simulates the 'look and feel' of the artist looking at their hands while drawing on a piece of paper on a table.

The embodiments of the invention are not based upon keyboard mapping (several keys are "mapped" to represent one particular key so as to allow for misalignment). By contrast, the pixels or display elements are matched very closely with the input X, Y and/or Z input coordinates. This matching or calibration of the display elements to the input X, Y and/or Z input coordinates is maintained through normal use and does not drift noticeably to a user as to be an unpractical annoyance.

According to further embodiments, physical indexes, detents, wells or markers are provided either outside of but not limited to the frame our outer type of border not necessarily associated with the actual input area or not, in order to guide, align or otherwise detect the user's hand, palm, finger or tool to a start or "home position" to facilitate a more accurate locating of the keys of a virtual or physical keyboard, virtual or physical button, input icons, drawings, numbers, text and or data manipulation fields or "variable input operators."

According to additional embodiments, a physical keyboard and a virtual keyboard are provided having matching coordinates so as to be allowed to activate and show the activated key on the screen while the physical finger (and/or tool upon covering the key) is still shown on a display to allow visual cuing that the correct key was pressed, while allowing the tactile feel and nature of striking a physical key. A physical keyboard could be supplied with the device or added on later, so that there could already be a "correctness" or calibration quality inherently built-in due to the physical aligning opening up or otherwise operating position of the keyboard to facilitate the quickness of the start time operation of the keyboard. Another keyboard that may not be already supplied or otherwise "built-in" could be provided through firmware and/or software in the device itself, in combination or not with firmware and or software in the working memory of the computer. This additional keyboard would not necessarily have to be aligned to any particular coordinates. The firmware and or software in the device itself would find and perform this alignment "correctness" and or calibration quality whether automatic or not as in initiated by the user.

In some embodiments, there could be a temporary physical bump, indent, well or otherwise changed condition of the "normal" smoother flatter surface model that adds a "tactile" ability that could help in the indexing, and or feeling a particular centering home of an indented X, Y and/or Z position. With these physical bump(s), indent(s), well(s) or otherwise changed condition(s) of the "normal" smoother surface model being temporary, they can be made to change back to the "normal" smoother surface model that would not exhibit these physical bump(s) indent(s), well(s) and/or otherwise changed condition(s) of the "normal" smoother surface. As such, the surface could be more "flat" and aberration free to be more conducive to drawing by virtue of none of these bump(s), indent(s), well(s) or otherwise physical mars, aberrations or changes to the physical surface to slow, stop, impair and/or reduce or guide incorrectly the intend motion of the hands. In other embodiments, the bumps may be permanently fixed.

Further embodiments provide image type filtering including, but not limited to, chroma key type effects and or analog/digital voltage pass filtering, for various visual purposes including but not limited to educational, artistic and/or entertainment purposes, and/or for improved clarity of image input of hands fingers, tools and or objects due to control over physical input base characteristics.

Additional embodiments provide the ability to have different views of the user area such as, but not limited to, the complete table/desk surface, the input area only, smaller portions of the input area and magnified areas or even a microscope combination or arrangement. Various embodiments provide the ability to have physical buttons, whether temporary or not, but able to be lined up in combination with a virtual of the button. Yet further embodiments provide the ability to have physical shape differentiation such as, but not limited to, concave or convex attributes to distinguish between different characters, symbols state changing inputs and or text input. Such objects may be shaped as one large button so that all of theses shape differentiation keys would have no obvious crevices, spaces, or other non-seamless type featuring as to allow for easy cleaning and for easy sanitizing, sterilizing and general hygienic use. The ability to have 3D type qualities may also be provided.

In some embodiments, an "imaging" may include image transfer or relay mechanisms such as, but not limited to, prisms, fiber optics, CCDs (charge coupled devices), CMOSs (complementary metal oxide semiconductors), mirrors, reflectors, whether in any curved manner or other optical type or "imaging" or image capturing and/or carrier mechanisms and/or transmission systems. Such imaging systems may be electronic in nature or not, and may be adapted to process images using the visible spectrum, ultra violet, infrared, near infrared, far radio waves, x-rays, gamma rays, or other physical transmission such as audio waves, and/or sonar waves. Further embodiments provide the ability to have different views of user area such the complete table/desk surface, the input area only, smaller portions of the input area and magnified areas or even a microscope combination or arrangement.

The "imaging" and/or carrier mechanisms and/or transmission systems (hereinafter, "imaging systems") provide a reduced or more practical configuration and/or aid in a shortening or reduced overall height, length and/or otherwise smaller overall form of the device, removed twice by the imaging systems. Other embodiments may be removed three times, four times, and so on increasing the number of times removed by the "imaging" and or carrier mechanisms and or transmission systems.

Other embodiments provide an audible, physical and/or sensory feedback to allow a user to gain a tactile feel and/or sensory feedback when correctly striking or clicking a key or other input entry. This could be very quick movements of a localized area on the surface such as, but not limited to, vibrations of many possible frequencies such as high peak to peak low time duration such as a "snap" feel and/or longer periods of a lesser peak to peak physical waveform so as to feel like a "buzzing." Different combinations in these frequencies and/or timing could be used in combination to produce "Morse code" type applications and key indexing as in understanding by 'feel" the "accuracy" of striking an intended input button or graphic, icon, and/or key such as in a keyboard whether being a physical or "virtual" keyboard. These vibrations and or snapping may be purely audible, physical, in combination and/or with or other stimuli, Some embodiments may feature deforming materials such as, but not limited to, urethane, non-vulcanized natural rubbers, synthetic rubbers, copolymers, semi-transparent, transparent or opaque, or more "hard style" designs such as a guided solid as in, but not limited to, piston styles and or hinging configurations, etc. Physical energy to drive changes in the surface can be supplied by hydraulics, pneumatics, solid force, electromechanics and/or being of a solid state nature. Heat, sound, vibration and/or snap feel or other sensing stimuli as well can be used in conjunction with and coordinated visually on the display(s) by some noticeable visual indication whether graphically localized to the action area or more generally on the entire screen or any combination in between can be orchestrated.

Some embodiments may be used for controlling and/or operating and/or viewing indicators, buttons, or any input and/or outputs etc., of any type of vehicle whether on land sea air or space. Another application involves controlling and/or operating any kind of machinery.

Further embodiments involve drawing on a preferably planar surface and capturing the view of the user's hands in combination or not with an artifact, visual marking and/or drawing made with, e.g., pencil, ink, paint, or other media on or about the input area, and still viewed on the display.

Input technologies and/or other input mechanisms such as resistive, surface acoustic wave, capacitive, surface capacitance, projected capacitance, mutual capacitance, self capacitance, strain gauge, optical imaging, dispersive signal technology, acoustic pulse recognition, and/or Coded LCD in combination or not with a computer and/or the input cueing emmersion system itself, having software, firmware and/or operating system software or otherwise program etc., to understand and/or recognize and interact with either the drawing, pieces of the drawing, etc., and/or gestures by the user's hands.

In various embodiments, different surfaces could be allowed to come either as the original unit or be inserted or attached to provide a modular type of changeability at a later time. The different surfaces allow for different types of "feel," "resistance," or otherwise interaction for a interesting, pleasing or otherwise more preferred type of "feel" for drawing, sketching and/or other point clicking activities and/or interaction Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
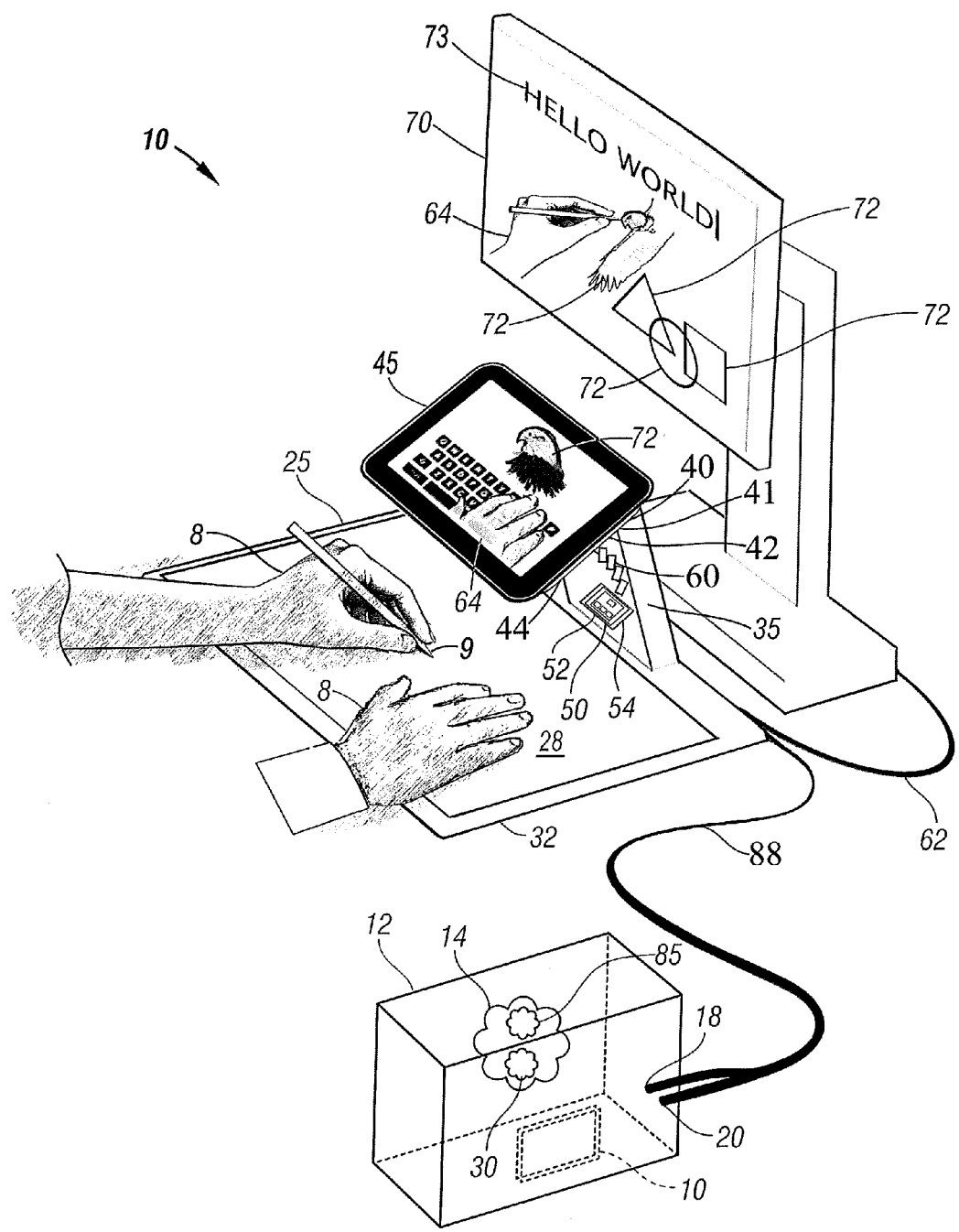
FIG. 1 is a perspective view of a hand cueing input system used with a desktop computer and monitor.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a hand cueing input system and method that enables drawings and/or text to be transmitted and viewed immediately on a computer display monitor. As such, a simple, drawing system is provided that allows a drawing hobbyist to produce drawings that can be easily inputted, viewed and or changed and if necessary, stored into a computer. The hand cueing input system disclosed herein allows a user to simultaneously watch his hand or hands and/or fingers, writing implement, drawing implement, or other objects/tools (hereinafter, "hands") on/in/about/above an X, Y and/or Z input and/or input surface combined with an image created on a display by an operating system (and/or turnkey firmware, drawing software program, text word processing field, spreadsheet, database, Web browser etc.) loaded into the working memory of the computer (or CPU, microprocessor, field programmable gate array, other type of processor, or other type of data processing device) or machine (e.g., laptop, Slate, Tablet, Palm top, PDA, etc.) coupled to the input surface (hereinafter, "computer").

According to various embodiments of the invention, the input surface may comprise a digitalized drawing tablet, touch pad, or X, Y and/or Z surface detection device of any variety (e.g., capacitive, infrared, ultra violet light, visible light, strain gauge etc., multi touch, etc.). To enable drawing, the input is coupled to a computer or any other type of data processing device or machine etc., with a drawing program loaded into its working memory. During use, a drawing is created on the input that (via the software program) immediately produces a drawing shown on a display. Located above the input surface is at least one video camera (or image capturing device of any technology) that captures a live video image of the user's hands and other objects or tools positioned in the field of view on the input surface. A primary mirror and a secondary mirror or other video or optical transferring means are located between the input surface and the video camera to effectively reduce the height or focal length so that the video image is properly aligned and oriented. This proper orientation and alignment provides a real 'live' distance with either a non-perspective direct overview, or a perspective view of the drawing on the display as it is being generated.

In one embodiment, the X, Y and/or Z input is a structure designed to connect to a separate display and a separate computer with a CPU or microprocessor (or any other type of data processing device or machine having a working memory. In a second embodiment, the input is configured as a stand alone portable device, embodied within or replacing a laptop computer. The portable device may comprise a Slate, Tablet, or smaller Palm top or PDA, and includes its own CPU, CPU component, microprocessor, field programmable gate array or any other type of processor or processors. In addition, the portable device may include a working memory and/or any other type of data processing device, machine, etc., as well as a built-in display or displays and/or non-visual output mechanism (hereinafter, "display"). This portable embodiment could fold and/or close in any manner or contrivance to become smaller, more portable, and/or easier to hold, so the overall "carrying footprint" would be reduced. In either embodiments, an operating system, turnkey firmware, drawing software program, text word processing field, spreadsheet, database, Web browser and/or video capture/display program are loaded into the working memory of the computer In some embodiments, the system includes a combiner module designed to combine the outputs from the external computer and the video camera or image capturing device, and simultaneously transmit them in a semi-transparent or opaque, combined, overlaying manner on the display. The combiner module may be built-into the X, Y and/or Z input, the image capturing device or the graphics. Alternatively, the combiner module may comprise a hardware component connected to a standalone computer. The system also includes a simple or complex controller that enables the X, Y and/or Z input to communicate with the computer. In one embodiment, the controller receives a digital or analog signal from the computer and then converts and or synchronizes it into a compatible signal to be used by the display. In another embodiment, the controller is designed also to receive a synchronized signal from the combiner and transmit it to the computer for storage. The system includes the necessary drivers, operating system, turnkey firmware, drawing software program, text word processing field, spreadsheet, database, Web browser etc., loaded into the working memory of the external computer.

In general, input is input and output is output. The user's hands transfer data to an input device and the monitor provides the output to the user's eyes, which technically should only be looking at the monitor output and should not look away from the monitor to locate the mouse or keyboard. The mere act of looking at the mouse or keyboard has the effect of turning those input devices into outputs for the user's eyes. The user's hands should also be able to provide input intuitively being seen in the output, but without covering any part of the monitor and without having to hold one's hands up uncomfortably in the air to touch a touch screen.

It is generally an excruciating challenge to draw a simple "happy face" with a mouse. Using the systems and methods described herein, one can actually draw better than with a pencil looking down on a piece of paper on a desk. Additionally, the user's hands are semi-transparent such that the user never loses any of the visual portion of the monitor. This is not the case with any other touch surface including using a pencil and paper. According to the various embodiments set forth herein, the user's hands are shown, thus providing the intuitive hand-eye coordination associated with pointing, drawing, and moving objects around. Moreover, the user's hands rest comfortably on the desktop (rather than being held up in the air to touch a vertical Touchscreen monitor), and the user's eyes look forward, not angled down to look at the tabletop (which may cause neck injuries). This combination is more ergonomically comfortable and is not present on any currently available touch surface.

The systems described herein are also very mobile, require no physical buttons, do not require a mouse, and do not result in visual parallax. By contrast, normal touch screens have a glass or transparent media portion that is touched physically at least fractions of an inch "above" the "actual" display elements. This does not allow one to sense exactly the position of a finger or stylus. In addition, the various embodiments of the invention do not require a physical keyboard. Instead, a virtual keyboard can be popped up having varying degrees of transparency and which can be located on the "perch" portion of the device, instead of the monitor. A visual indication of the key may be selected by the user's fingertip, thus providing a better cue than a key that is pressed using a tactile type feedback.

Various embodiments of the invention may also provide, (i) "Always Available" "Instant" STICKY NOTES, (ii) a quick photo copier, (iii) fax replacement, whereby documents may be signed that are being displayed on the screen, (iv) accurate robotic surgery control, (v) an improved handwriting input device, (vi) accurate missile control, (vii) accurate aircraft control, and (viii) a cost effective clean room computer interface device. Furthermore, the monitor stays clean because it is not generally touched by users at all in any normal usage. In addition, the system does not provoke a perspective induced viewing of the work. By contrast, looking down at a horizontal surface forces an unwanted perspective into drawings and the viewed artwork. The systems and methods set forth herein may be employed in surgery rooms, dental offices, electronics manufacturing, and many other industries.

The systems and methods of the invention are very intuitive, like having one's hands "in the computer," and further provide a feeling of "finger painting" in the computer. The systems may also be very mobile, provide the ability to left click and right click, provide the ability to have multiple pointing inputs, and provide the ability to put objects on the table that can also interact with the computer (e.g., electronic data-transfer as well as being visually displayed or represented). Moreover, the XY touch input gives extremely accurate response and is inexpensive because it is not handicapped by needing a clear "view through" ability of a medium or technology. Further, the hands input image is real time, and does not suffer from the latency of a web camera or computer processed video input. Different embodiments may include, but are not limited to: (i) a complete PC system; (ii) a complete laptop system; (iii) an input device specifically as a standalone laptop/desktop with a monitor on the perch/palmtop; and (iv) a small PDA clamshell form factor.

Referring to the accompanying FIGS. 1-20, there is shown an input cueing input system generally denoted by the reference number 10 connected to a desktop computer 12 and external display 70. The system 10 allows the user to manually draw an image 72 on a drawing surface interface 28 of a digital drawing tablet 25 located directly in front of the user 8 which is then simultaneously displayed (image 72) on the computer's display 70.

The computer 12 includes a working memory 14, a video card 10 with a serial input port 18 (i.e. USB), and an output port 20 (VGA or DVI), and a display 70 connected to the video card's output port 20. The serial input port 18 is compatible and capable of being connected to a video camera's cable 62.

Loaded into the working memory 14 of the computer 12 with a software drawing software program 30. The drawing tablet 24 includes a cable 28 designed to connected to the serial input port 18. The drawing tablet 25 includes a flat drawing surface interface 28 that transmits the X, Y and or Z coordinate movements of the user's hand 8 or a suitable drawing implement 9. The drawing software program 30 is designed to process the signals from the drawing surface interface 28 and convert them into a drawing image 72 visible on the display 70.

The drawing tablet 25 may be a graphic tablet, graphic pad, digitalizing tablet, or a computer input device that allows one to hand-draw images and graphics. There are two main types of drawing tablets 25. The first type is known as a 'passive' drawing tablet that uses the pressure generated on the flat surface or a drawing implement when drawing to open and close switches located on the flat surface or the drawing implement. The switches create electromagnetic signals that are transmitted to the drawing software program. The second type of drawing tablet is referred to as an 'active tablet' that uses a specialized drawing implement that contains electronics that generates, transmits a and receives signals to and from to the tablet. In the invention disclosed herein, both passive and active drawing tablets may be used.

In the first embodiment, the drawing tablet 25 includes a digital drawing surface interface 28 mounted inside a rigid drawing table frame 32. Mounted on the back edge of the drawing tablet 25 is a strut 35. Mounted on the end of the strut 35 is a small platform 40. Placed on or-built into the top surface 44 of the platform 40 is an optional tablet mobile computing device 45. and optional holders 46 for storing a stylus 15 used on the drawing surface interface 28.

Figure 2:
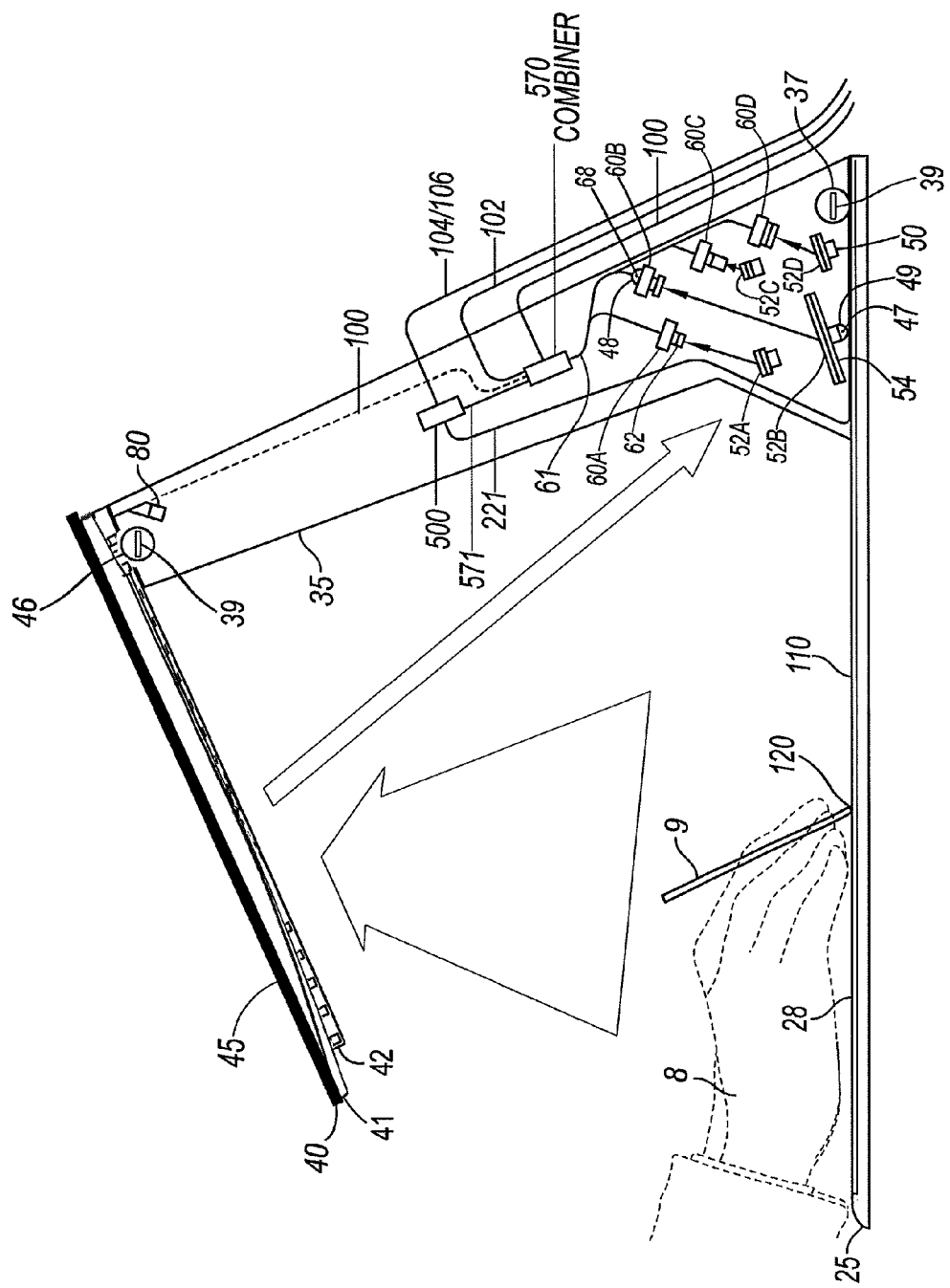
FIG. 2 is a side elevational view of the hand cueing input system shown in FIG. 1.

FIG. 1 is a perspective view of an input cueing emmersion device with hands on the input of the input cueing emmersion device being viewed in a semi-transparent manner on a computer display. FIG. 2 is a side view of an input cueing emmersion device in the "opened up" mode showing a "see through" view of the separate components. In some embodiments, the strut 35 is adjustably mounted on the back edge of the drawing tablet 35. As shown in FIGS. 1 and 2, the strut 35 extends diagonally upward and rearward from the drawing table frame 32. In the preferred embodiment, the strut 35 is adjustably mounted on the table frame 32 by a first hinge 37. The first hinge 37 includes a locking mechanism 39 that enables the strut 35 to be adjustably positioned over the drawing surface interface 28 and then locked into a fixed position.

Figure 3:
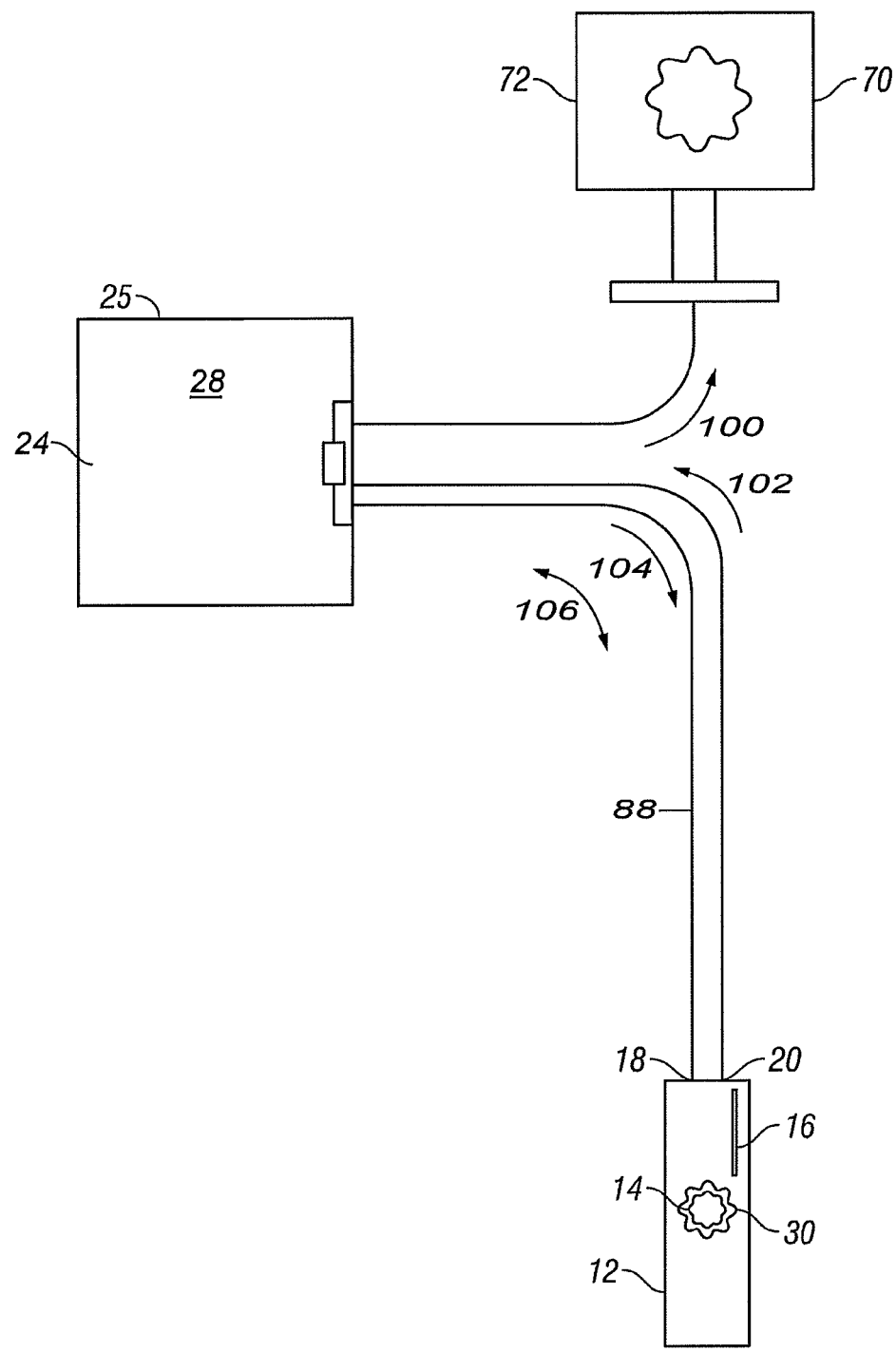
FIG. 3 is a block diagram showing the components used in the hand cueing input system showing in FIGS. 1 and 2.
Figure 4:
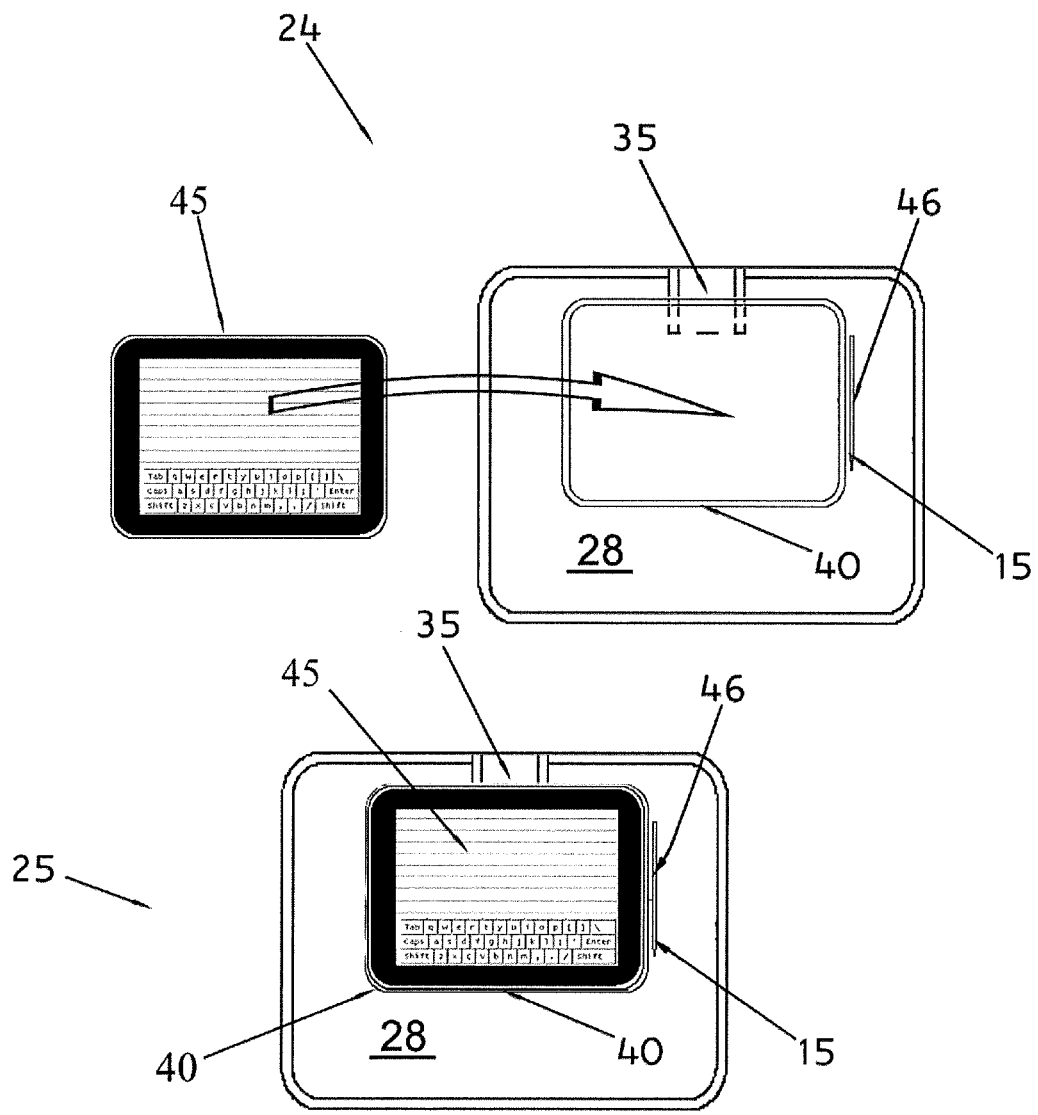
FIG. 4 is a top plan view of a tablet mobile computing device 45 being placed on platform 40.

FIG. 3 is a system schematic illustrating, among other things, (i) the transmission line of video signal out of computer to the input cueing emmersion device, (ii) the transmission line of input signal to the computer, and (iii) the transmission line of combined video signal to the display or monitor. In some embodiments, (i) and (ii) may be combined to be one cable (i.e., USB). In further embodiments, all three transmission lines may be could be wireless.

Mounted on the bottom surface of the platform 40 is a primary mirror assembly 41 designed to receive and reflect the image of the hands and drawing stylus on the drawing surface interface 28. The primary mirror assembly 41 includes a primary mirror 42 mounted inside an outer mirror frame 44. The outer mirror frame 44 is adjustably mounted on the distal end of the strut 35 so that the angle of the primary mirror assembly 40 may be selectively adjusted on the strut 35 by the user. In the preferred embodiment, a second hinge 46 is disposed between the strut 35 and the outer mirror frame 44.

In the first embodiment, the primary mirror 42 is a flat mirror that is aimed diagonally downward towards the drawing surface interface 28. In the first embodiment, the primary mirror 42 has substantially the same overall shape as the drawing surface interface 28 only approximately ⅓ the size. In the preferred embodiment, the strut 35 is approximately 12 inches in length and the primary mirror 42 is located approximately 8 inches above the drawing surface. The strut 35 is disposed at an angel between 60 to 85 degrees from the normal, vertical axis.

Mounted on the strut 35 below the platform and below the primary mirror assembly 40 is a secondary mirror assembly 50 designed to receive the reflected image of the drawing surface interface 28 from the primary mirror 42. In the preferred embodiment, the secondary mirror assembly 50 includes a flat secondary mirror 52 located in a rigid mirror frame 54. The secondary mirror 52 is rectangular and measures 2 inches by 2 inches (H×W). In the preferred embodiment, the secondary mirror frame 54 is pivotally mounted on the strut 35 by a third hinge 56 that includes a locking mechanism 58.

Located above the drawing tablet 25 and mounted on the strut 35 is a video camera 60 that captures live video image 64 of the user's hands or other objects placed on the drawing surface interface 28, which are then transposed over the image inputted from the drawing surface interface 28 to the display 70. The video image 64 from the video camera 60 is partially lucent or transparent so that the drawing image may be seen simultaneously with the video image 64. The video camera 60 is aimed and focused over the drawing tablet 25 so that the relative locations of the drawing, the user's hands 8, and the drawing implements 9 are simultaneously shown on the display 70. In the preferred embodiment, the video camera 60 is pivotally mounted on the strut 35 via a fourth hinge 66. Attached to the fourth hinge 66 is a locking mechanism 68 that allows the video camera 60 to be selectively aimed at the secondary mirror and then set at a fixed location on the strut 35.

Mounted on the strut 35 is an optional light 80 designed to illuminate the drawing surface interface 28 during use. By illuminating the drawing surface interface 28, light is reflected off the drawing surface interface 28, to the primary mirror 42, to the secondary mirror 52 and then to the video camera 60.

Loaded into the working memory 14 of the computer 12 is a video combining software program 85 that transposes the video image from the video camera 60 over the drawing image produced by the drawing tablet 25. When the drawing tablet 25, the video camera 60, the drawing program 30 and the video combining software program 85 are loaded into the computer's working memory 14, the viewer is able to see both images 72, 64 simultaneously on the display 70.

The drawing tablet 25 is setup on a desktop and connected to the computer 12 directly in front of a display 70. The display 70 must be elevated so that it may be viewable over the top edge of the platform 40. The angular positions of the strut 35, the primary and secondary mirrors 42, 52, respectively, and video camera 60 are then adjusted so that substantially the entire drawing on the drawing tablet 25 is seen on the display 70. Once the system 10 is properly setup, then the drawing tablet software program 30 is then activated and the video combining software program 85 are executed and loaded into the computer's working memory 14.

When initially sitting down at the computer 12 to draw, it is difficult to determine the precise location of the drawing implement 9 in the display 70. With the system 10 disclosed herein, the user 8 is able to visually see the transposed image of the drawing implement 9 on the display 70. When drawing, the video image 64 showing the user's hands, fingers, arms and drawing implement are transposed onto the display 70 along with the captured drawing image 72. The user 8 is provided a real 'live' perspective thereby providing a drawing experience similar to the drawing experience on paper.

Figure 5:
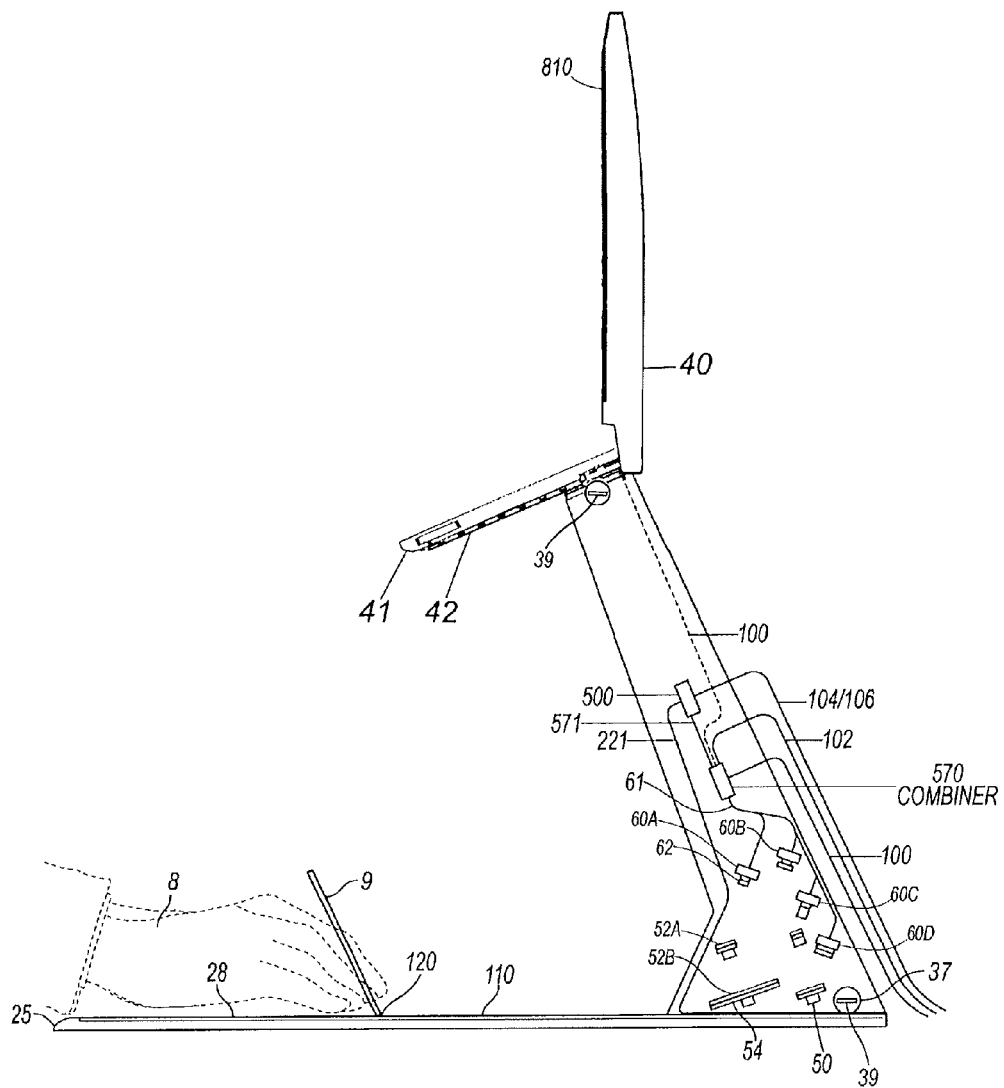
FIG. 5 is a side elevational view of the multiple camera hand cueing input system similar to the system shown in FIGS. 1-4.

FIG. 5 is a modified version of the desktop drawing tablet 24' showing a plurality of different video cameras 60A-60D used with plurality of different secondary mirrors 52A-52D needed to generate different images. Each camera or imaging system could have a different function. By way of example, one camera could be pre-focused for the view of the entire desk, another camera could have the view of just the input area, and another camera could have the view of a magnified area either on or off or above or about the input area. More specifically, FIGS. 5-8 are illustrations of a modified drawing tablet 24' with a front drawing surface 110 and a movement detection area 120. Mounted on the drawing tablet 24' is an optional pen or stylus holder 125, a scroll wheel 130, a trackball 135 and a 4-button input switch 140. The video camera 60A may be adjusted so that the entire drawing tablet 24 is shown in the display.

Figure 6:
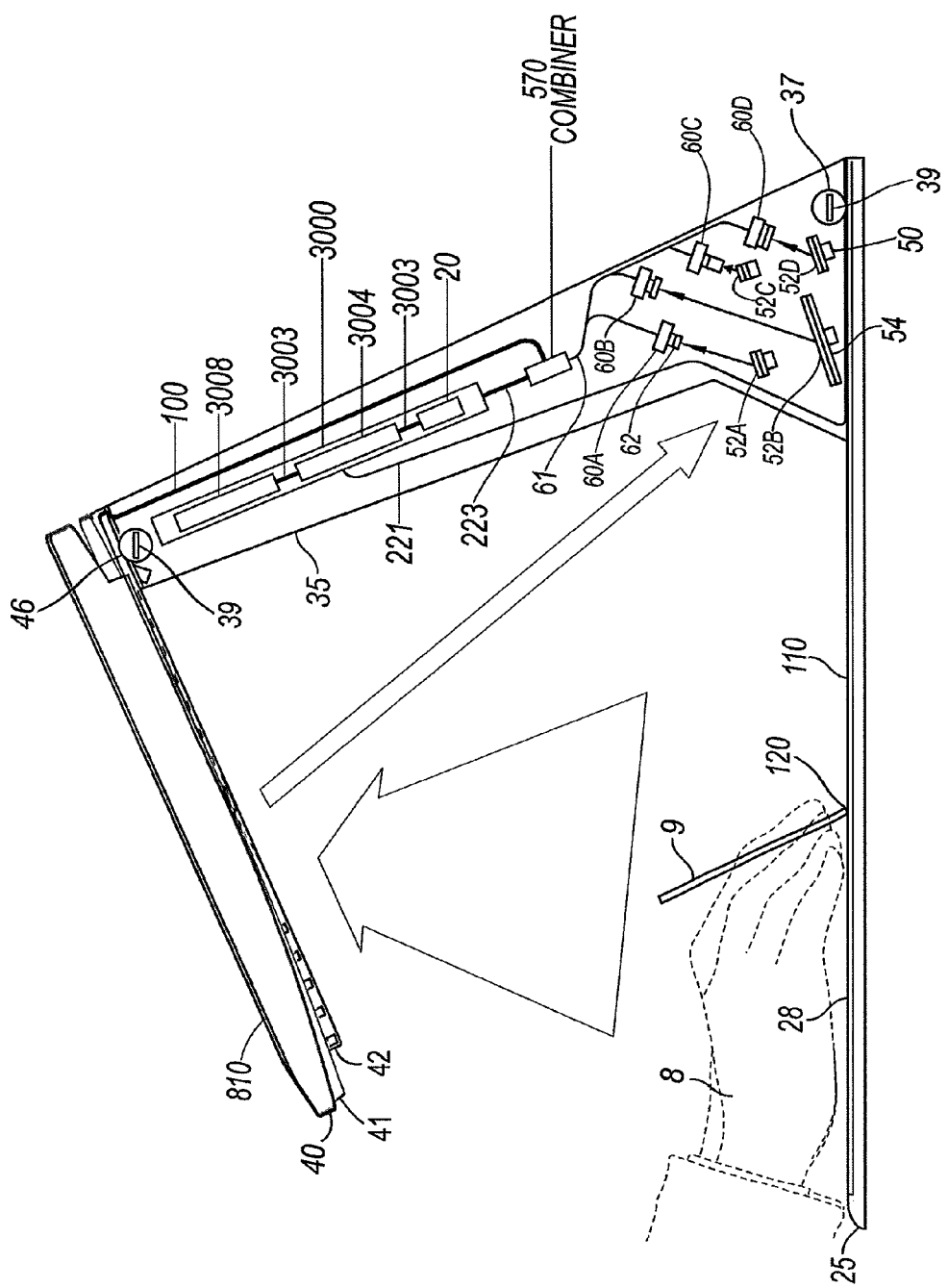
FIG. 6 is an illustration showing the image created by a video camera and primary mirror that shows an entire modified drawing tablet with a front drawing surface and a movement detection area.
Figure 7:
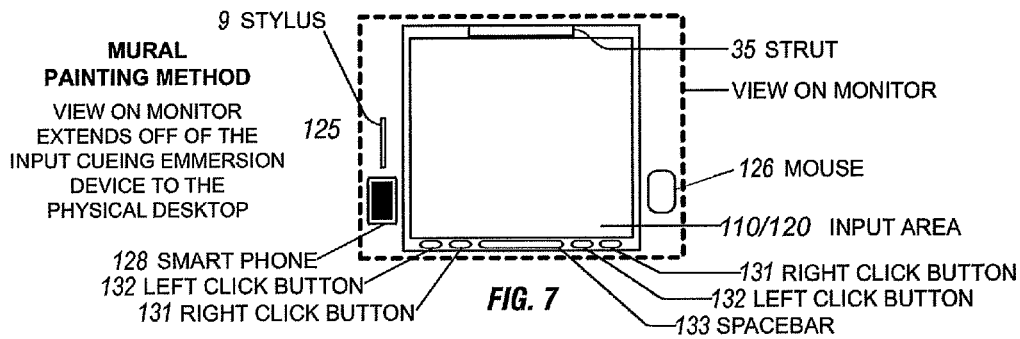
FIG. 7 is an illustration similar to the illustration shown in FIG. 6 showing the image created by another set of video camera and a primary mirror that shows outer areas of the drawing tablet.

FIG. 6 is an illustration showing the image created by a video camera and primary mirror that shows an entire modified drawing tablet with a front drawing surface and a movement detection area 120. In FIG. 6, the second video camera 60B is used so that only the input devices 125, 130, 135, 140, the drawing surface 110 and the movement detection area 120 are shown on the display 70. FIG. 7 illustrates an image created by another set of video camera and a primary mirror that shows outer areas of the drawing tablet. This "mural" desk view size shows an area outside of the physical input cueing emmersion device itself (e.g., including the physical desktop being captured) such that a computer operator could locate a flash drive memory device, stylus, music player etc., for possible use or to connect, plug in, or wirelessly connect to the input cueing emmersion device. In FIG. 7, a third video camera 60C is used so that only the drawing surface 110 and the movement detection area 120 are shown on the display 70.

Figure 8:
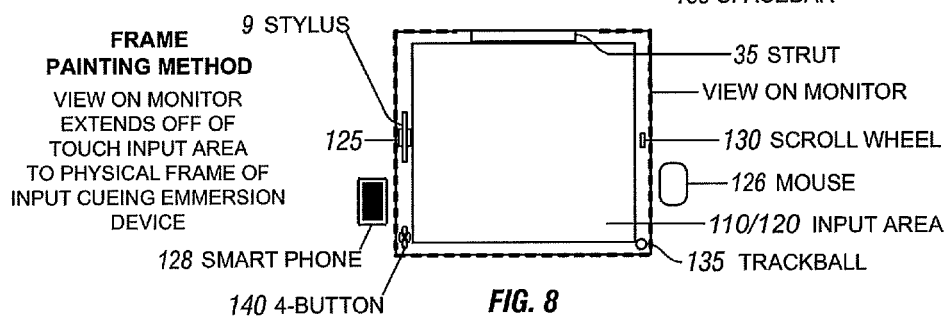
FIG. 8 is an illustration similar to the illustration shown in FIGS. 6 and 7 showing the image by another set of video camera and a primary mirror that shows the drawing surface and the movement detection area.
Figure 9:
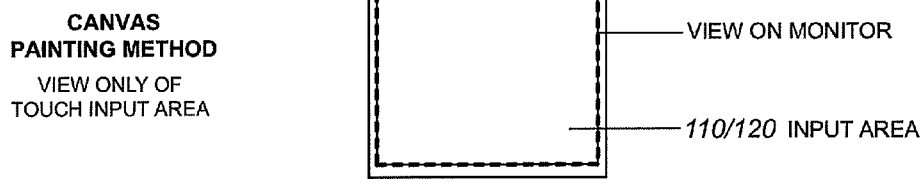
FIG. 9 is an illustration similar to the illustration shown in FIGS. 7-8 showing the image by another set of video camera and primary mirror that shows a small section of the drawing surface.
Figure 10:
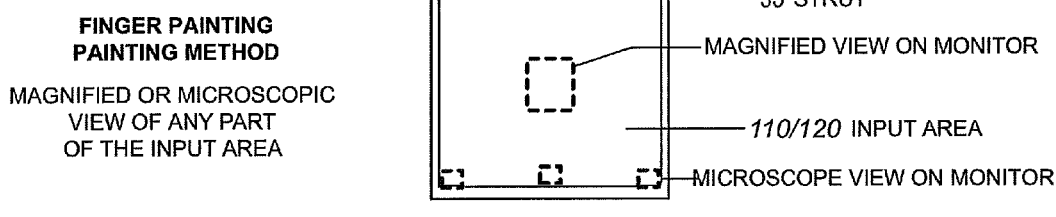
FIG. 10 illustrates a "finger painting" view size showing a small captured input area.
Figure 11:
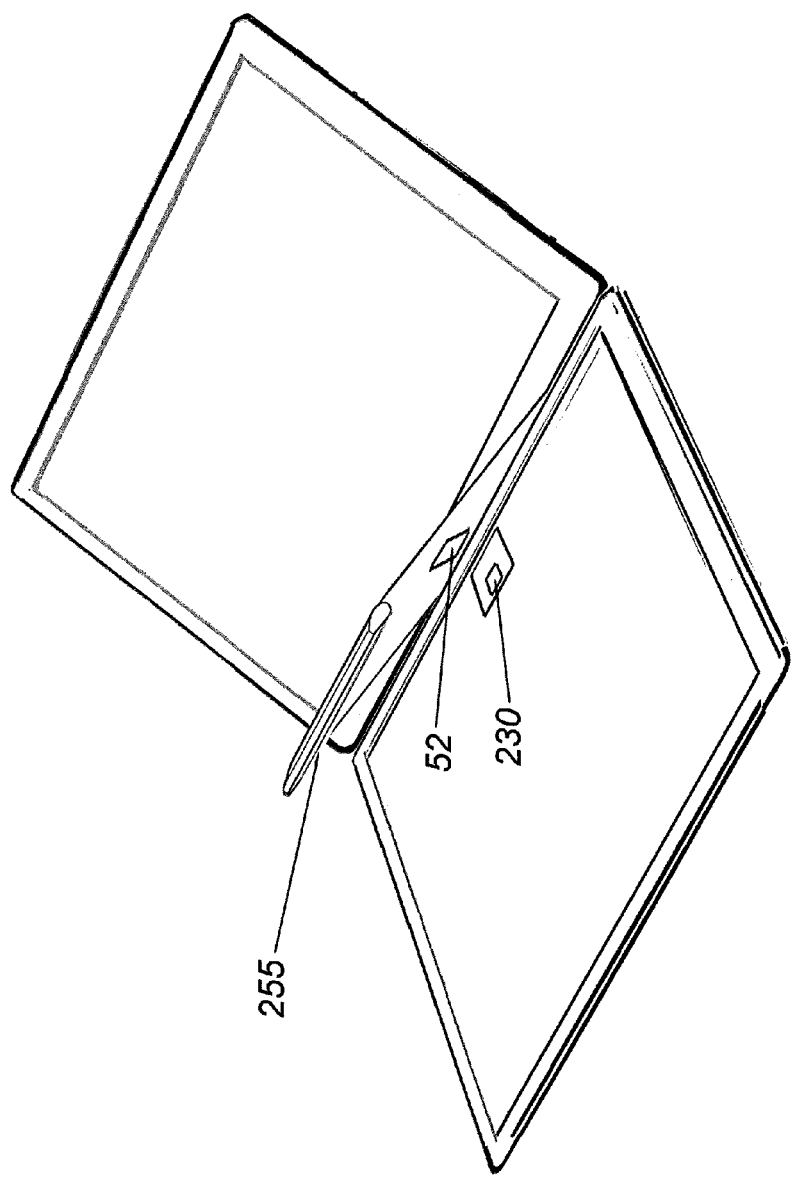
FIG. 11 is a perspective view of a second embodiment of the hand viewing input system shown incorporated into a laptop computer.
Figure 12:
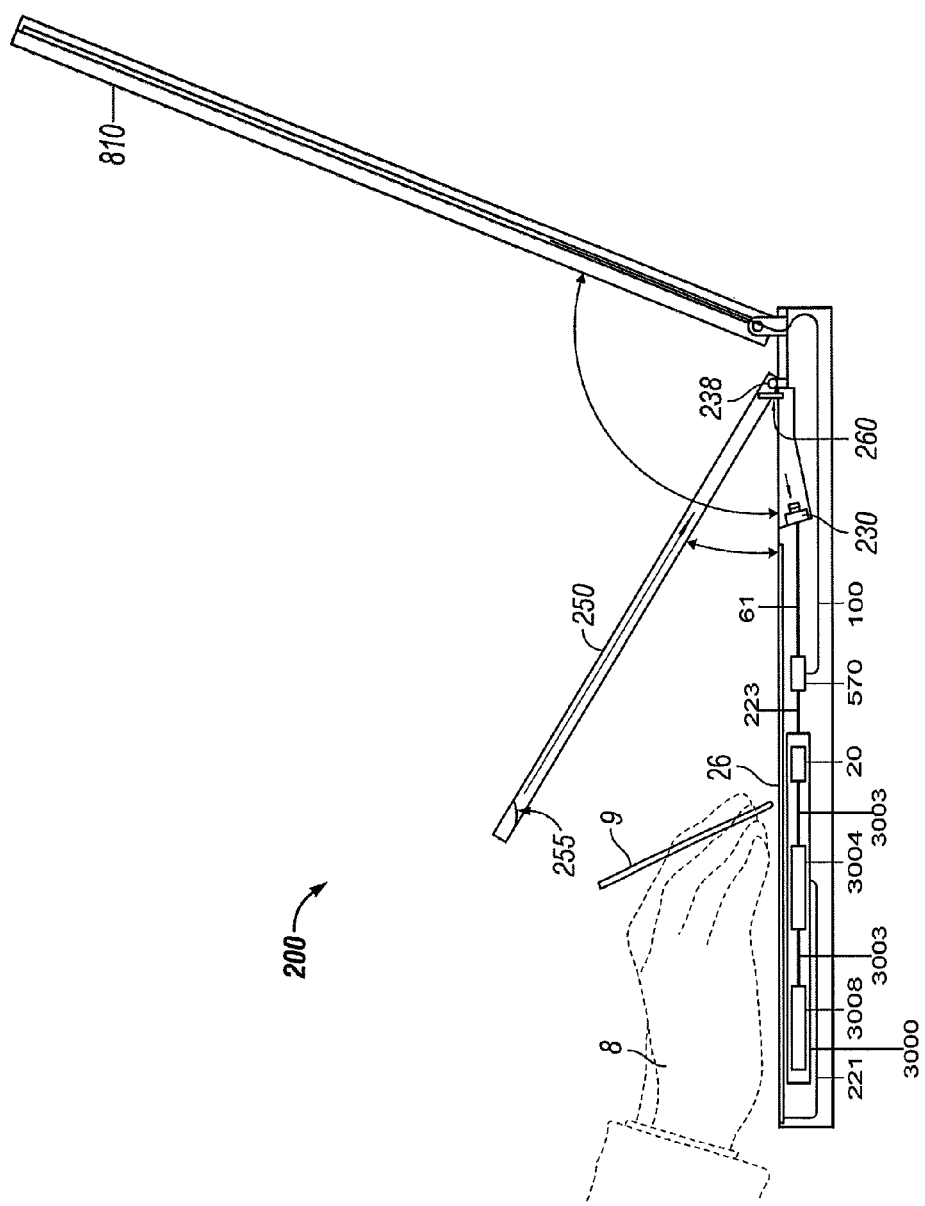
FIG. 12 is a side elevational view of the laptop computer with the hand viewing input system incorporated therein in a closed position.
Figure 13:
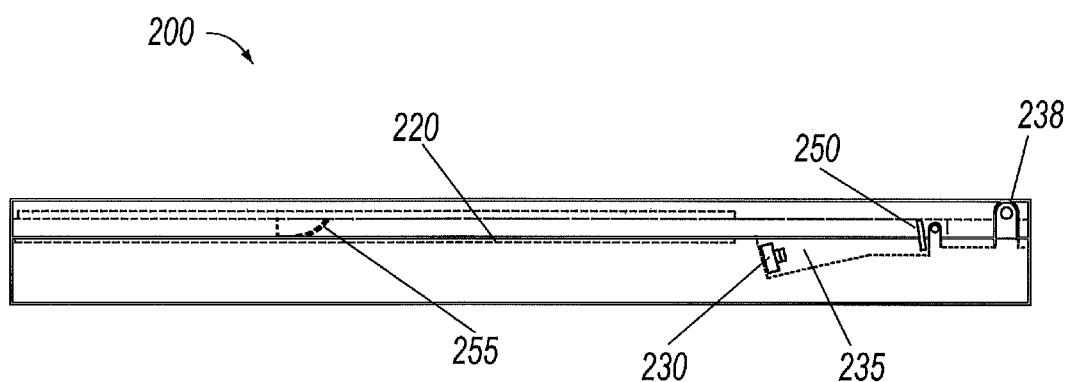
FIG. 13 illustrates a side view of the laptop computer in its closed position.

FIG. 8 is an illustration similar to the illustration shown in FIG. 7 showing the image created by another set of video camera and a primary mirror that shows the drawing surface and the movement detection area. This "frame" border view size shows the border or "frame" just outside of the input area being captured. In FIG. 8, only a small area on the drawing surface 120 is shown on the display 70. FIG. 9 is an illustration similar to the illustration shown in FIGS. 7-8 showing the image by another set of video camera and primary mirror that shows the complete input area being captured. FIG. 10 illustrates a "finger painting" view size showing a small captured input area, In another embodiment, shown in FIGS. 11-13, the system is incorporated into a modified laptop computer 200 with a built-in keyboard and a drawing surface 220. More particularly, FIG. 11 illustrates a laptop angle showing a perspective view of a "laptop" type embodiment in its open position, and FIG. 12 illustrates a laptop side view (open drawing only) showing a side view of a "laptop" type embodiment in its "open" position. The video camera 230 is located in a center recessed cavity 235 located near the front edge of the keyboard base. Mounted above the keyboard base is a pivoting strut 250 with a primary mirror 255 located at its upper end and a secondary mirror 260 attached to its lower end near the hinge 238. The video camera 230, the primary mirror 255 and the secondary mirror 260 are all aimed so that the user's hands and drawing implements designed to receive and reflect substantially all of the drawings produced on the drawing surface 220. FIG. 13 illustrates a side view of the laptop 200 in its closed position.

Figure 14:
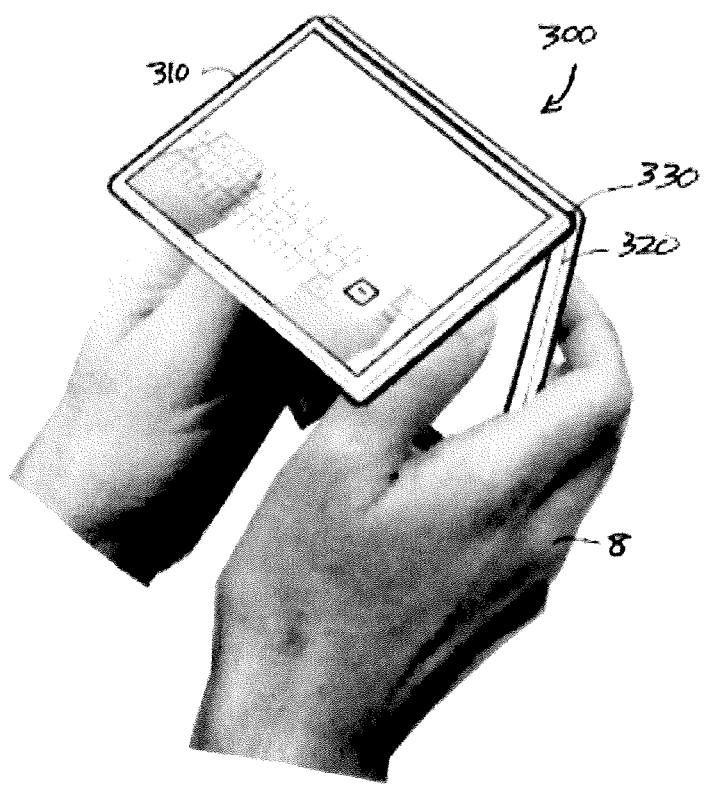
FIG. 14 is a perspective view of a third embodiment of the hand viewing input system shown incorporated into a handheld PDA or cellular telephone.

In another embodiment, shown in FIG. 14, the system is incorporated into modified PDA or cellular telephone generally denoted by the reference number 300 with an upper lid 310 and a lower input base 320 pivotally connected together by one or more hinges 330. Specifically, FIG. 14 illustrates a texting angle view showing hands 8 holding a small input cueing emersion device form factor 300. Like the laptop embodiment, a video camera is located in a center recessed cavity located near the front edge of the lower input base 320. Mounted on the top edge of the lid 310 is a primary mirror. Mounted on the inside surface of the base near the hinge 330 is a secondary mirror. The video camera, the primary mirror and the secondary mirror are all aimed so that the user's hands and drawing implements designed to receive and reflect substantially all of the drawings produced on the drawing surface interface.

Figure 15:
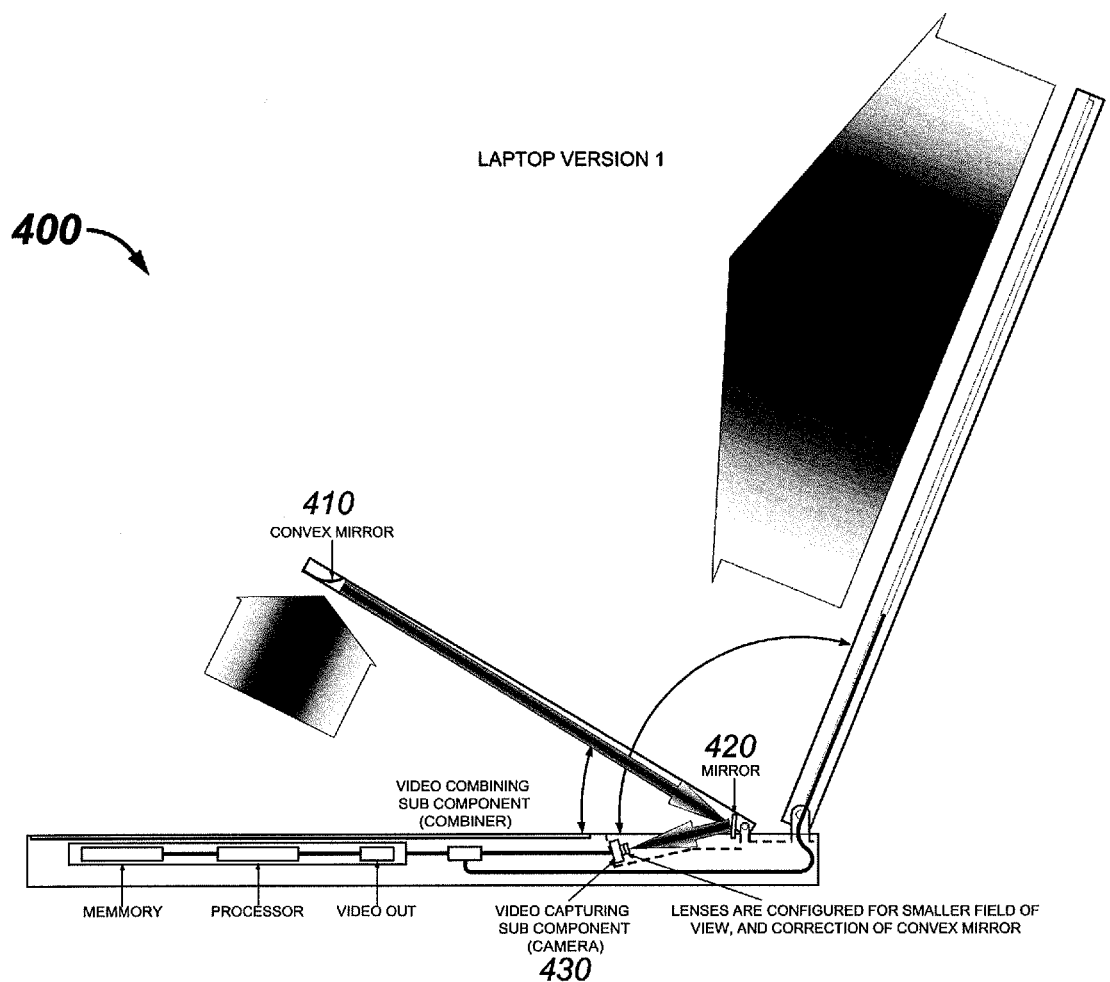
FIG. 15 is a side elevational view of a laptop computer with two mirrors and a single camera.
Figure 16:
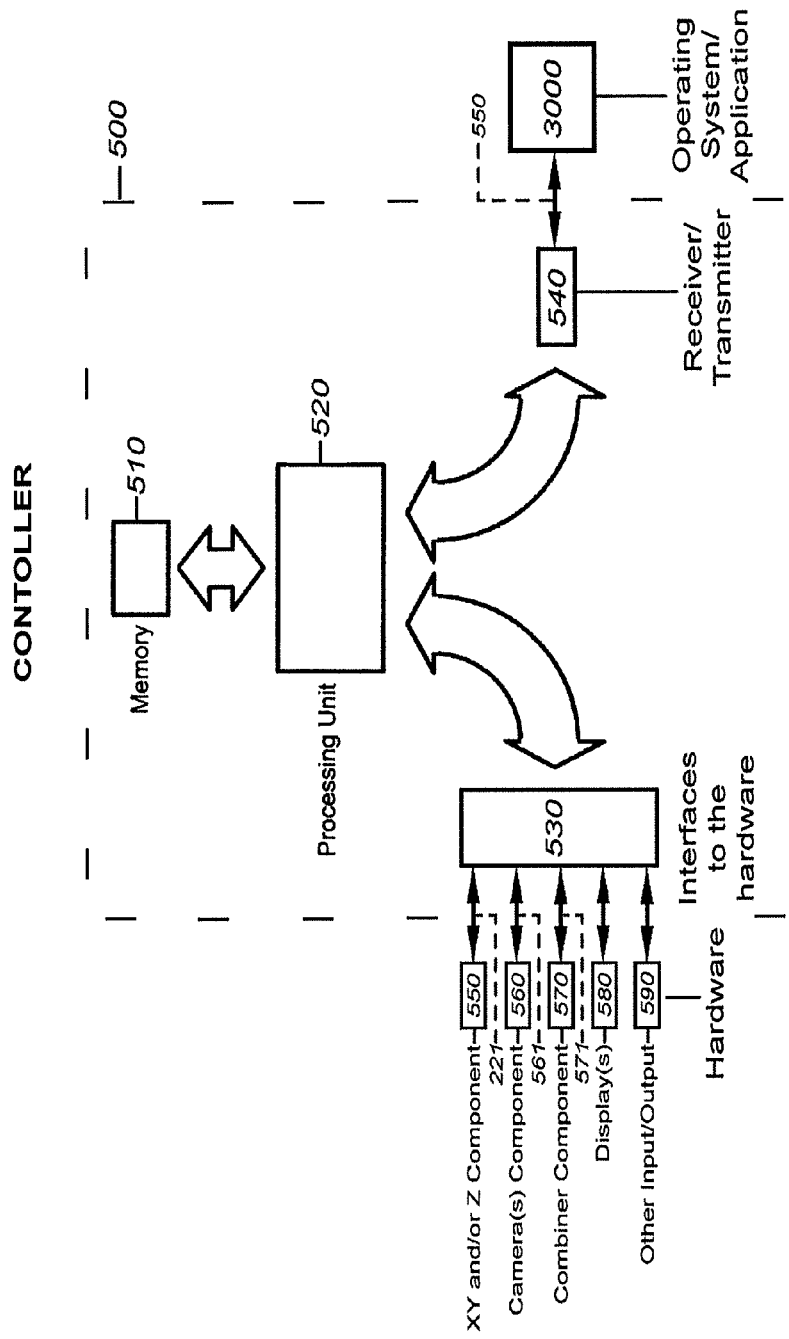
FIG. 16 is a block diagram of a controller.

FIG. 15 is a side elevational view of a laptop computer 400 with two image transfer devices (i.e. convex mirror 410 and mirror 420) and a single camera 430. FIG. 16 is a schematic of an input cueing emersion device 500 showing a modeling process hierarchy including memory 510, processing unit 520, interfaces 530 to hardware, and a receiver transmitter 540 which interfaces to applications or the OS. In certain embodiments, a controller 500 is provided that controls the input of signals from the X, Y and/or Z input X, Y and/or Z input to the processing unit and, in some cases, from the processing unit to the combiner.

Figure 17:
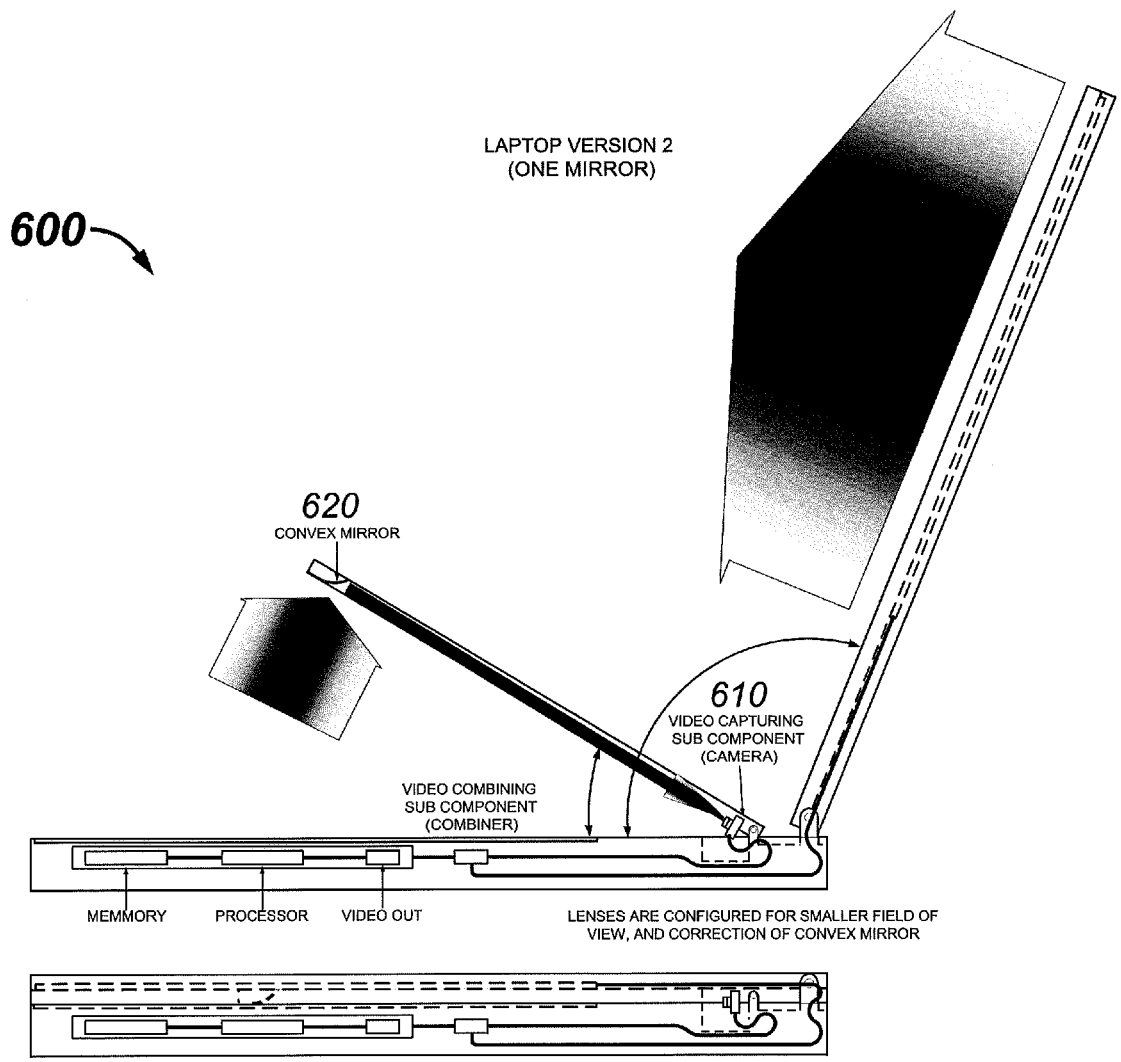
FIG. 17 is a side elevational view of a laptop computer with a single mirror mounted on the distal end of the strut with a single camera.
Figure 18:
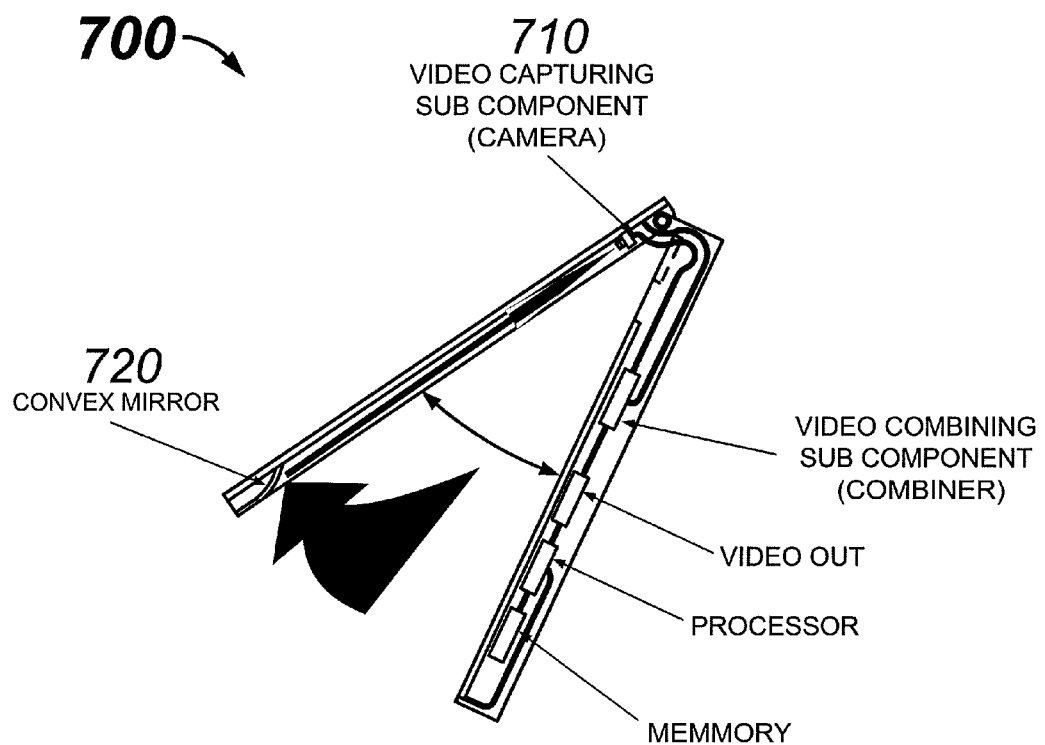
FIG. 18 is a side elevational view of a handheld device with a single mirror mounted on the distal end of the strut with a single camera.

In still other embodiments shown in FIGS. 17-18, the device is shown with one mirror and one camera. In particular, FIG. 17 illustrates a laptop 600 featuring only one image capturing device (i.e. camera 610) in combination with one image transfer device (i.e. mirror 620). FIG. 18 illustrates a hand held device 700 employing only one image capturing device (i.e. camera 710) in combination with one image transfer device (i.e. mirror 720).

Figure 19:
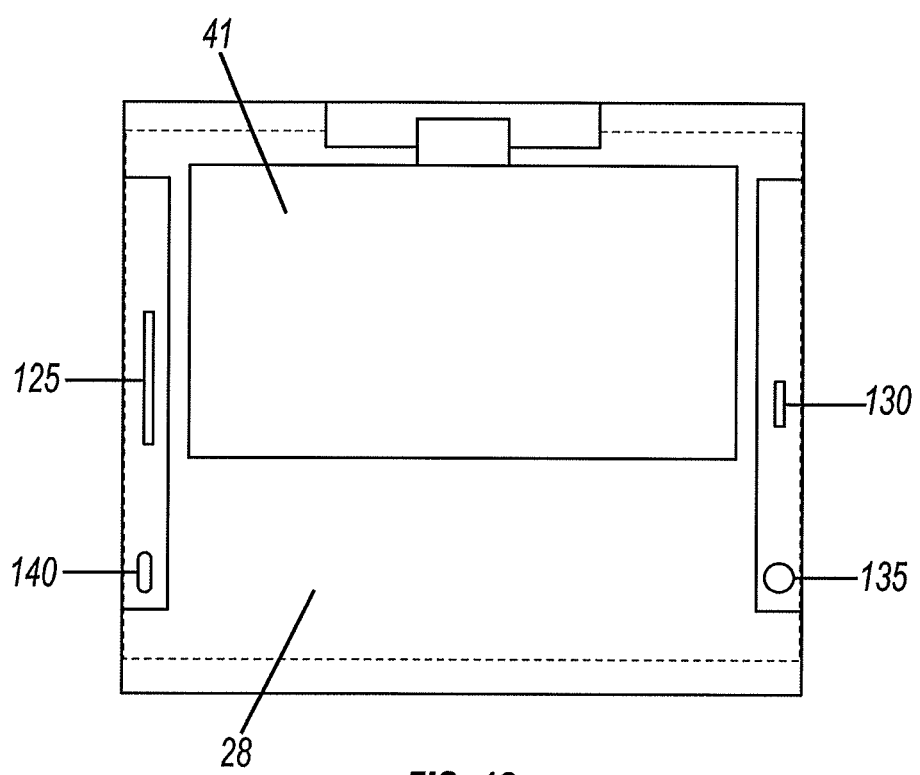
FIG. 19 is an illustration of an X, Y and/or Z input showing the area that is shown on the display.
Figure 20:
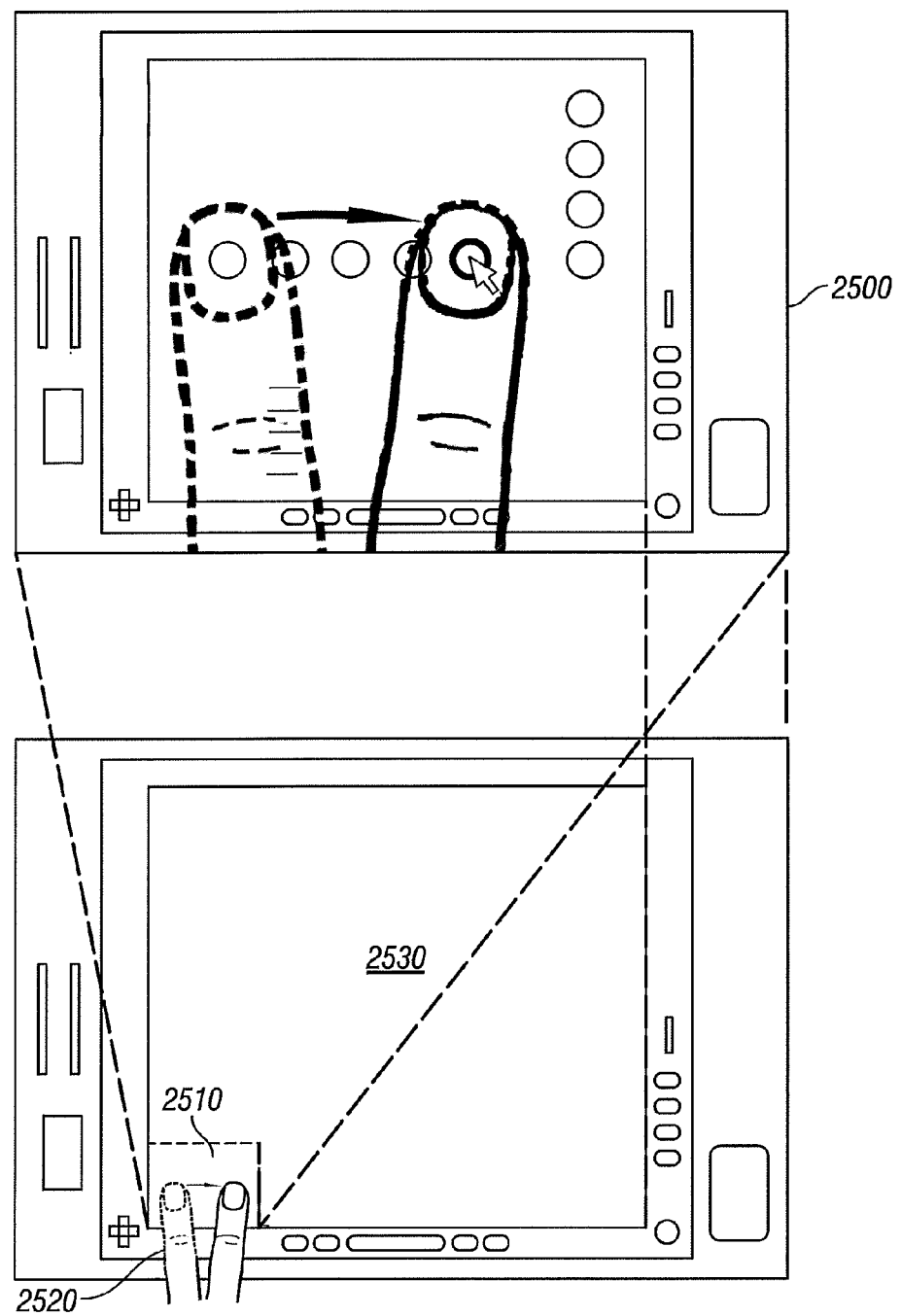
FIG. 20 is an illustration of an X, Y and/or Z input and display showing a section of the X, Y and/or Z input being activated and exploded onto the display.

FIG. 19 is an illustration of an X, Y and/or Z input showing the area that is shown on the display. This shows a possible mixture of the border or "frame" are just outside of the input area being captured with a non-rectangular input surface. FIG. 20 is an illustration of an X, Y and/or Z input and display showing a section of the X, Y and/or Z input being activated and exploded onto the display. This shows one area designated for a small area of input (i.e., for only a finger) such that the contents of the entire display or monitor can be accessed with the small movements of the finger. It is overlapped with a second and possibly larger input area that could provide input for a virtual keyboard seen on the display or monitor.

Figure 21:
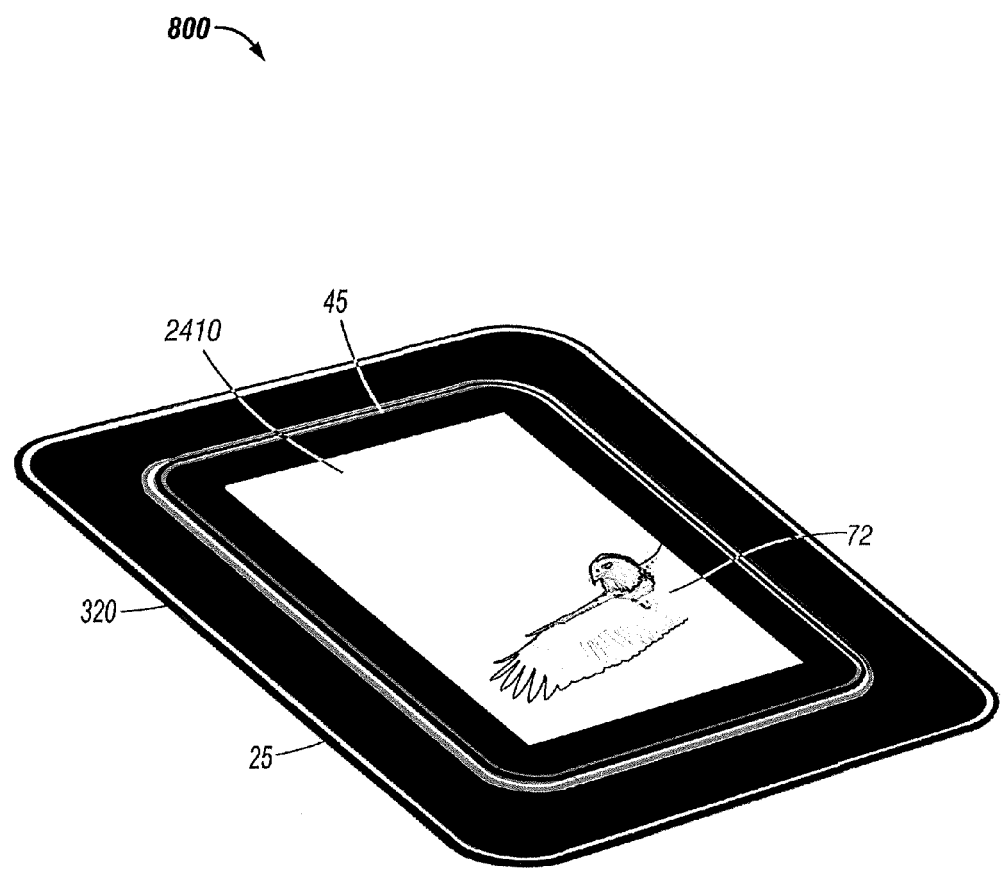
FIG. 21 is a perspective view of a folded input cueing emmersion device.
Figure 22:
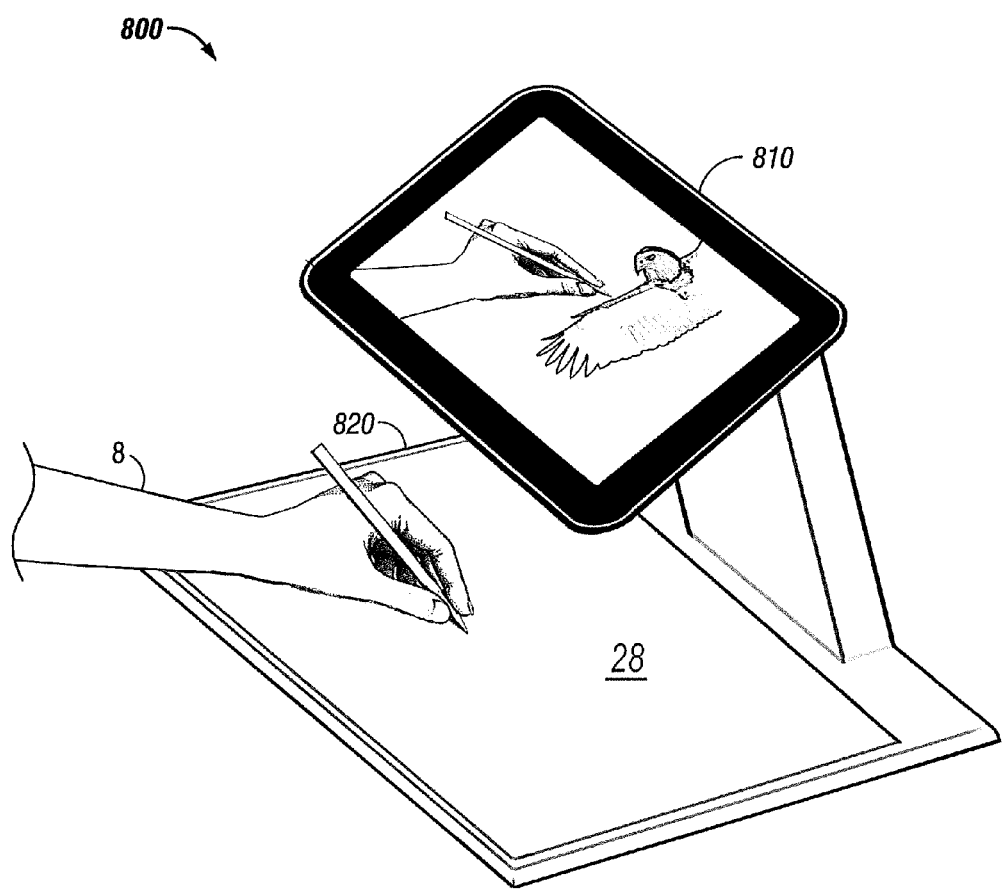
FIG. 22 is a perspective view of an opened input cueing emmersion device opened with a hand drawing.

FIG. 21 is a perspective view of a folded input cueing emmersion device comprising a portable input cueing emmersion device 800 in a "folded down" position. This configuration allows for ease of mobility similar to a folded up "laptop" but could still be able to operate, similar to a "tablet" or "slate." FIG. 22 is a perspective view of the opened input cueing emmersion device 800 displaying a hand 8 drawing while a user observes the action on a built-in screen 810. The input area 820 does not have any indentations or bumps at the front of the input area, such that an operator can type on this normally planar smooth surface and watch the built-in display to coordinate and match his hands and fingers to the keys for typing. The displaying images could also be shown on an external monitor.

Figure 23:
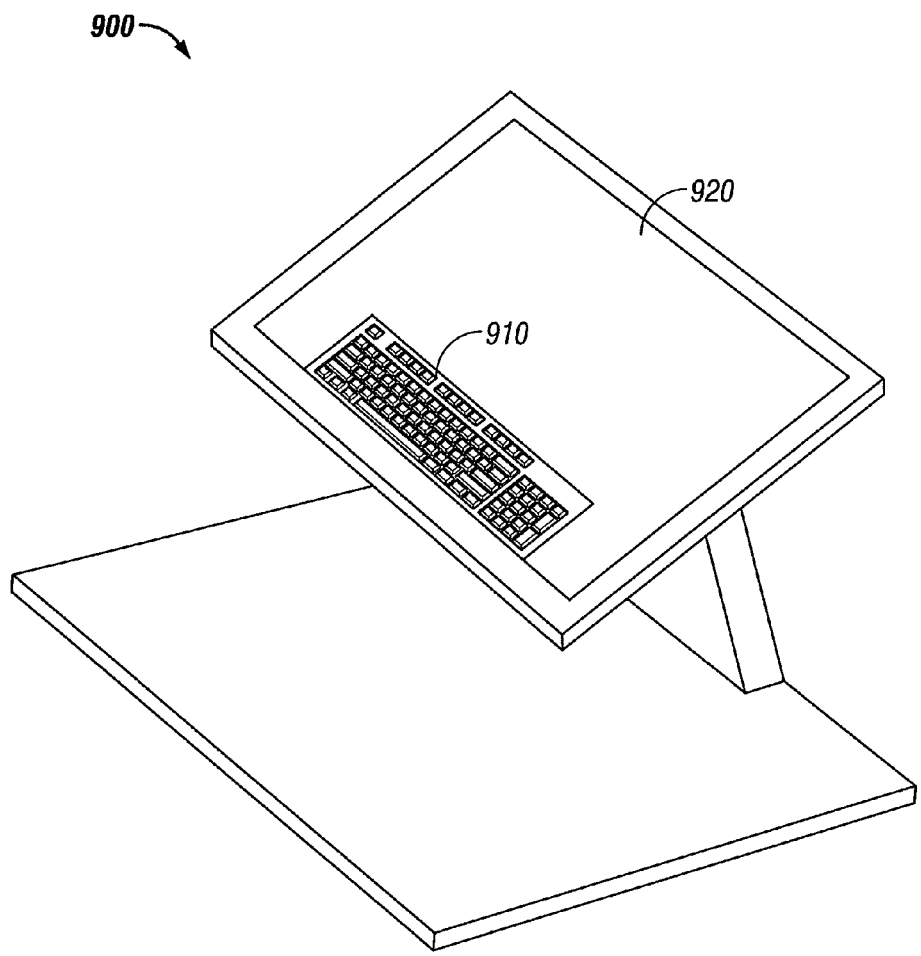
FIG. 23 is a perspective view of an opened input cueing emmersion device with a virtual keyboard being shown on the built-in display.
Figure 24:
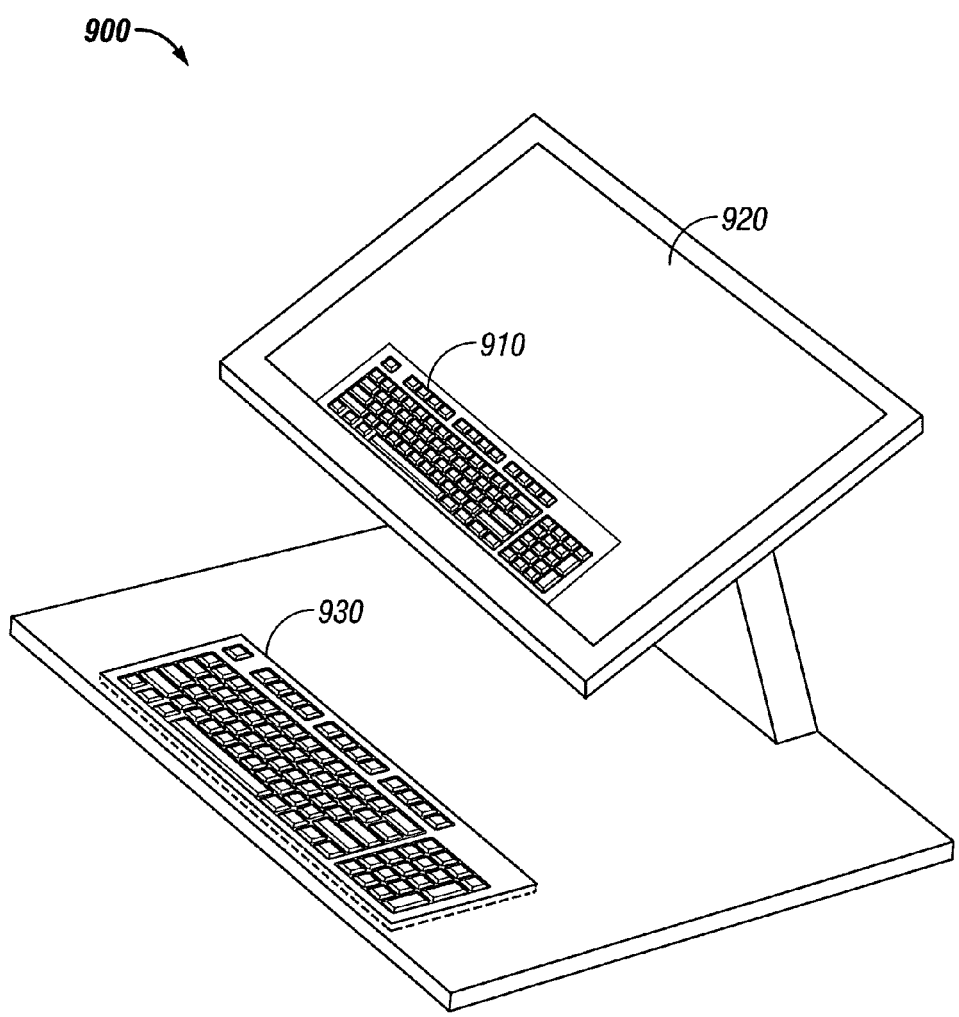
FIG. 24 is a perspective view of a physical keyboard on top of the input cueing emmersion device input aligned in a perpendicular fashion to the operator.

FIG. 23 is a perspective view of an opened input cueing emmersion device 900 with a virtual keyboard 910 displayed on the built-in display 920. The input area includes slight indentations at the front of the input area that are not visibly marked. These indents match up with the visible marked keys on the built-in display. FIG. 24 is a perspective view of a physical keyboard 930 on top of the input cueing emmersion device 900 and aligned in a perpendicular fashion to the operator. This illustrates how any physical keyboard could be put on top of the cueing emmersion device 900 input for typing.

Figure 25:
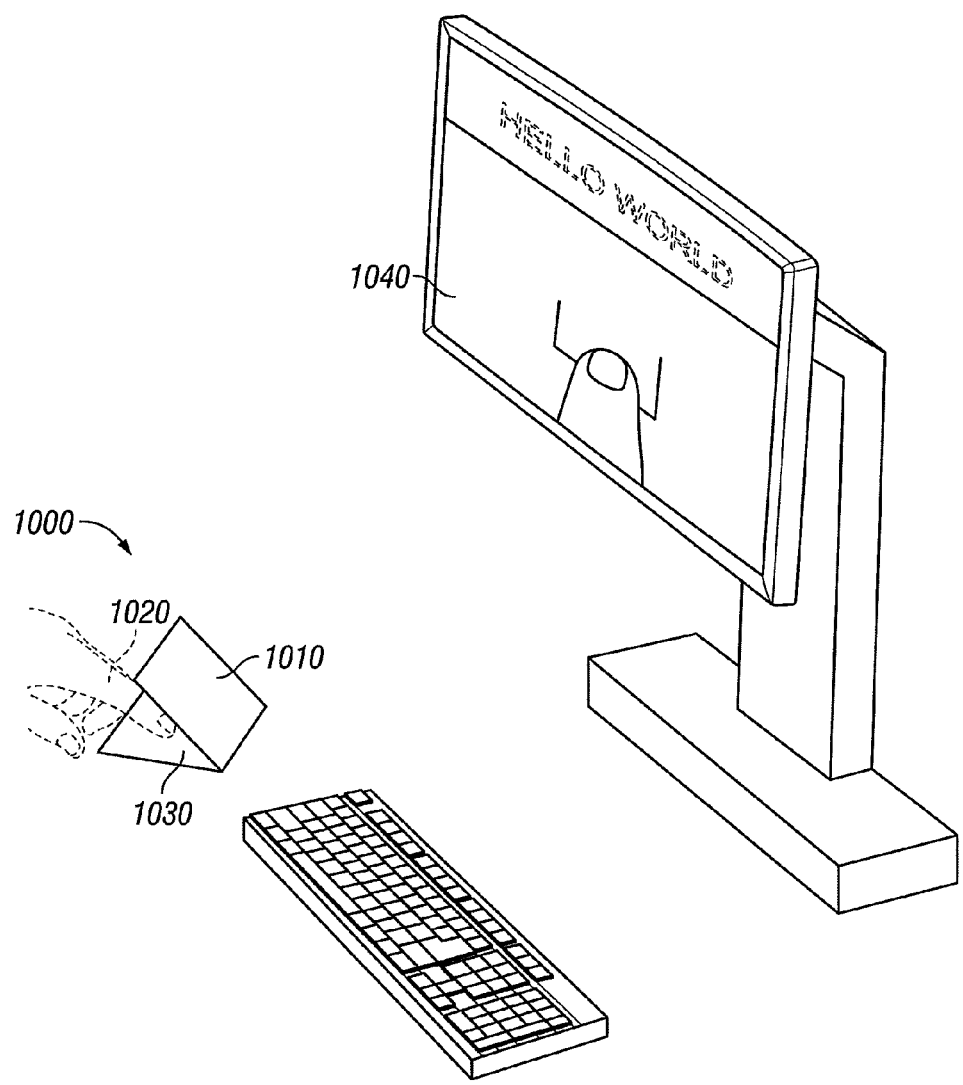
FIG. 25 is a side angle of a small form factor input cueing emmersion device (with computer and finger).

FIG. 25 is a side angle of a small form factor input cueing emmersion device 1000 (with computer 1010 and finger 1020). This shows a smaller input cueing emmersion device 1000 with a smaller input area 1030 designated for only one or several fingers so the contents of the entire display or monitor can be accessed with the small movements, gestures, clicking, and other actions of the one or several fingers. The image can be seen on a larger display 1040. Other embodiments may feature a model that provides the input to an external computer.

Figure 26:
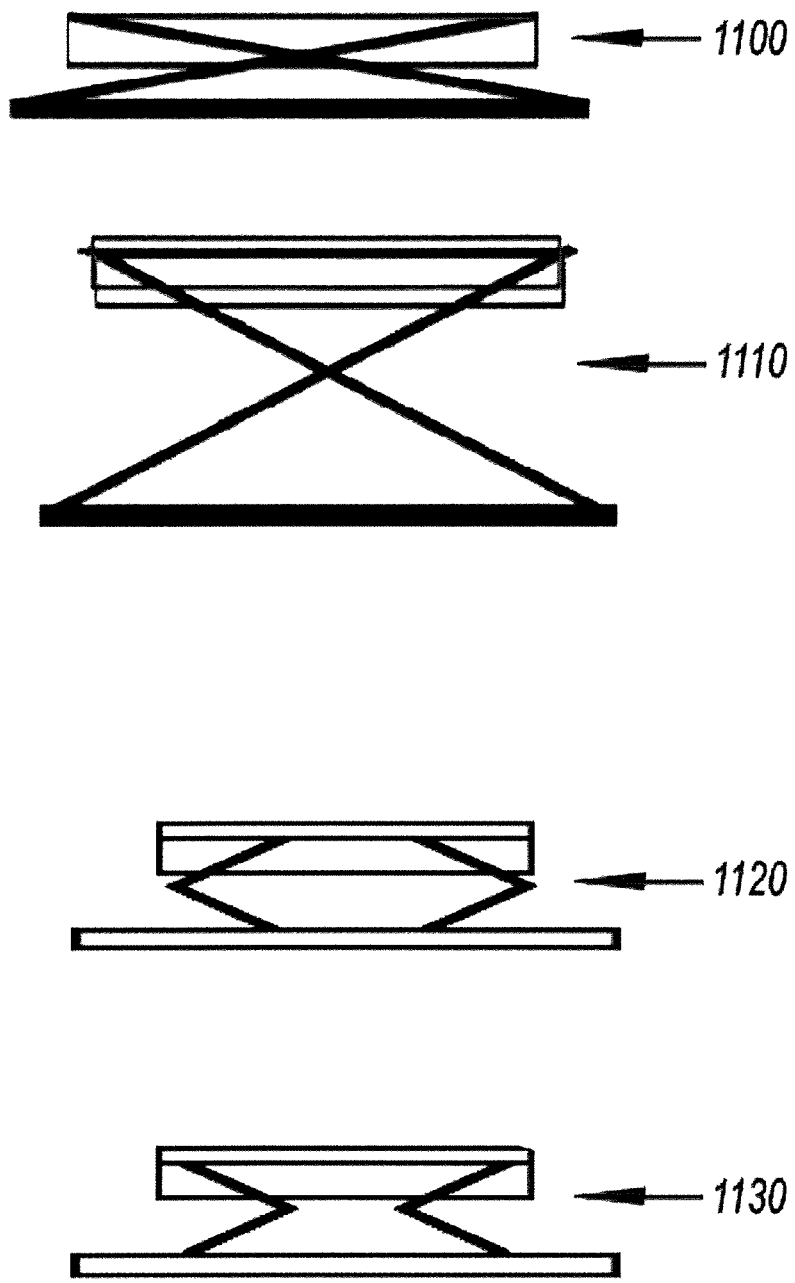
FIG. 26 is a rear view illustrating folding model concepts.

FIG. 26 is a rear view illustrating four different folding model concepts 1100, 1110, 1120, 1130. As would be appreciated by those of ordinary skill in the art, other folding model styles may be employed without departing from the scope of the invention.

Figure 27:
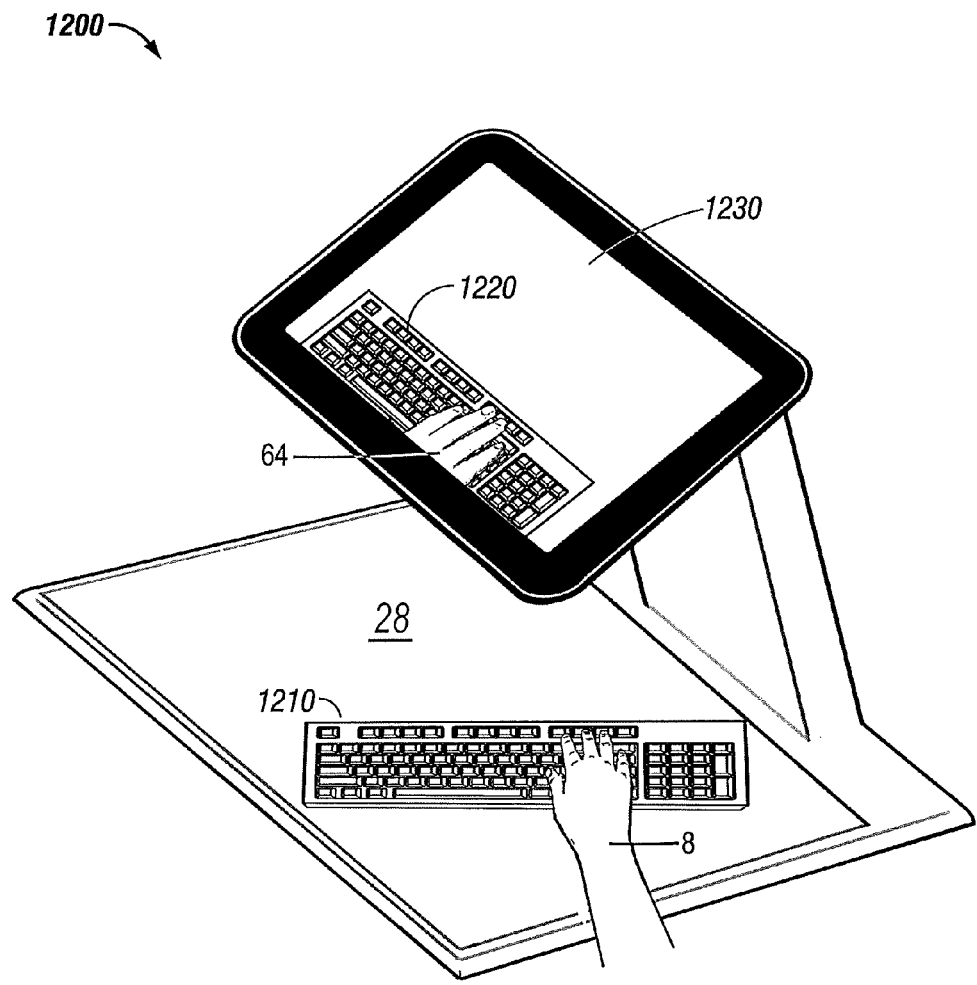
FIG. 27 illustrates a physical keyboard on top of an input cueing emmersion device, wherein the physical keyboard is not aligned in a perpendicular fashion to the operator.
Figure 28:
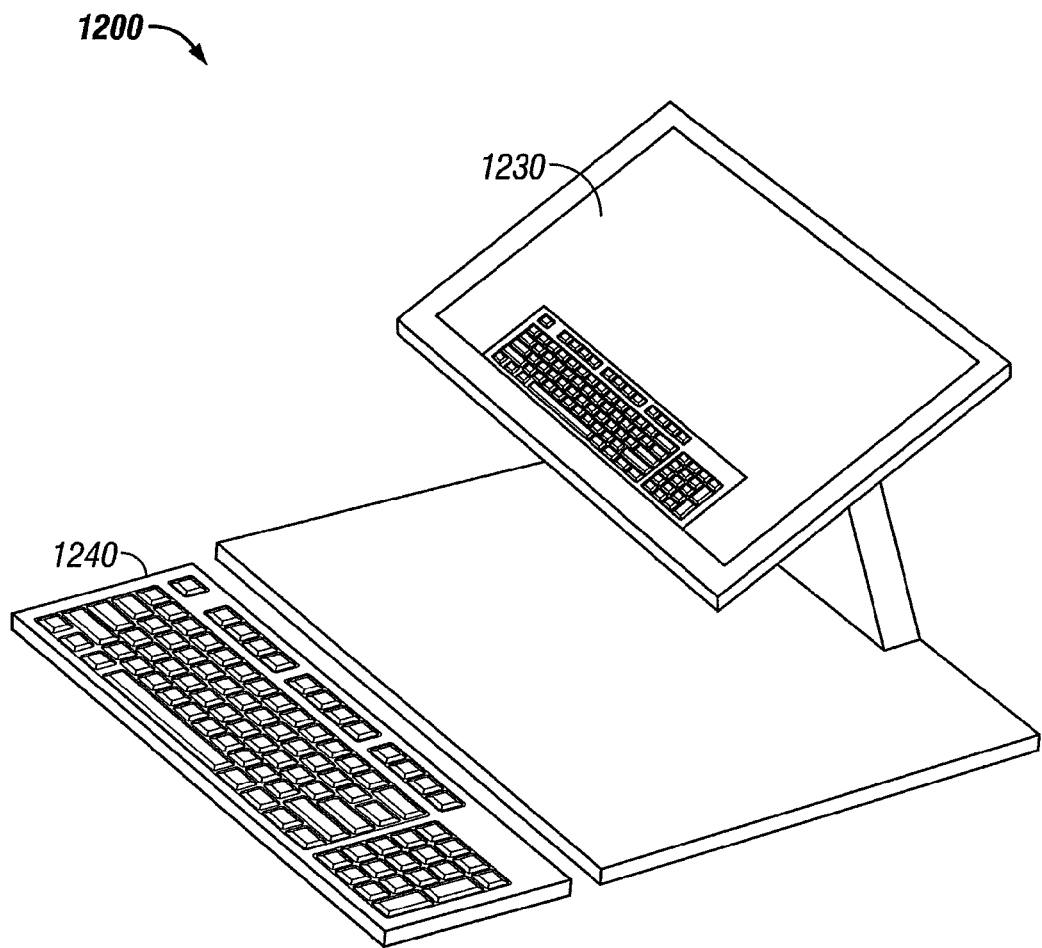
FIG. 28 illustrates a separate keyboard that is detached from the front of the input cueing emmersion device.
Figure 29:
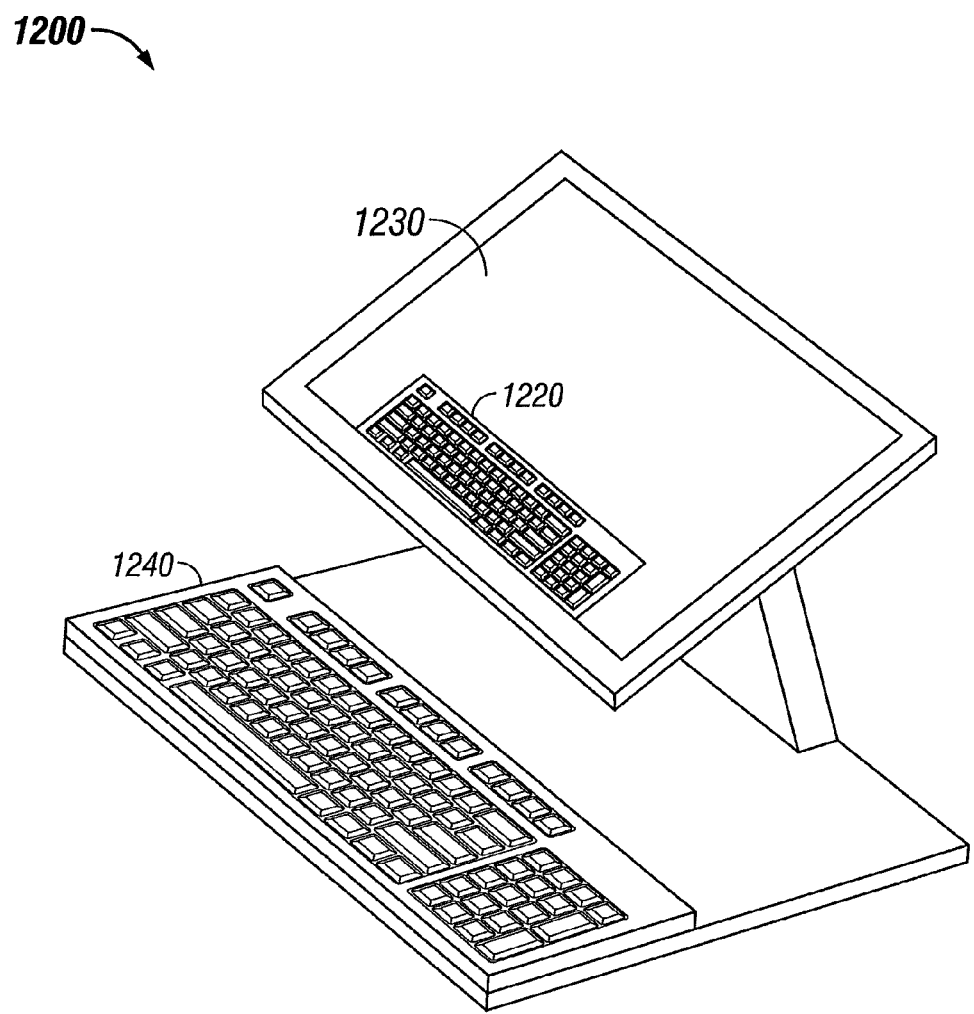
FIG. 29 illustrates a separate keyboard that is physically attached to the front of the input cueing emmersion device.

FIG. 27 illustrates a physical keyboard 1210 on top of an input cueing emmersion device 1200, wherein the physical keyboard 1210 is not aligned in a perpendicular fashion to the operator. This illustrates how any physical keyboard could be put on top of the cueing emmersion device 1200 and still be used for typing, with the virtual keyboard 1220 being seen on the display 1230 in a corrected manner through firmware or software. FIGS. 28-29 illustrate a separate keyboard 1240 that may be physically attached to the front of the input cueing emmersion device (FIG. 29) or be detached (FIG. 28) to work wirelessly (e.g., using infrared, blue tooth, Radio Frequency, etc.).

Figure 30:
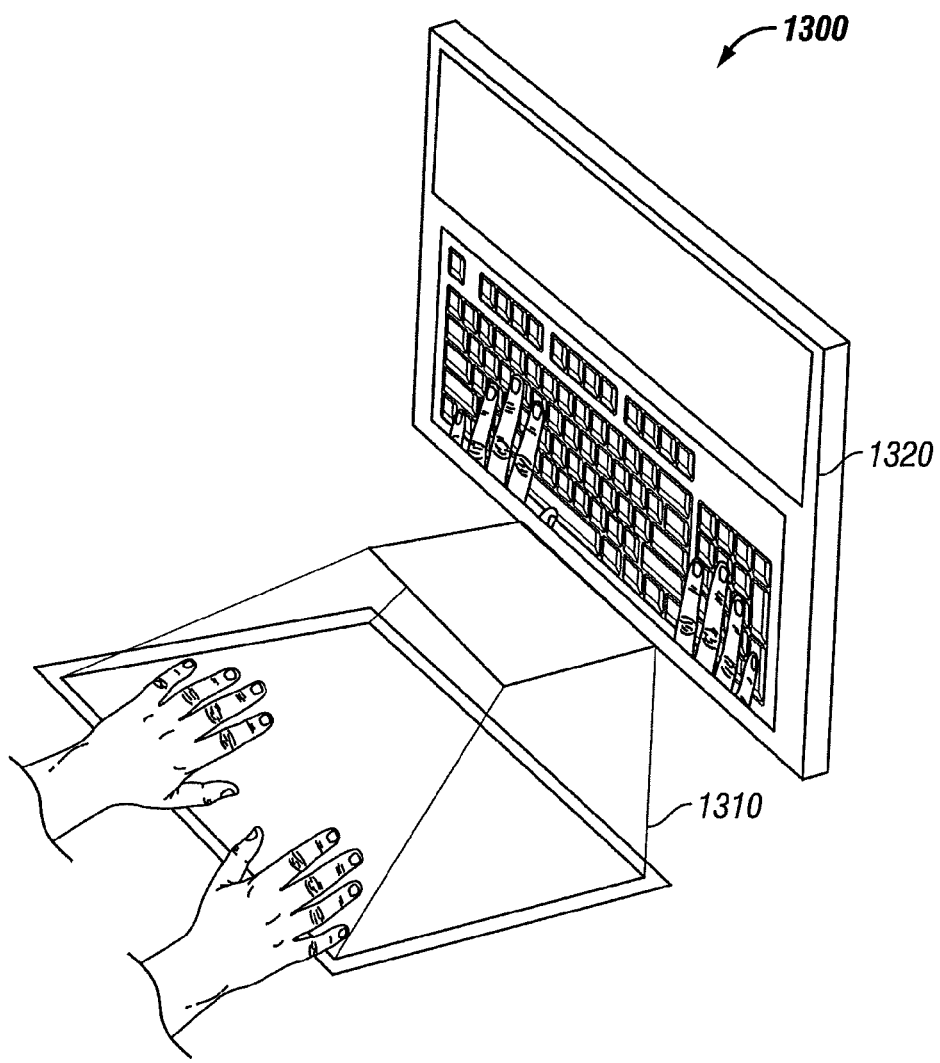
FIG. 30 illustrates an anytime teller machine ("ATM") with an image capturing or image carrier mechanism below the display.
Figure 31:
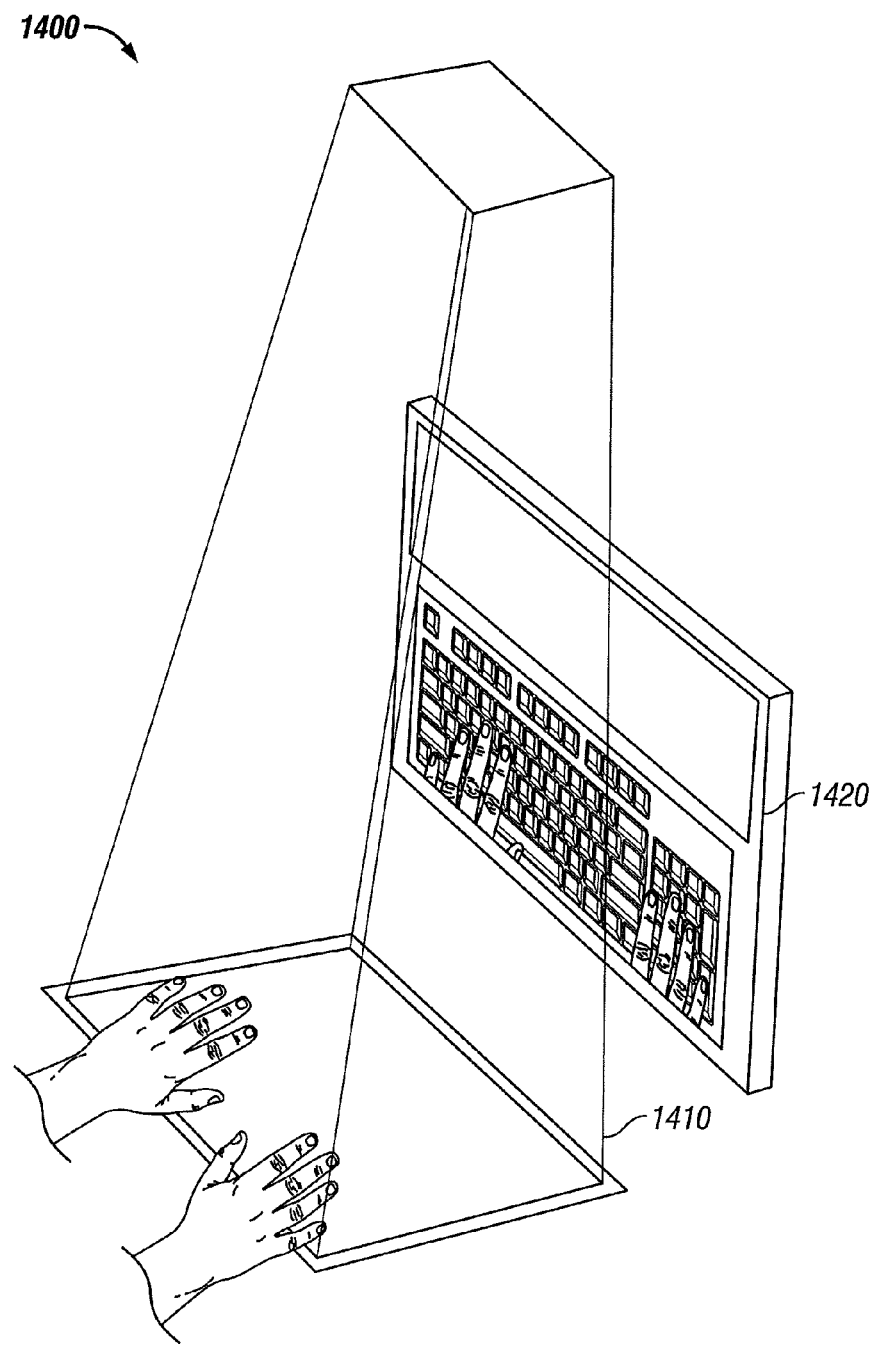
FIG. 31 illustrates an ATM with an image capturing or image carrier mechanism above the display.

FIG. 30 illustrates an anytime teller machine ("ATM") 1300 with an image capturing or image carrier mechanism 1310 below the display 1320. FIG. 31 illustrates an ATM 1400 with an image capturing or image carrier mechanism 1410 above the display 1420. These ATM embodiments are potentially more consumer-friendly configuration or service orientated models.

Figure 32:
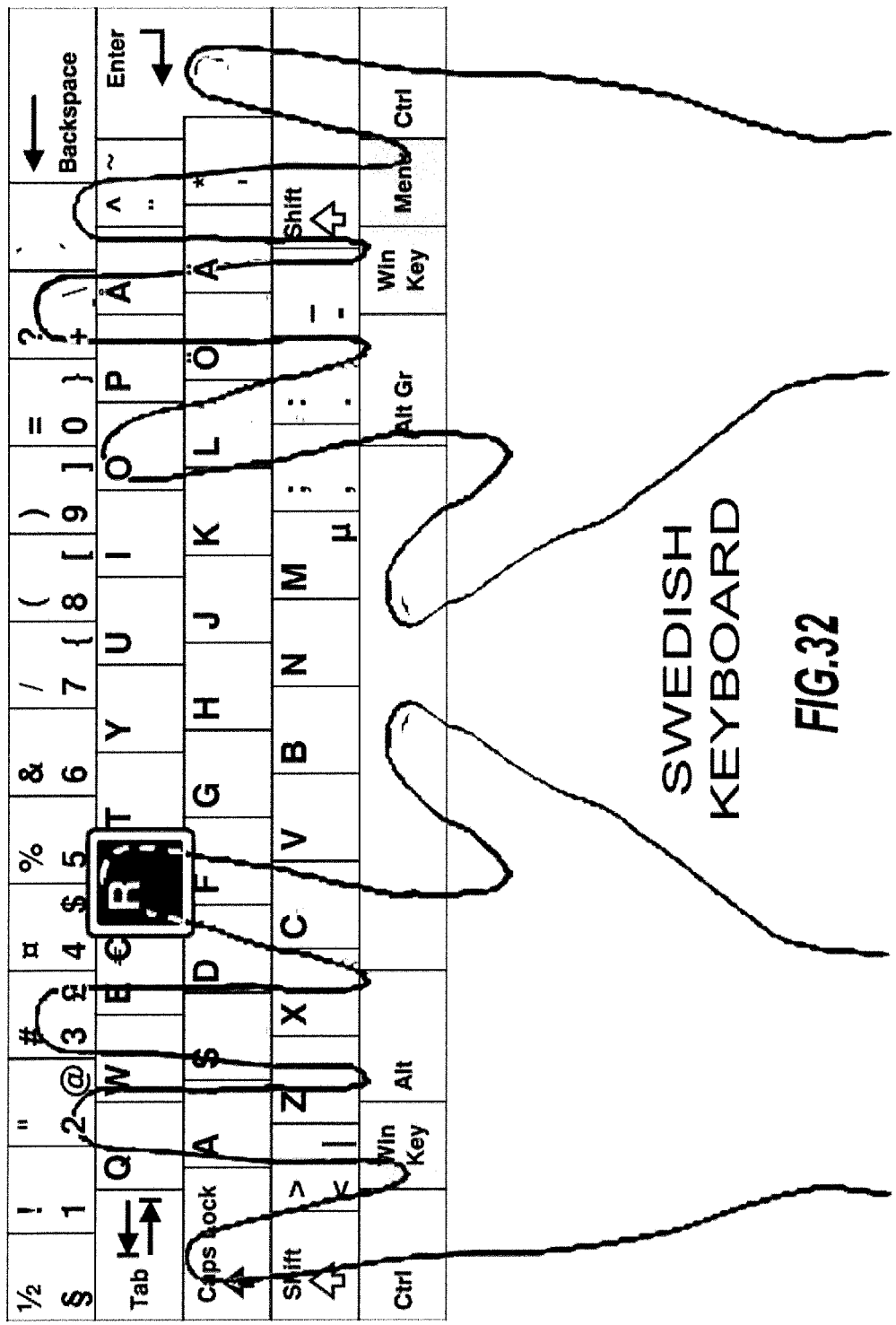
FIG. 32 illustrates a Swedish keyboard with semi-transparent hands.
Figure 33:
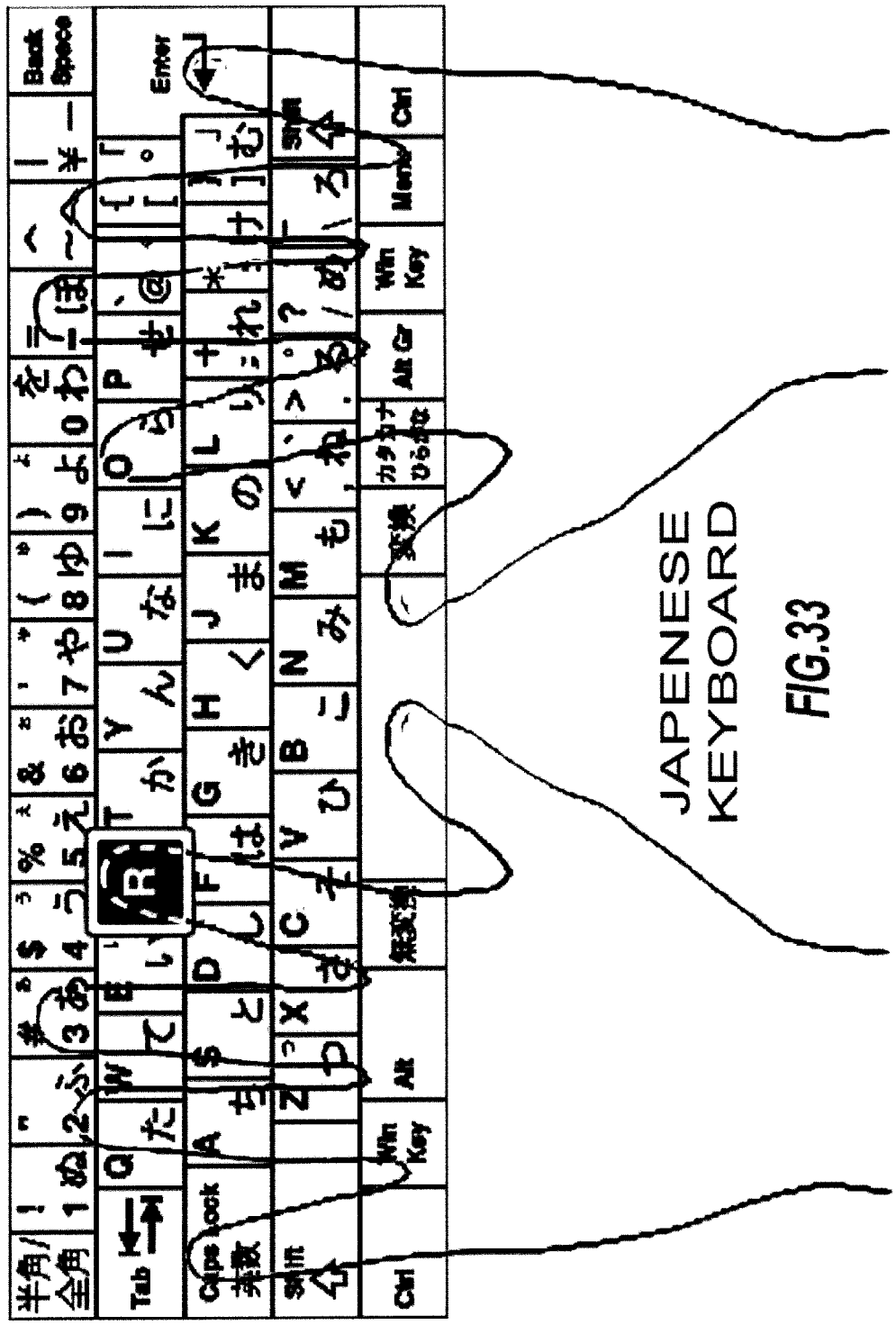
FIG. 33 illustrates a Japanese keyboard with semi-transparent hands.
Figure 34:
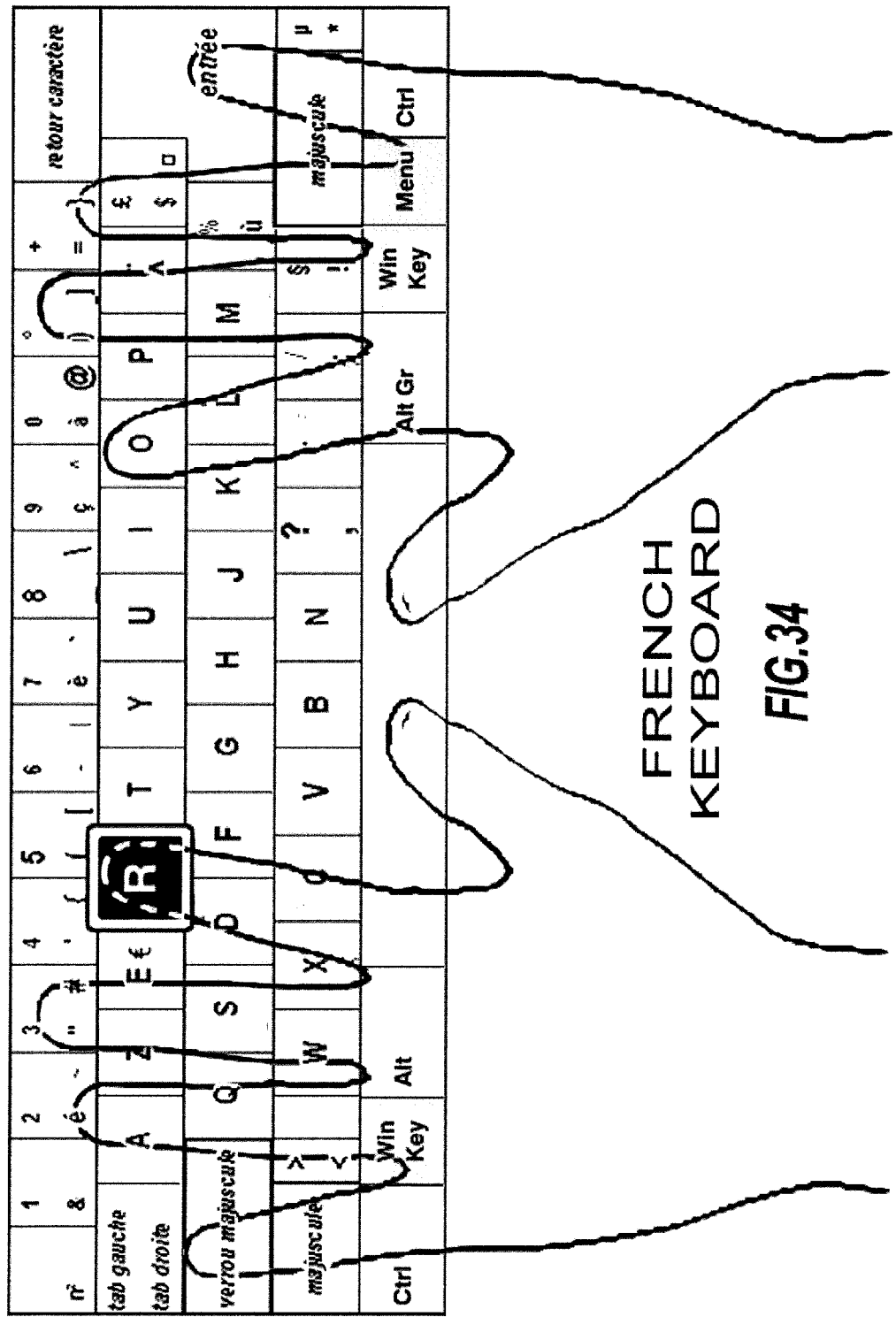
FIG. 34 illustrates a French keyboard with semi-transparent hands.

FIG. 32 illustrates a Swedish keyboard 1500 with semi-transparent hands 1510. As depicted, the semi-transparent hands 1510 of a computer operator do not completely cover or occlude the view of the Swedish keyboard on the display, with the particular key 1520 they are striking having a visual indication to cue the operator despite the presence of their finger, whether looking directly at it or in their peripheral vision. FIG. 33 illustrates a Japanese keyboard 1600 with semi-transparent hands 1610. As depicted, the semi-transparent hands 1610 and fingers of a computer operator do not completely cover or occlude the view of the Japanese keyboard on their display, with the particular key 1620 they are striking having a visual indication to cue the operator despite the presence of their finger, whether looking directly at it or in their peripheral vision. FIG. 34 illustrates a French keyboard 1700 with semi-transparent hands 1710. As depicted, the semi-transparent hands 1710 and fingers of a computer operator do not completely cover or occlude the view of the French keyboard 1700 on their display, with the particular key 1720 they are striking having a visual indication to cue the operator despite the presence of their finger, whether looking directly at it or in their peripheral vision. In further embodiments, the display could be more of a vertical type in front of the operator as she types on the input cueing emmersion device's more horizontal input. The embodiments of FIGS. 32-34 are only example of certain keyboards. Any country, style, gaming, industrial or other could be shown without departing from the scope of the invention.

Figure 35:
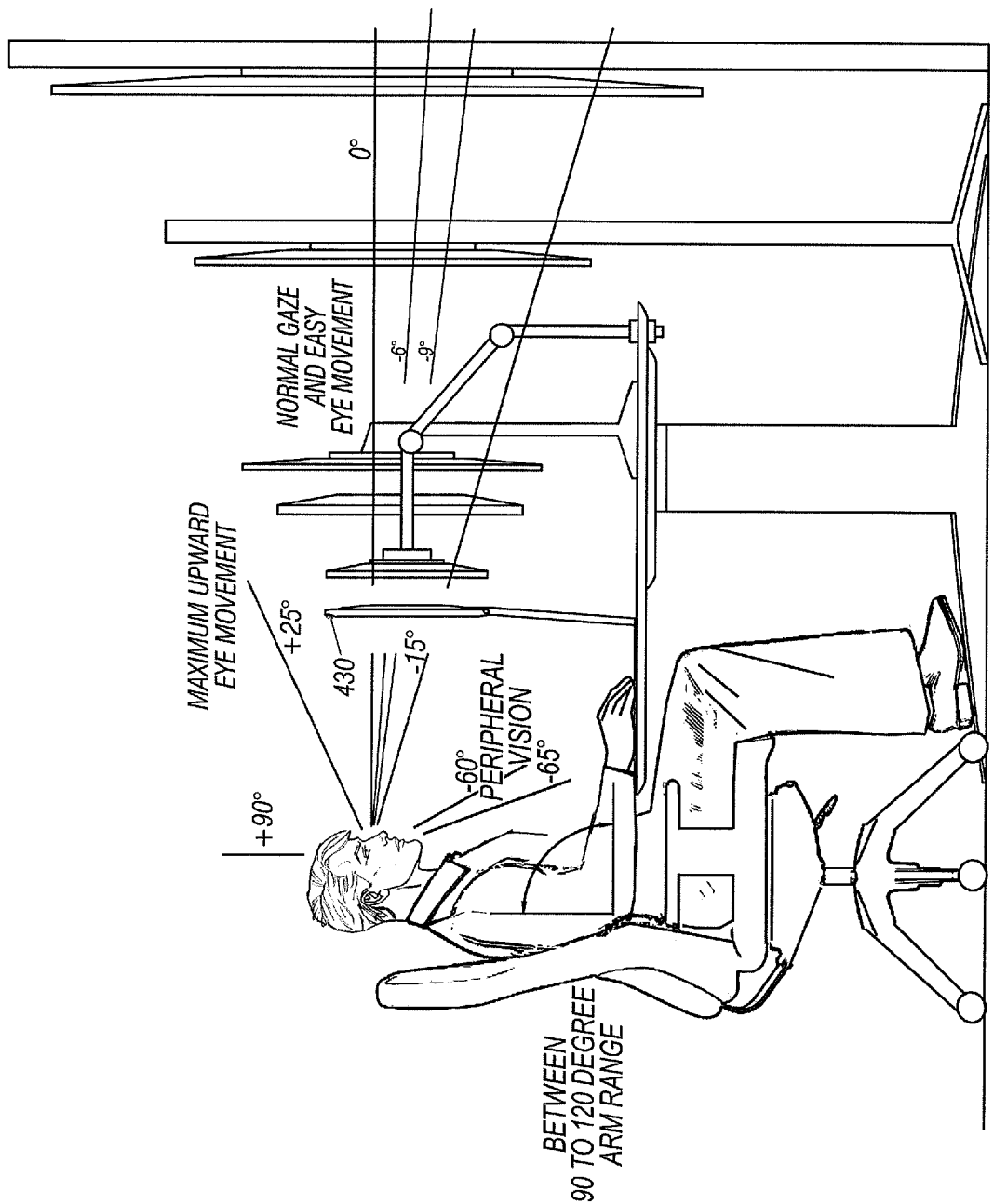
FIG. 35 is a side view illustrating the commonly accepted angles for peripheral vision.
Figure 36:
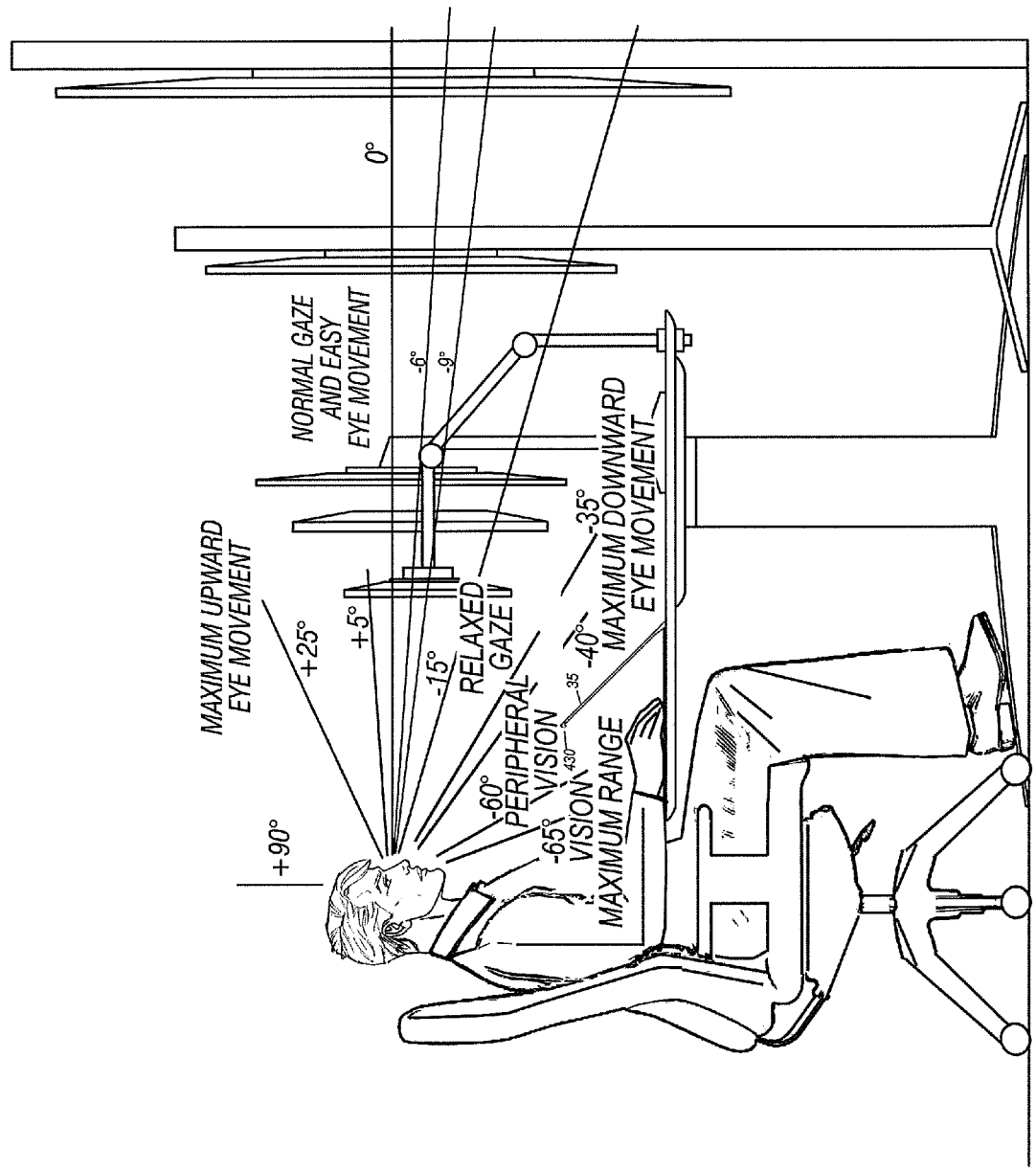
FIG. 36 is a side view illustrating the commonly accepted ergonomic set up for a computer user at a workstation.

FIG. 35 is a side view illustrating the commonly accepted angles for peripheral vision comprising between about 40° and about 60° for someone looking ahead straight at the 0° horizon line. FIG. 36 is a side view illustrating the commonly accepted ergonomic set up for a computer user at a workstation. This shows the use of an input cueing emmersion device either by itself as a standalone unit or in combination with a computer and display. As illustrated, the input cueing emmersion device is configured for use with these correct ergonomic guidelines.

Figure 37:
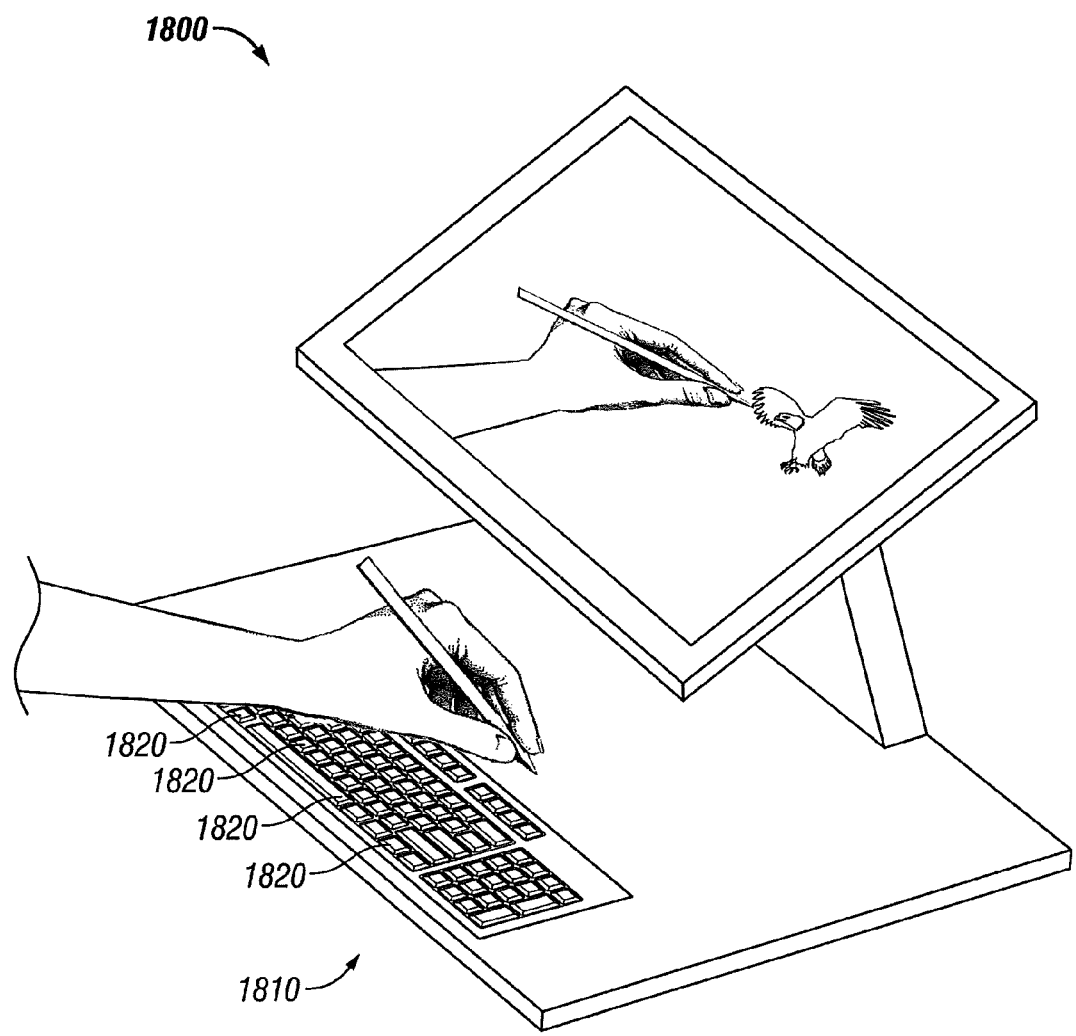
FIG. 37 illustrates an input cueing emmersion device having a keyboard with detents.

FIG. 37 illustrates an input cueing emmersion device 1800 having a keyboard 1810 with detents 1820, but not in use.

Figure 38:
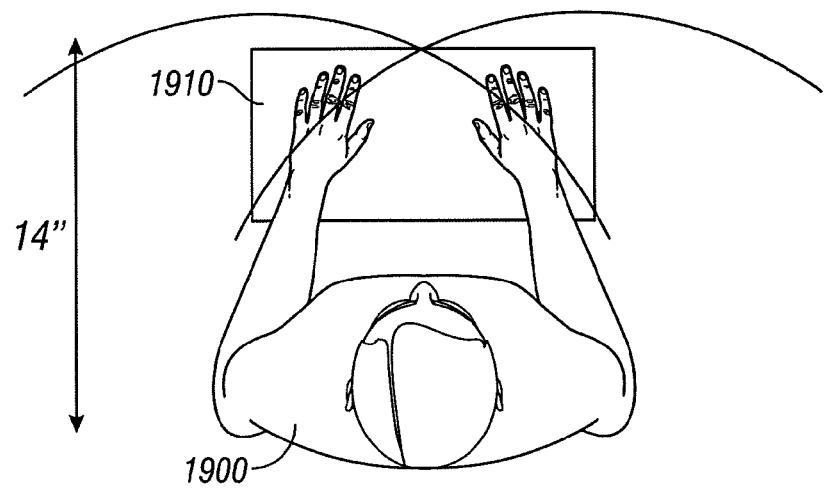
FIG. 38 is a top view illustrating the commonly accepted ergonomic arm reach and movement fields for a person sitting down and performing tasks on a desktop.
Figure 39:
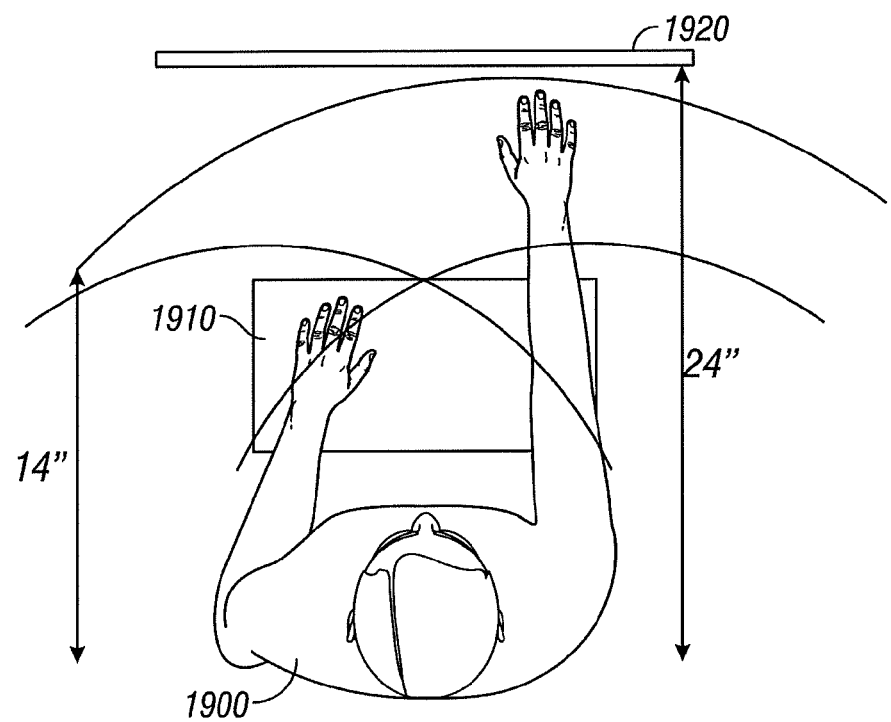
FIG. 39 is another top view illustrating the commonly accepted ergonomic arm reach and movement fields for a person sitting down and performing tasks on a desktop.

FIG. 38 is a top view illustrating the commonly accepted ergonomic arm reach and movement fields for a person 1900 sitting down and performing tasks on a desktop 1910. By way of example, the person 1900 may be a computer user at her workstation from a top view. As illustrated, the input cueing emmersion device is configured for use with these correct ergonomic guidelines. FIG. 39 is another top view illustrating the commonly accepted ergonomic arm reach and movement fields for person 1900 sitting down and performing tasks on desktop 1910. This also shows how a touch screen 1920 is uncomfortably farther away (24 inches) from the preferred 14 inches of arm reach.

Figure 40:
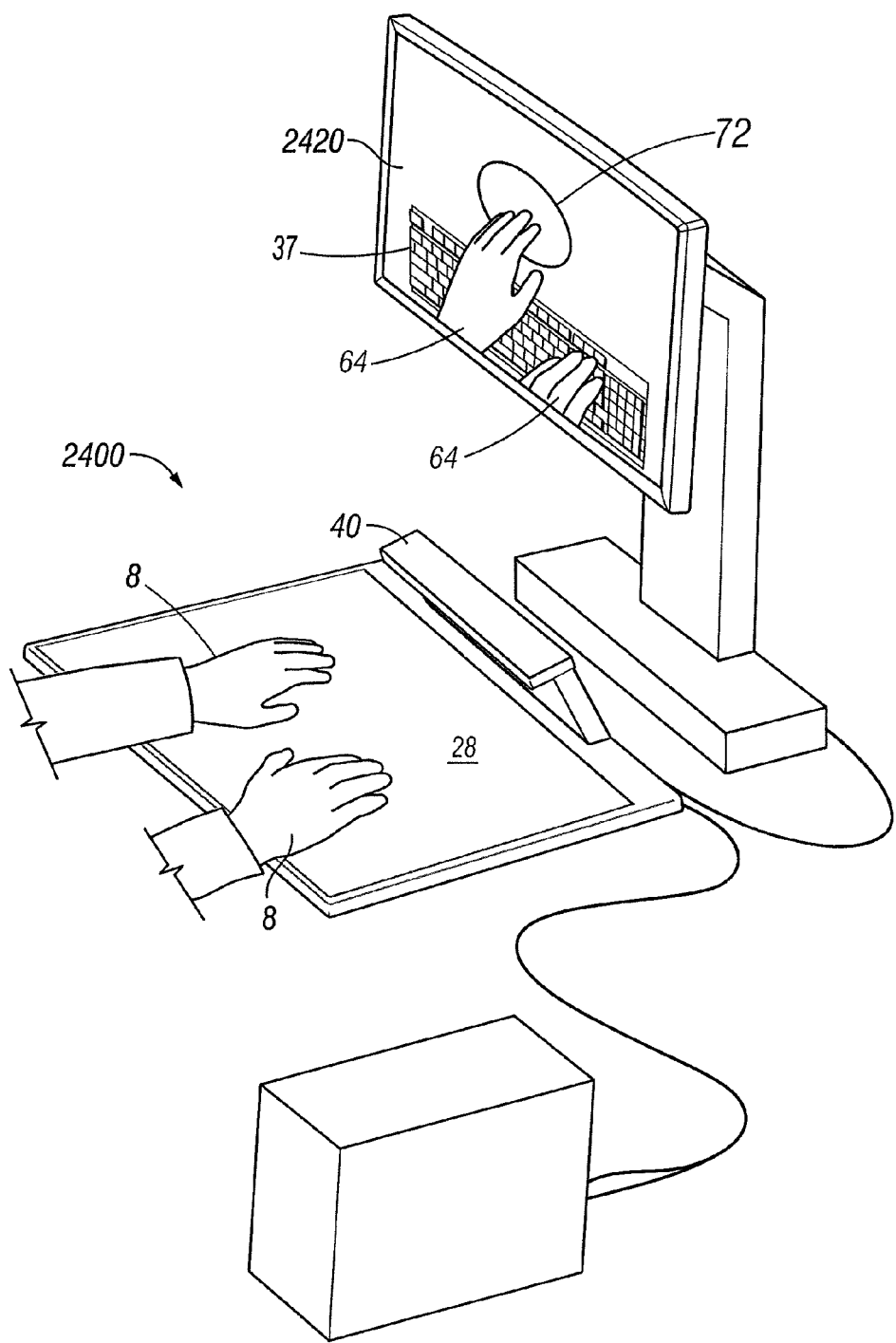
FIG. 40 is a perspective view of an input cueing emmersion device while a hand drawing is being created while observing the action on an external display.

FIG. 40 is a perspective view of an input cueing emmersion device 2000 with a hand drawing being created while the user observes the action on an external display 2010.

Figure 41:
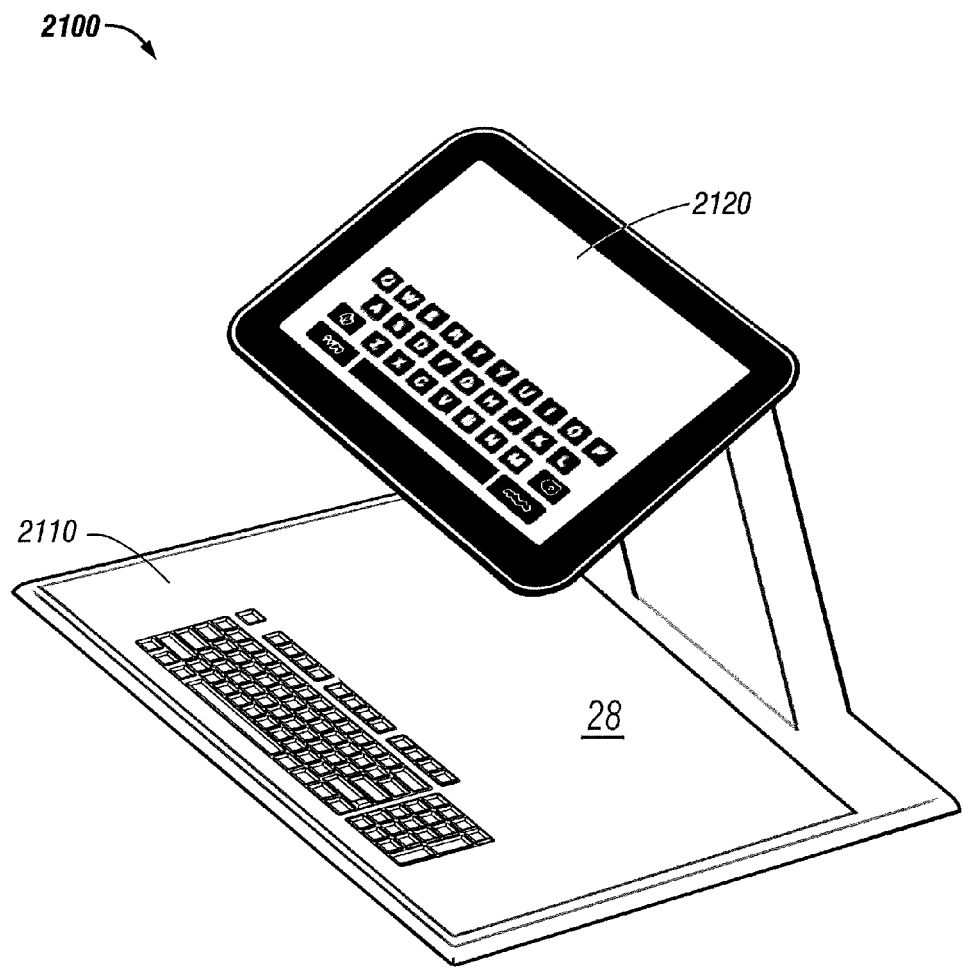
FIG. 41 illustrates an input cueing emmersion device with a unitized keyboard and input area.
Figure 42:
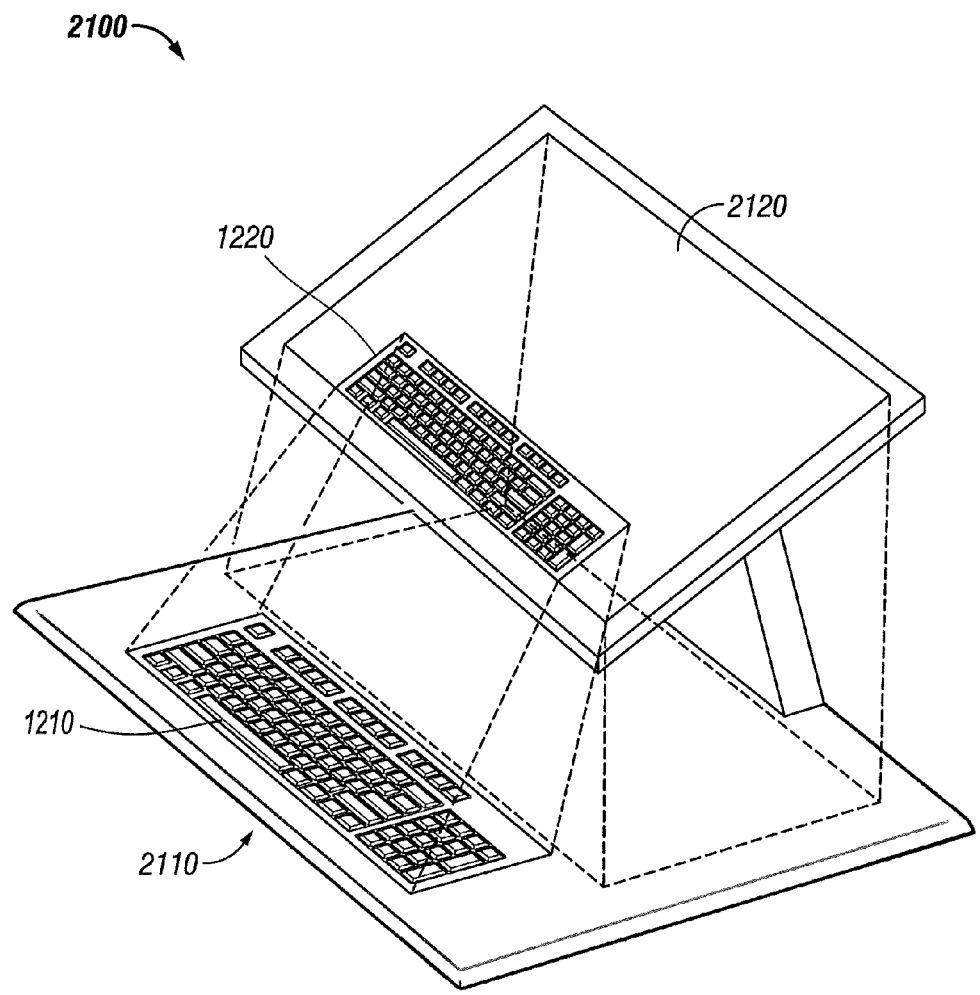
FIG. 42 illustrates an input cueing emmersion device having a dotted line from the input area to where it would be seen on a display.
Figure 43:
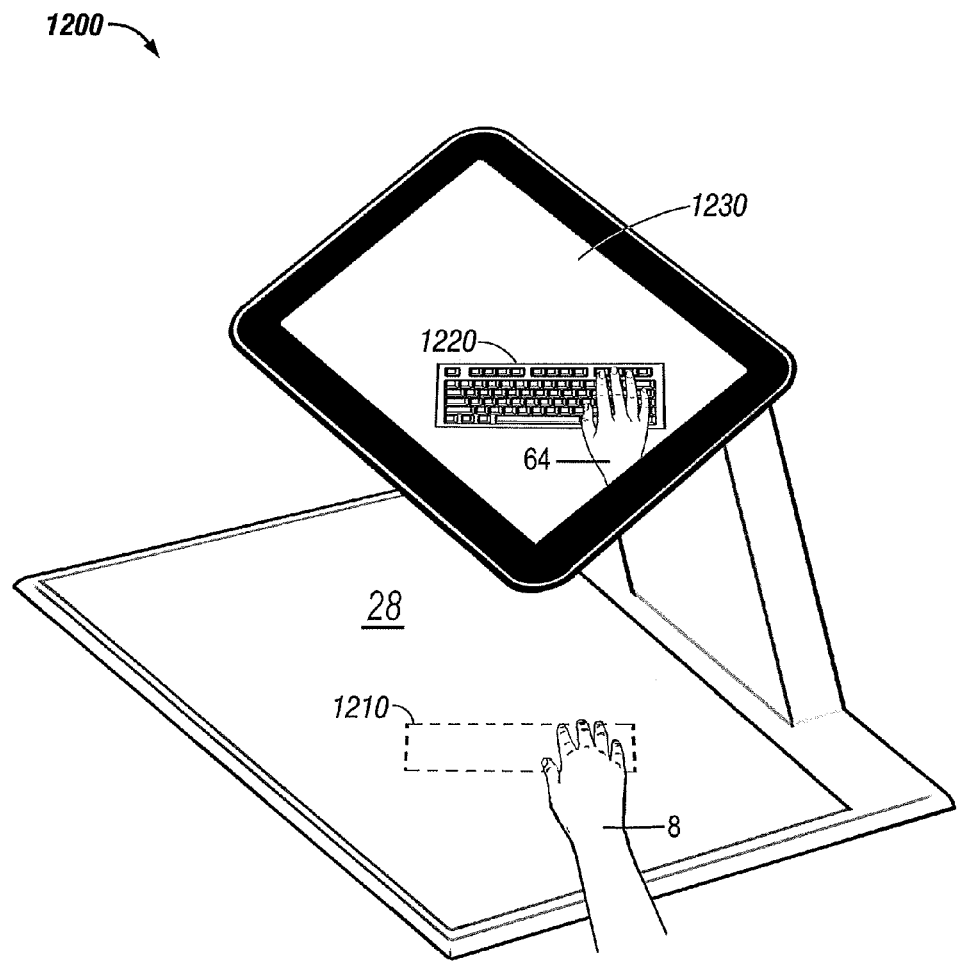
FIG. 43 illustrates another input cueing emmersion device having a dotted line from the input area to where it would be seen on a display.

FIG. 41 illustrates an input cueing emmersion device 2100 with a unitized keyboard and input area 2110 indents and/or bumps that provide a tactile finger homing function, as seen on display 2120. The indents or bumps are slight physical changes to the otherwise smooth, planar drawing surface. However, there are no crevices or separations to allow for easy cleaning and sanitizing. FIG. 42 illustrates the input cueing emmersion device 2100 having dotted lines from the input area 2110 to where it would be seen on display 2120. FIG. 43 illustrates another input cueing emmersion device 2200 having a dotted line from the input area 2210 to where it would be seen on display 2220.

Figure 44:
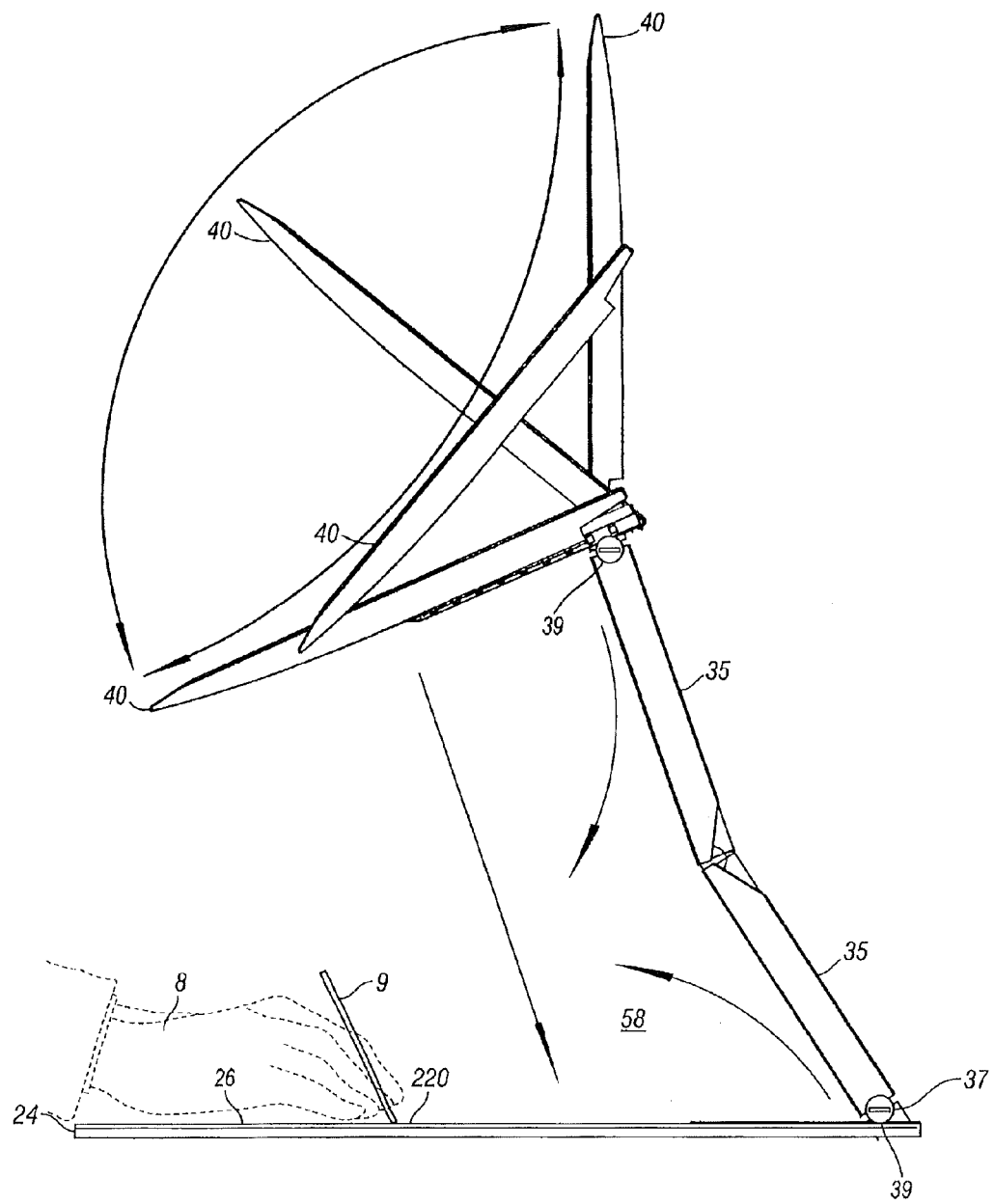
FIG. 44 is a side view of an input cueing emmersion device showing various opening and closing aspects of a display.
Figure 45:
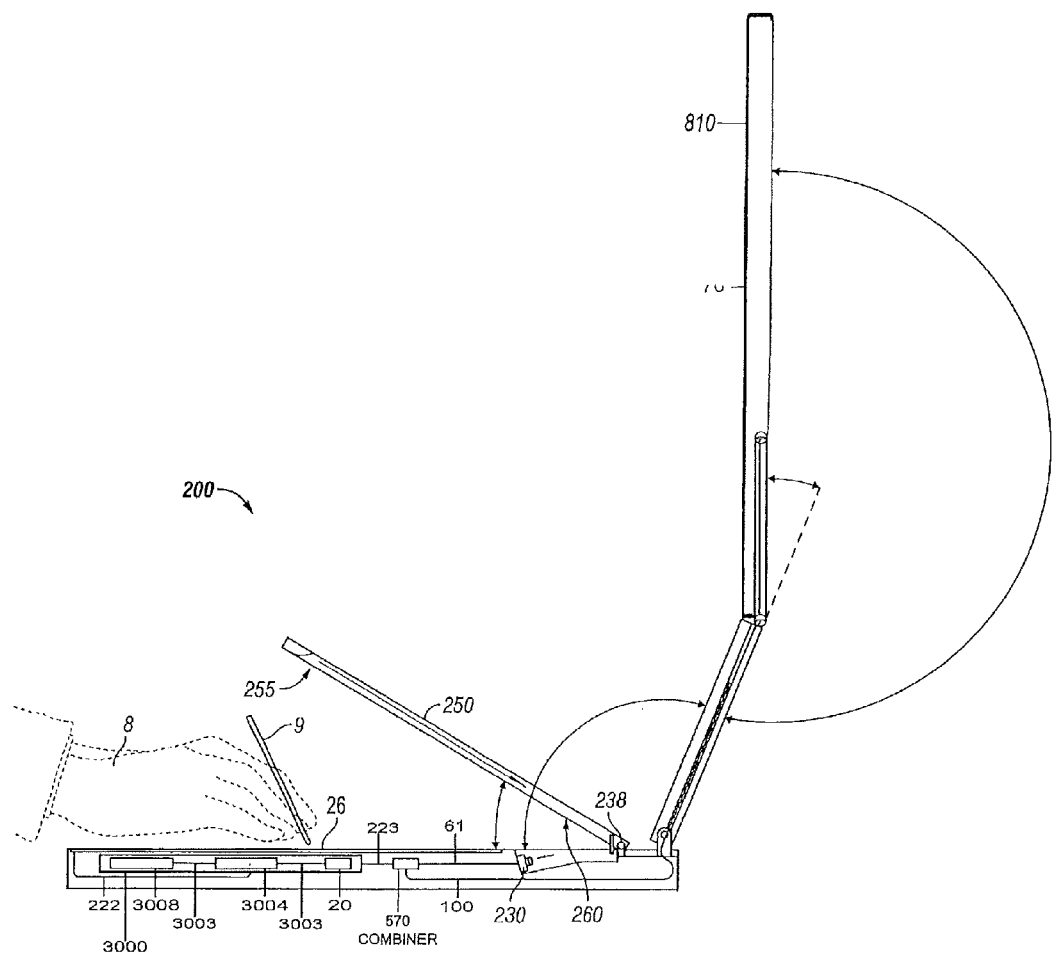
FIG. 45 is another side view of an input cueing emmersion device showing various opening and closing aspects of a display.

FIG. 44 is a side view of an input cueing emmersion device 2300 showing opening and closing aspects of a display 2310. This illustrates one style of an opened position of the display 2310 that is more comfortable and ergonomically friendly. The display 2310 is roughly at the height of a more common desktop eye viewing level and not the lower display level that is common to laptops. FIG. 45 is another side view of the input cueing emmersion device 2300 showing another style of an opened position of the display 2310 that is also comfortable and ergonomically friendly.

Figure 46:
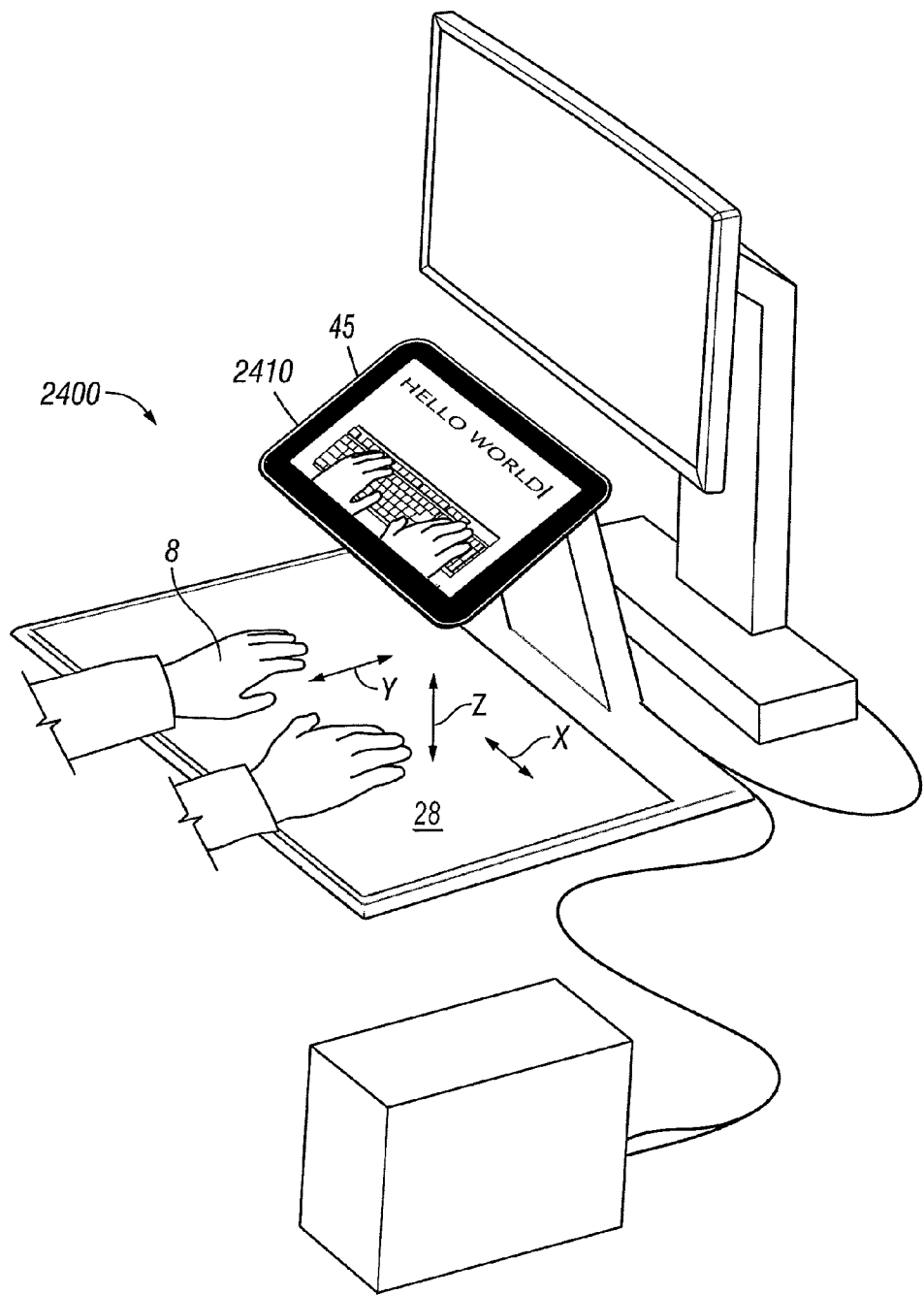
FIG. 46 is a perspective view of an input cueing emmersion device in an opened configuration with hands typing.
Figure 47:
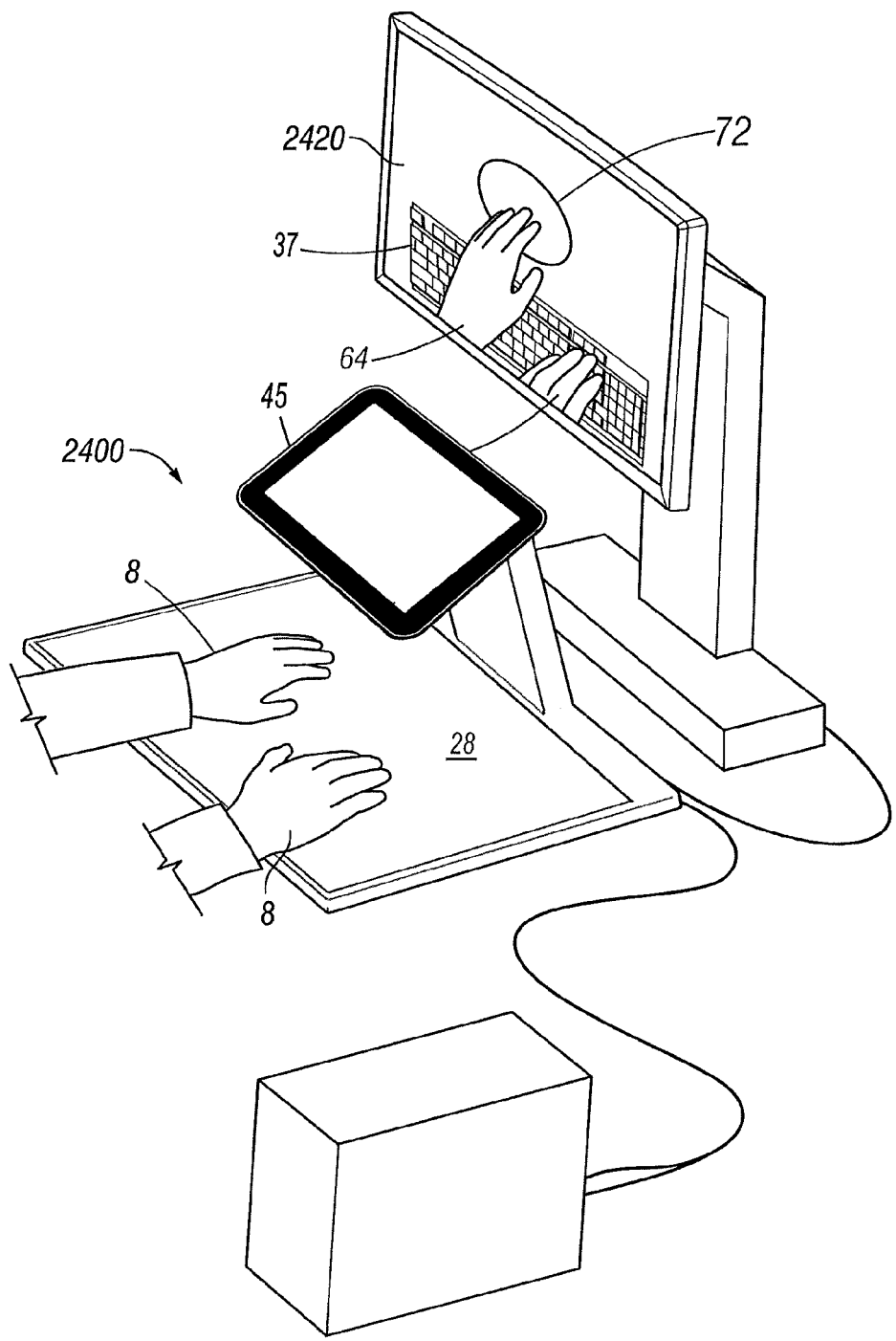
FIG. 47 is a perspective view of an input cueing emmersion device, wherein the computer operator's right hand is typing and the left hand is pressing a virtual button.
Figure 48:
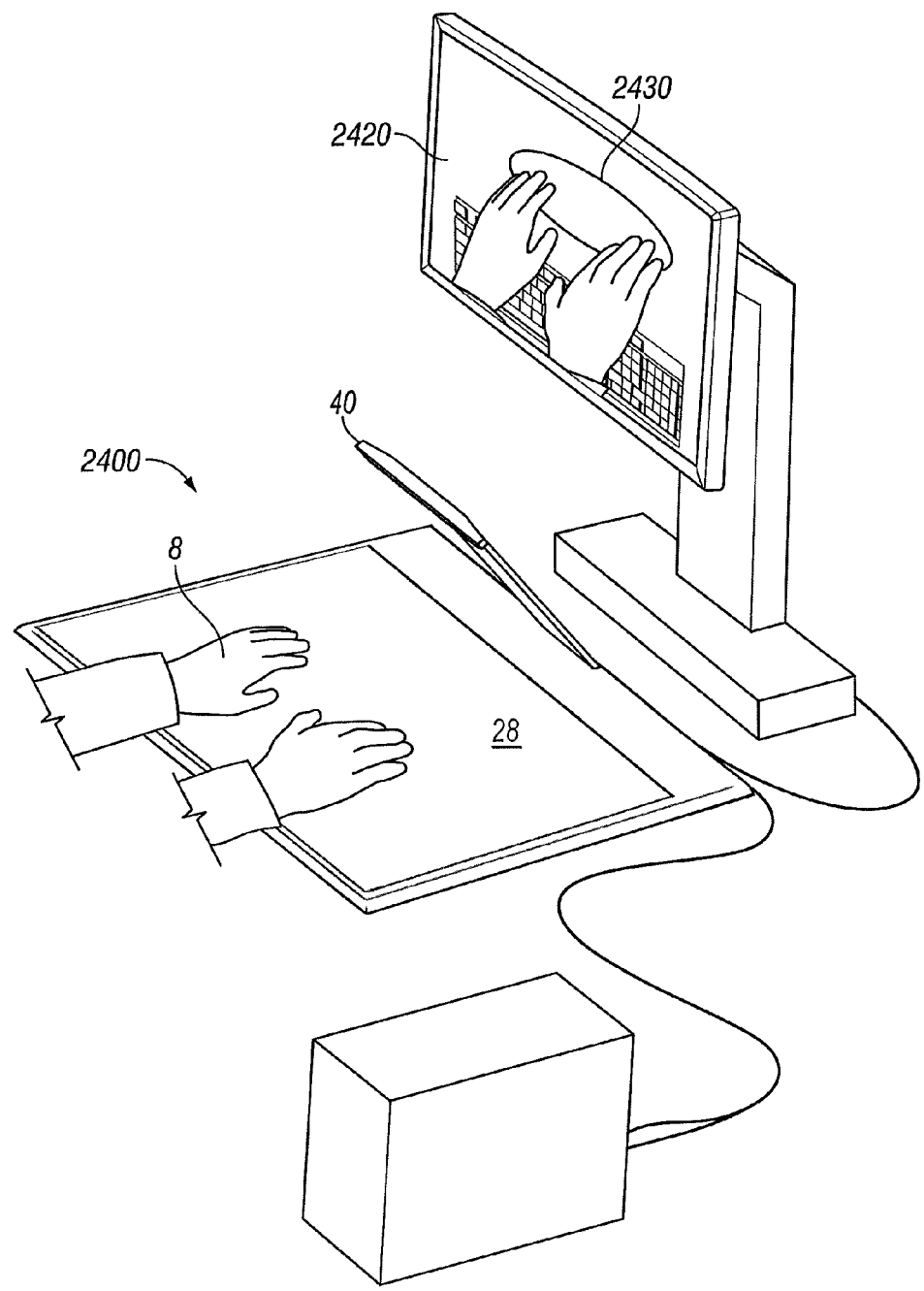
FIG. 48 is a perspective view of an input cueing emmersion device, wherein the computer operator's left and right hands are manipulating a virtual image.

FIG. 46 is a perspective view of an input cueing emmersion device 2400 in an opened configuration with hands typing. This input cueing emmersion device shows a computer operator's hands 8 typing while the user observes the action on a built-in display screen 2410. FIG. 47 is a perspective view of input cueing emmersion device 2400, wherein the computer operator's right hand is typing and the left hand is pressing a virtual button while observing the action on an external display 2420. FIG. 48 is a perspective view of input cueing emmersion device 2400, wherein the computer operator's left and right hands are manipulating a virtual image 2430 and observing the action on external display 2420.

Figure 49:
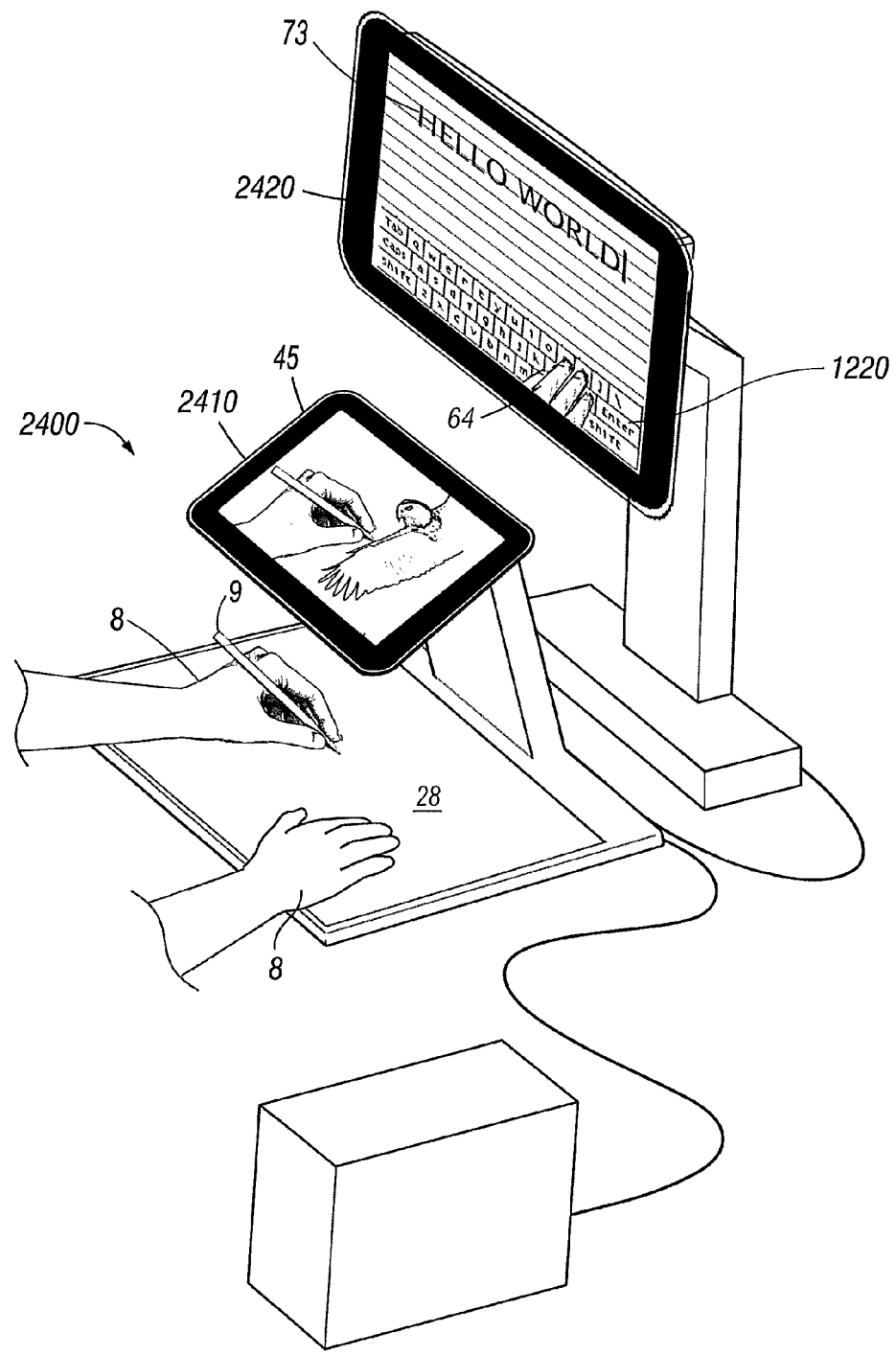
FIG. 49 is a perspective view of an input cueing emmersion device, wherein the computer operator's right hand is typing and the left hand is drawing.
Figure 50:
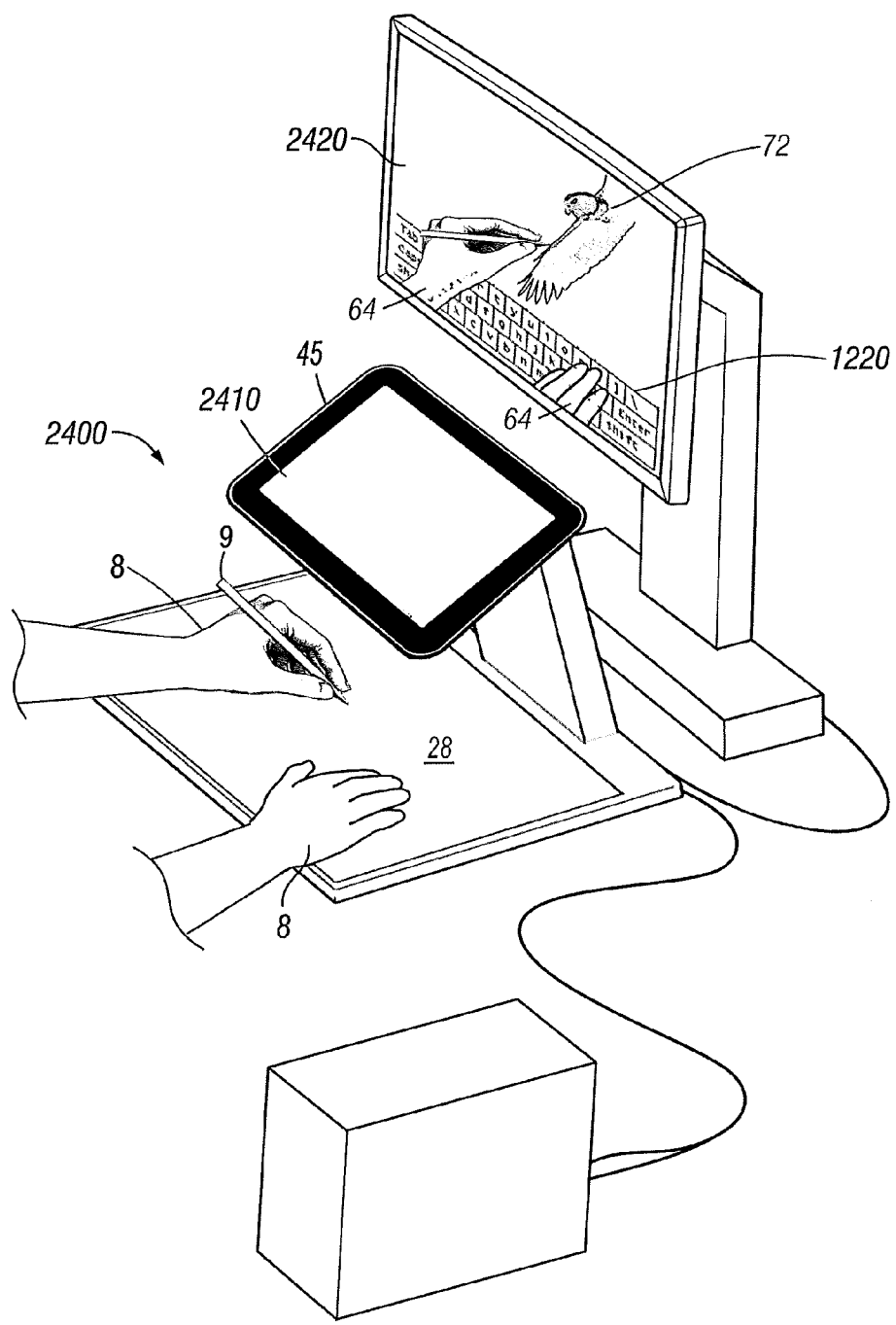
FIG. 50 is a perspective view of an input cueing emmersion device, wherein the computer operator's right hand is typing and the left hand is drawing.
Figure 51:
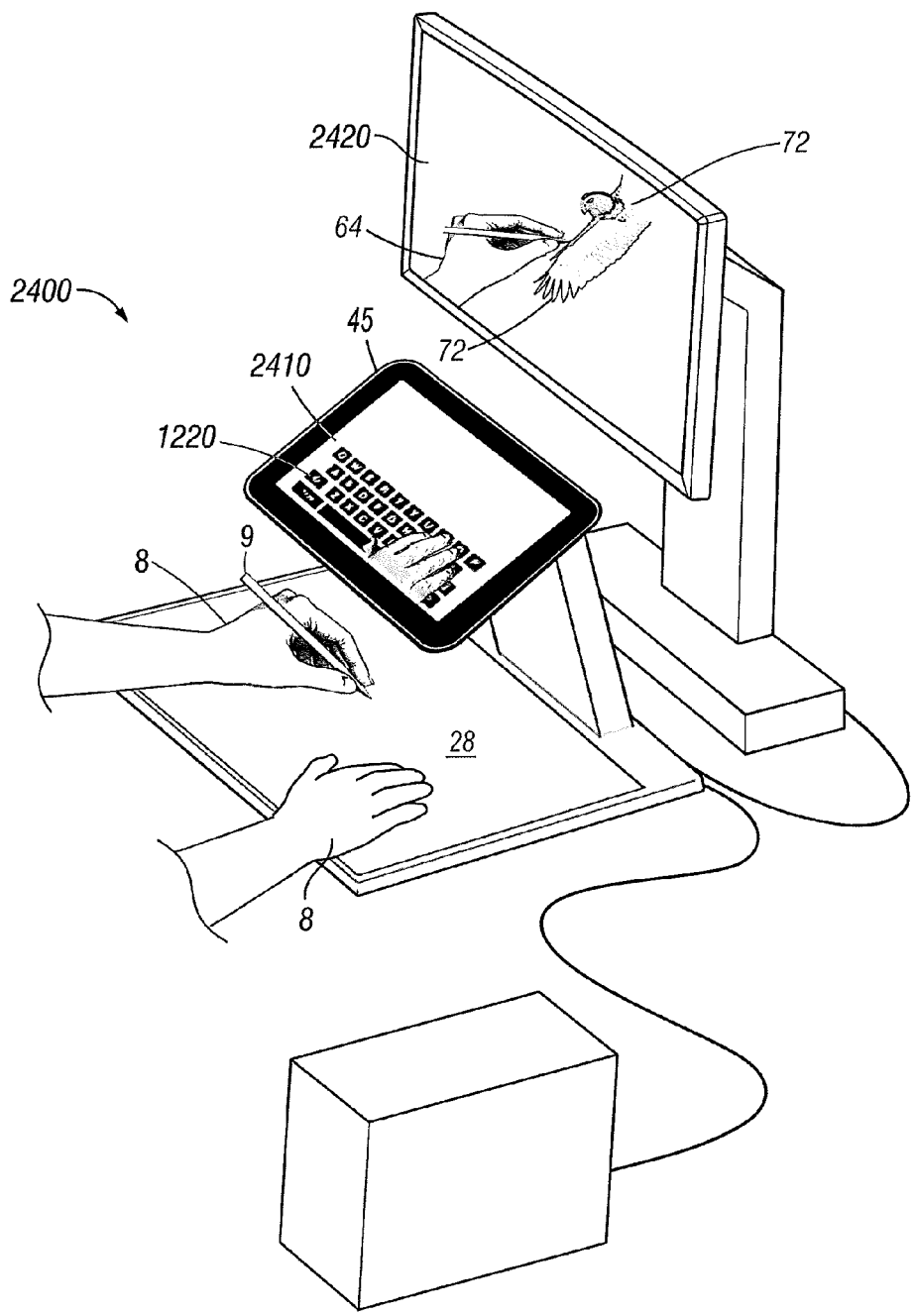
FIG. 51 is a perspective view of an input cueing emmersion device, wherein the computer operator's right hand is typing and the left hand is drawing.

FIG. 49 is a perspective view of an input cueing emmersion device 2400, wherein the computer operator's right hand is typing while observing that action on external display 2420, and wherein the left hand is drawing using stylus 9 while observing the action on an on built-in screen 2410. FIG. 50 is a perspective view of input cueing emmersion device 2400, wherein the computer operator's right hand is typing while observing that action on external display 2420 and the left hand is drawing using stylus 9 while observing that action on external display 2420. FIG. 51 is a perspective view of input cueing emmersion device 2400, wherein the computer operator's right hand is typing while observing that action on built-in screen 2410 and the left hand is drawing using stylus 9 and observing the action on an on external display 2420.

Figure 52:
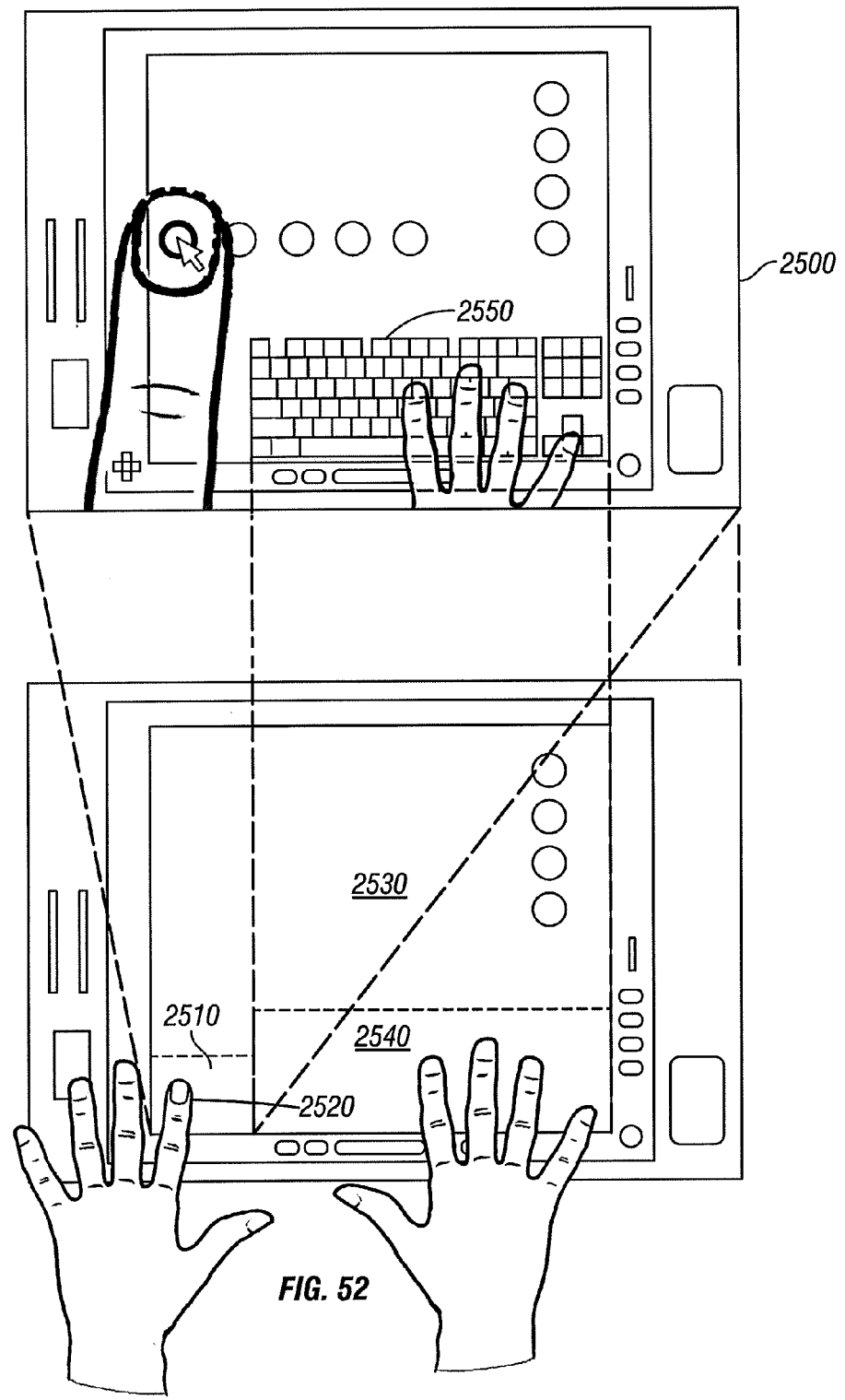
FIG. 52 illustrates a display and an area designated for a small input device such as a finger 2520.

FIG. 52 illustrates a display 2500 and an area 2510 designated for a small input device such as a finger 2520 so the contents of the entire display 2500 can be accessed with the small movements of the finger 2520. This area 2510 is overlapped with a second and possibly larger input area 2530 that provides drawing input. A third overlapped input area 2540 may be provided for a virtual keyboard 2550 seen on the display 2500.

Figure 53:
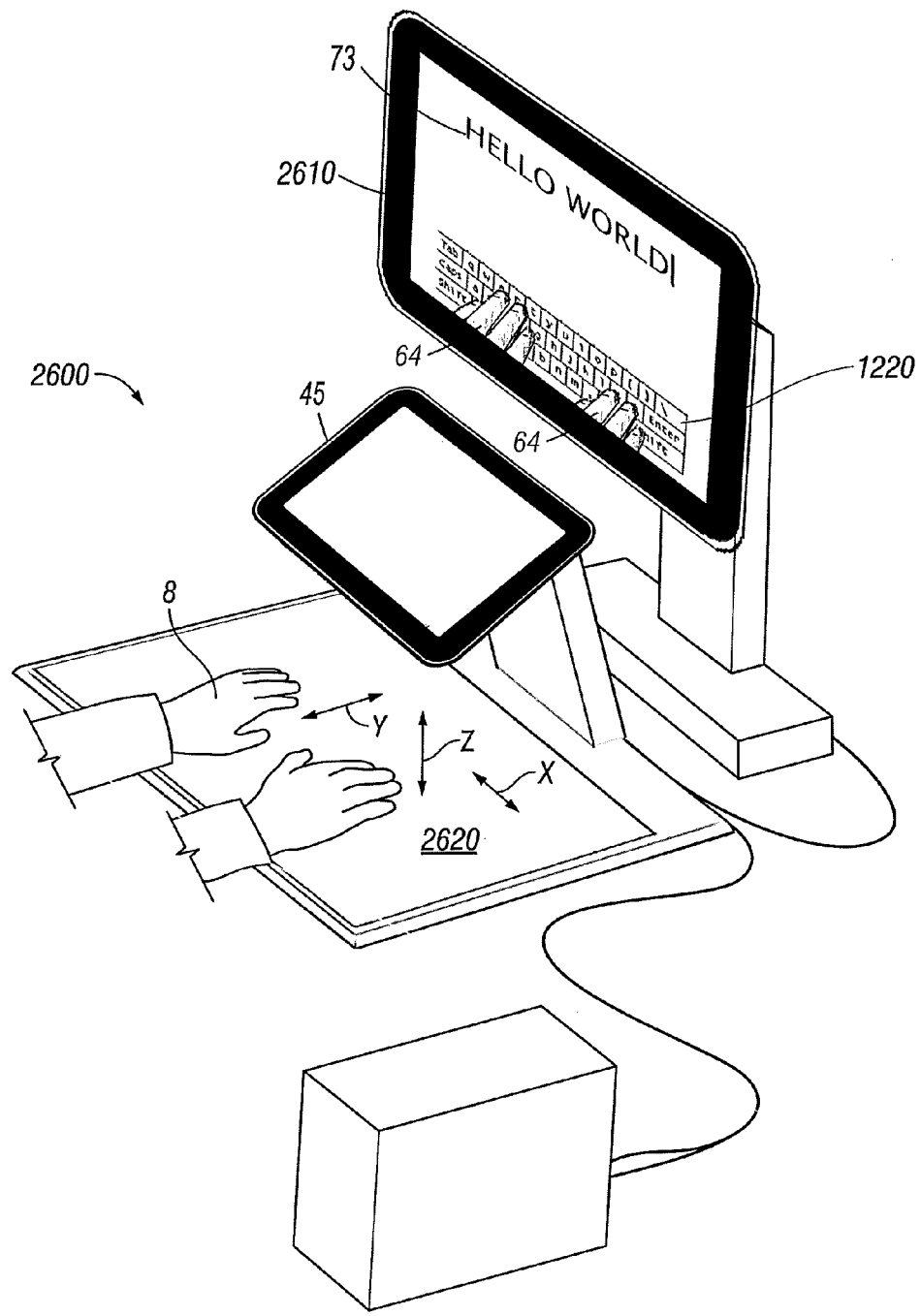
FIG. 53 illustrates an input cueing emmersion device and a computer operator's hands typing.

FIG. 53 illustrates an input cueing emmersion device 2600 and a computer operator's hands 8 typing while observing the action on an external display 2610. It also shows the X, Y axis of input area 2620.

Figure 54:
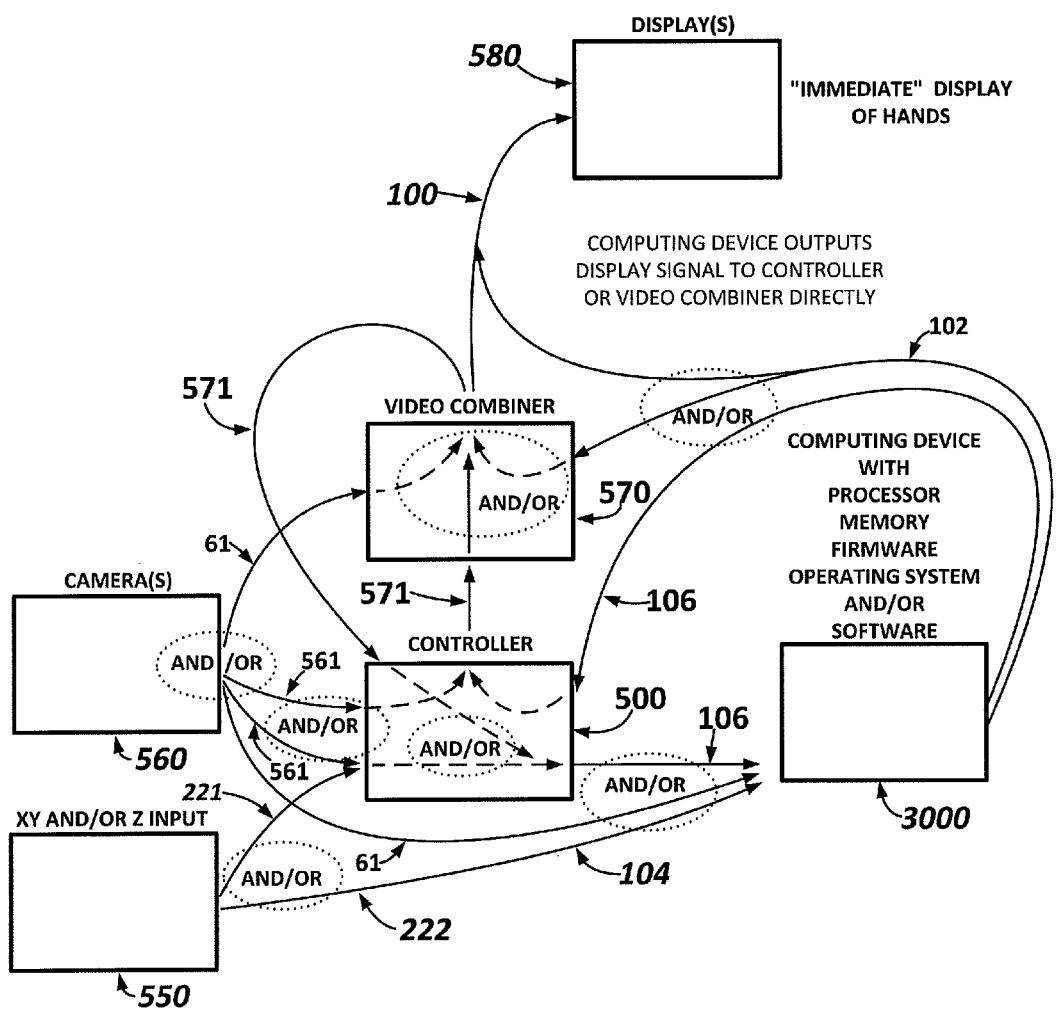
FIG. 54 is a block diagram showing the components used in the hand cueing input system showing in FIGS. 1 and 2.

FIG. 54 is a system schematic illustrating, among other things, (i) the transmission line of video signal out of computer to the input cueing emmersion device, (ii) the transmission line of input signal to the computer, and (iii) the transmission line of combined video signal to the display or monitor. In some embodiments, (i) and (ii) may be combined to be one cable (i.e., USB). In further embodiments, all three transmission lines may be could be wireless.

Figure 55:
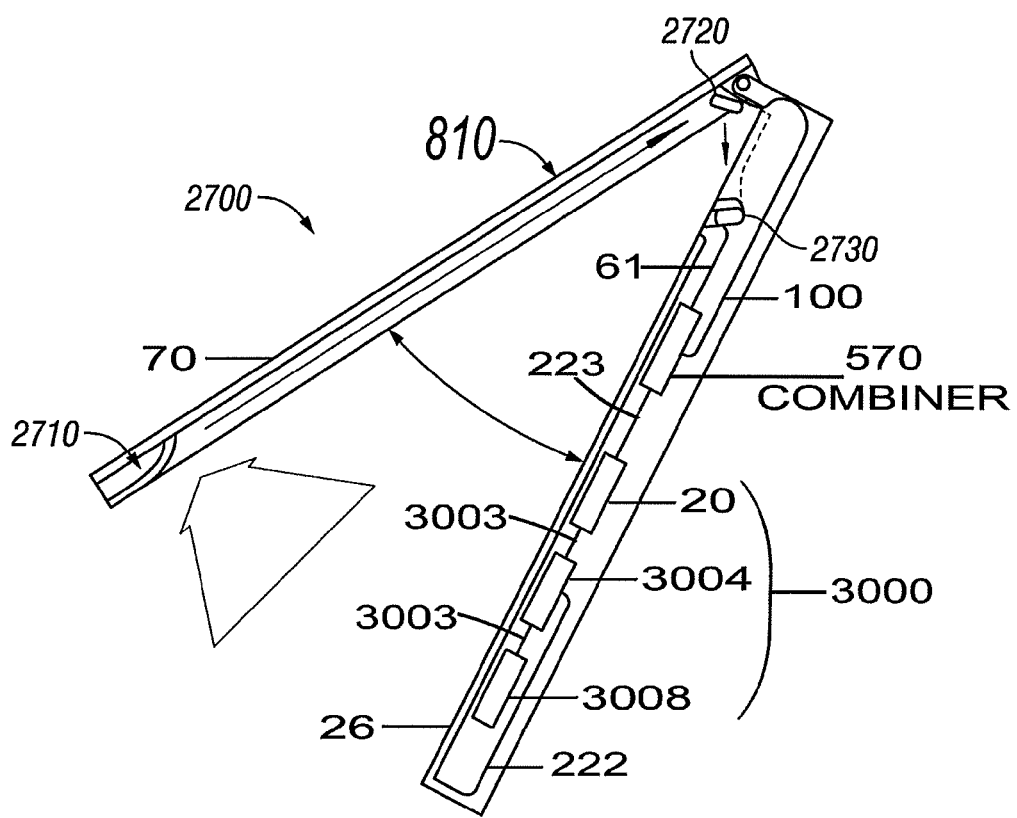
FIG. 55 is a side view illustrating a hand held input cueing emmersion device having two image transfer devices and one image capturing device.
Figure 56:
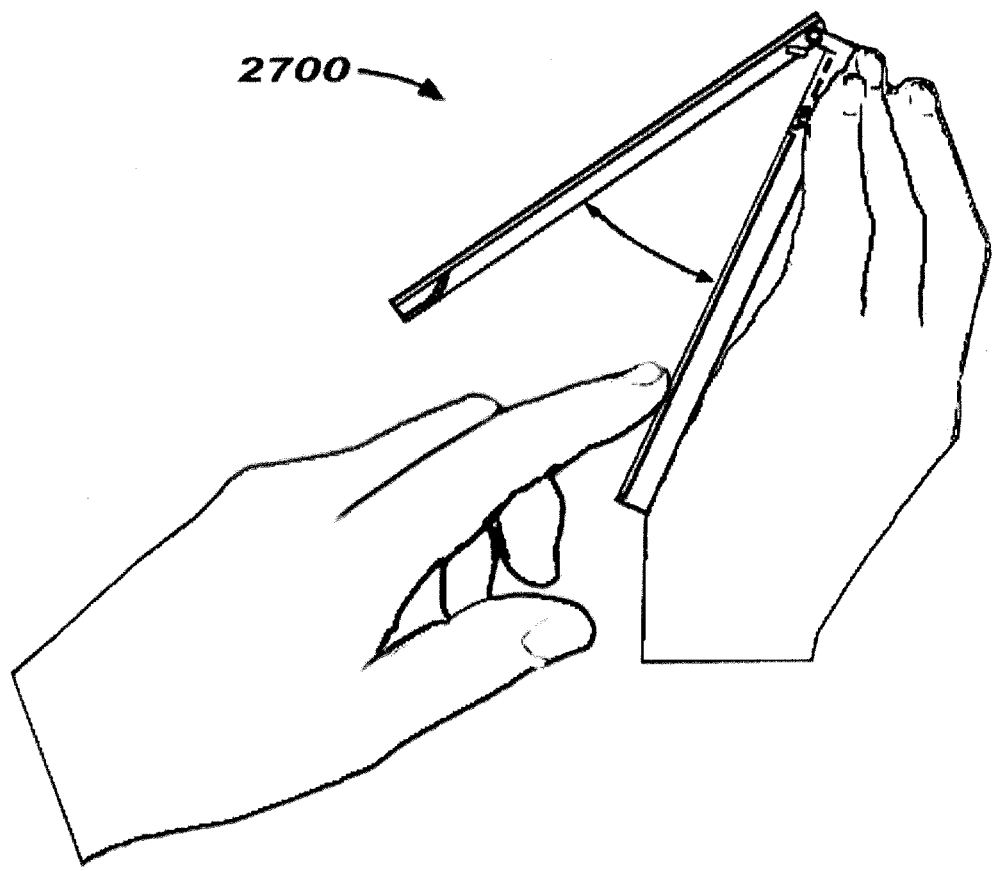
FIG. 56 is a side view illustrating hand held input cueing emmersion device 2700 being held in a hand 8 and being operated with a finger 2740.
Figure 57:
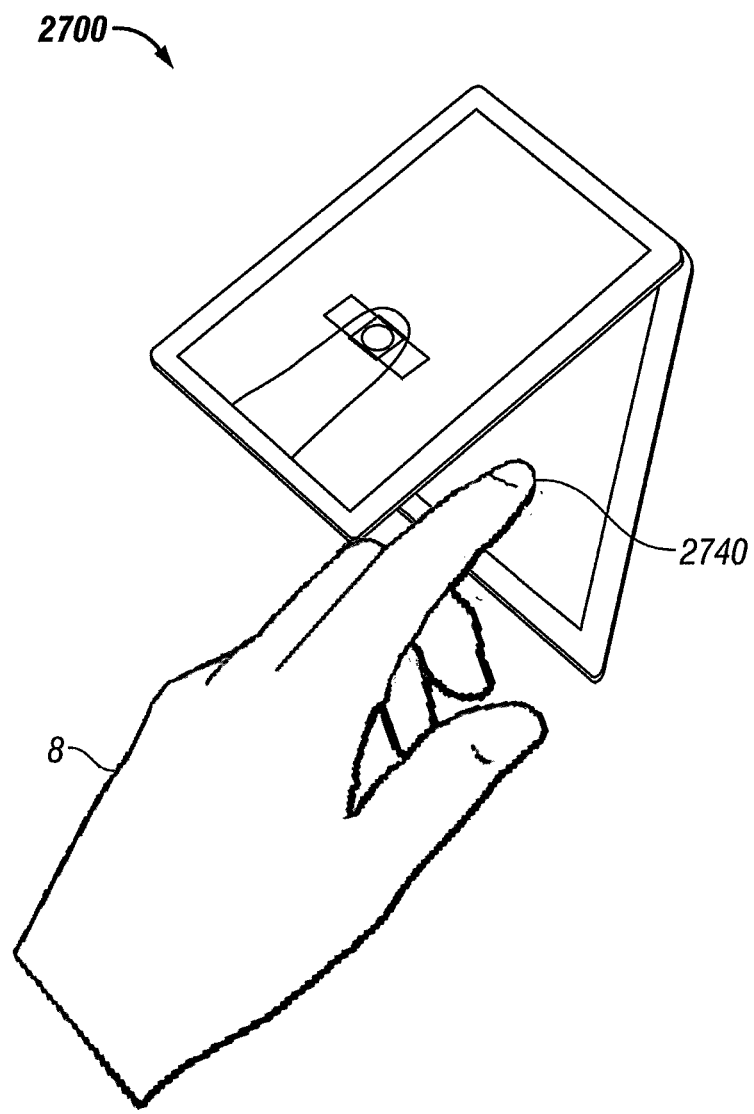
FIG. 57 is a perspective view illustrating hand held input cueing emmersion device 2700 having a "clam shell" form factor and being operated with finger 2740.

FIG. 55 is a side view illustrating a hand held input cueing emmersion device 2700 having two image transfer devices (i.e., mirrors 2710 and 2720) and one image capturing device (i.e. camera 2730). FIG. 56 is a side view illustrating hand held input cueing emmersion device 2700 being held in a hand 8 and being operated with a finger 2740. FIG. 57 is a perspective view illustrating hand held input cueing emmersion device 2700 having a "clam shell" form factor and being operated with finger 2740.

Figure 58:
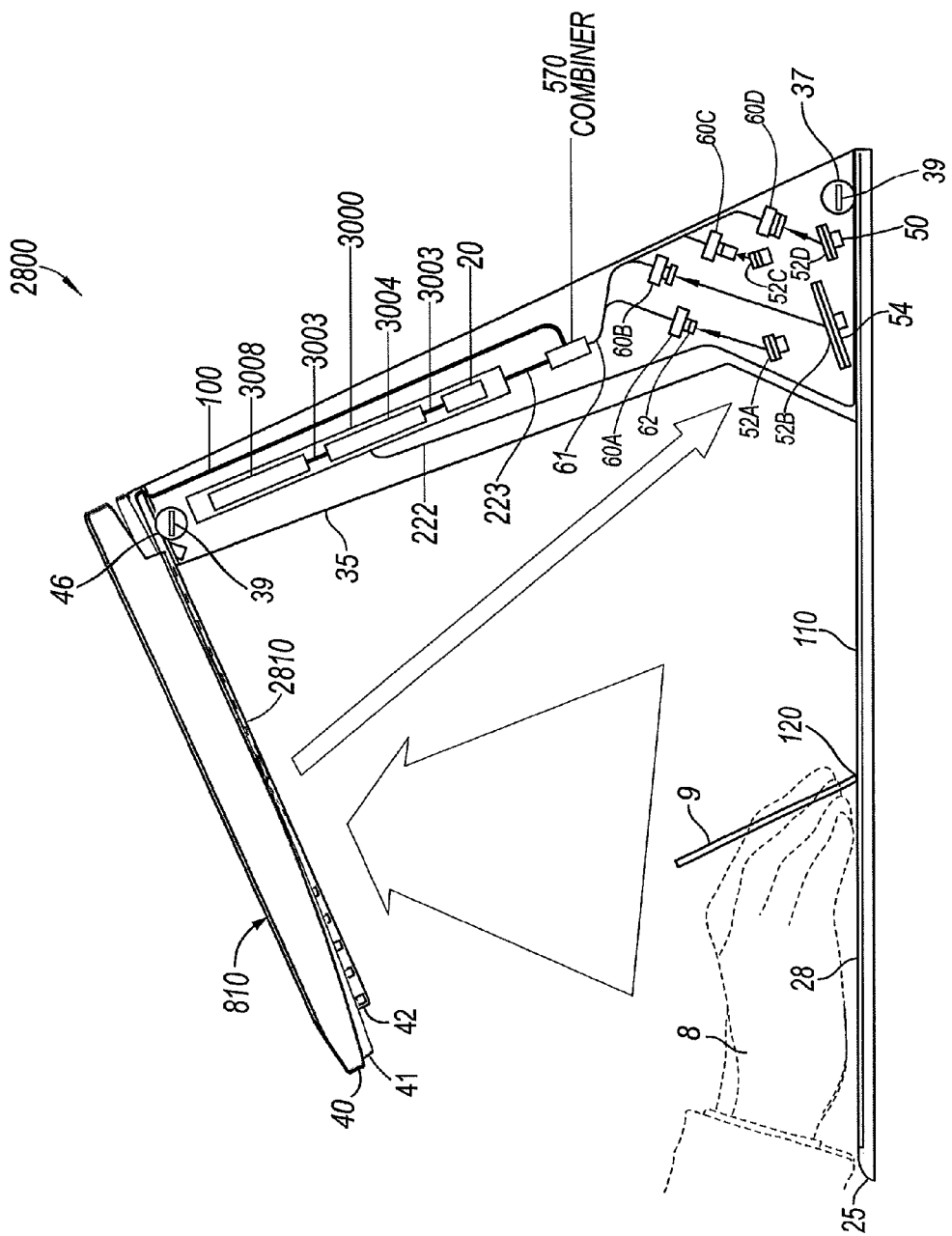
FIG. 58 is a side view illustrating a standalone hand held input cueing emmersion device that operates by itself and includes an internal display.

FIG. 58 is a side view illustrating a standalone hand held input cueing emmersion device 2800 that operates by itself and includes an internal display 2810.

Figure 59:
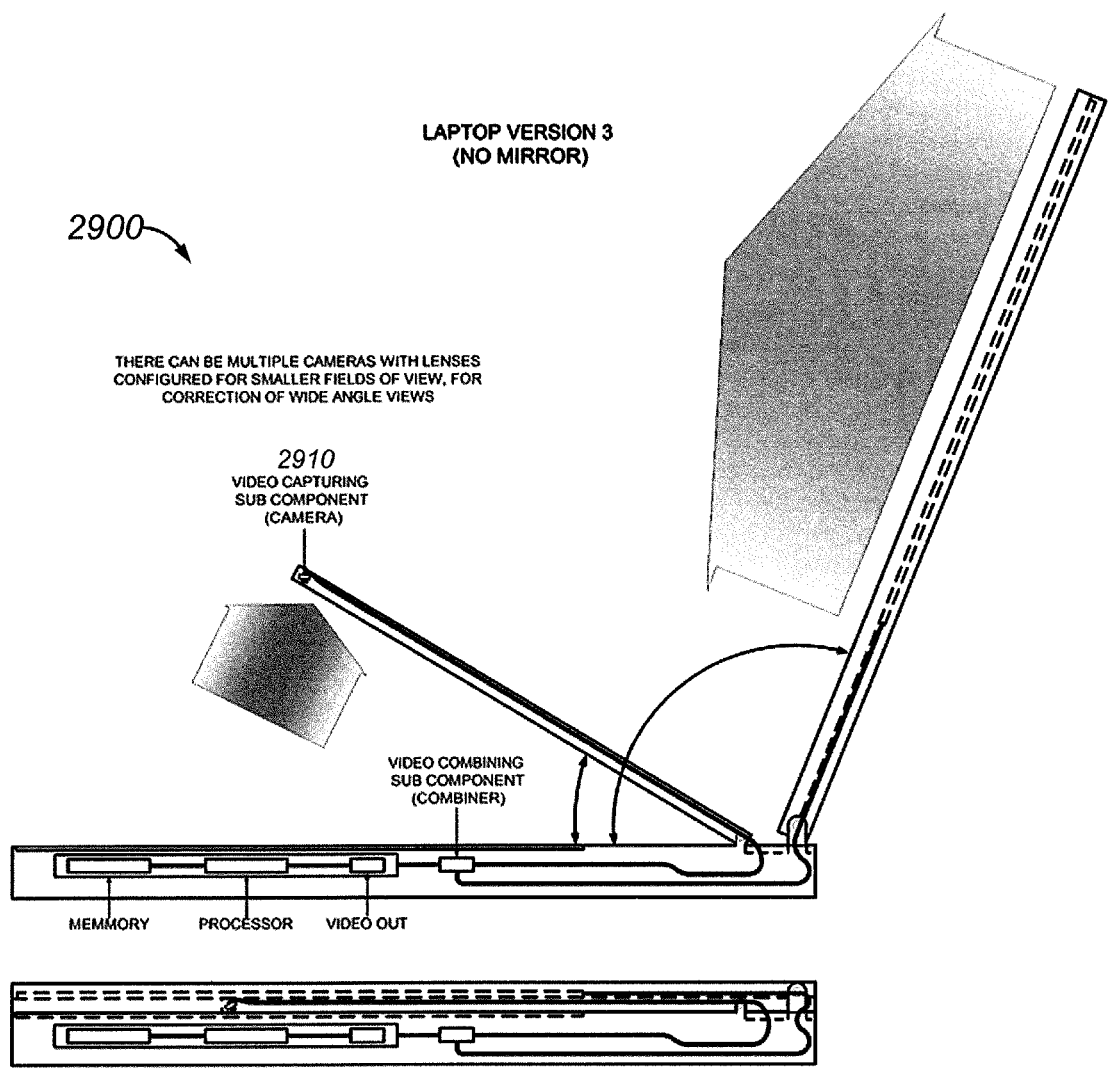
FIG. 59 is a side view illustrating a laptop hand held input cueing emmersion device having only one image capturing device with no image transfer device.

FIG. 59 is a side view illustrating a laptop hand held input cueing emmersion device 2900 having only one image capturing device (i.e. camera 2910) with no image transfer device (i.e. no mirror).

Figure 60:
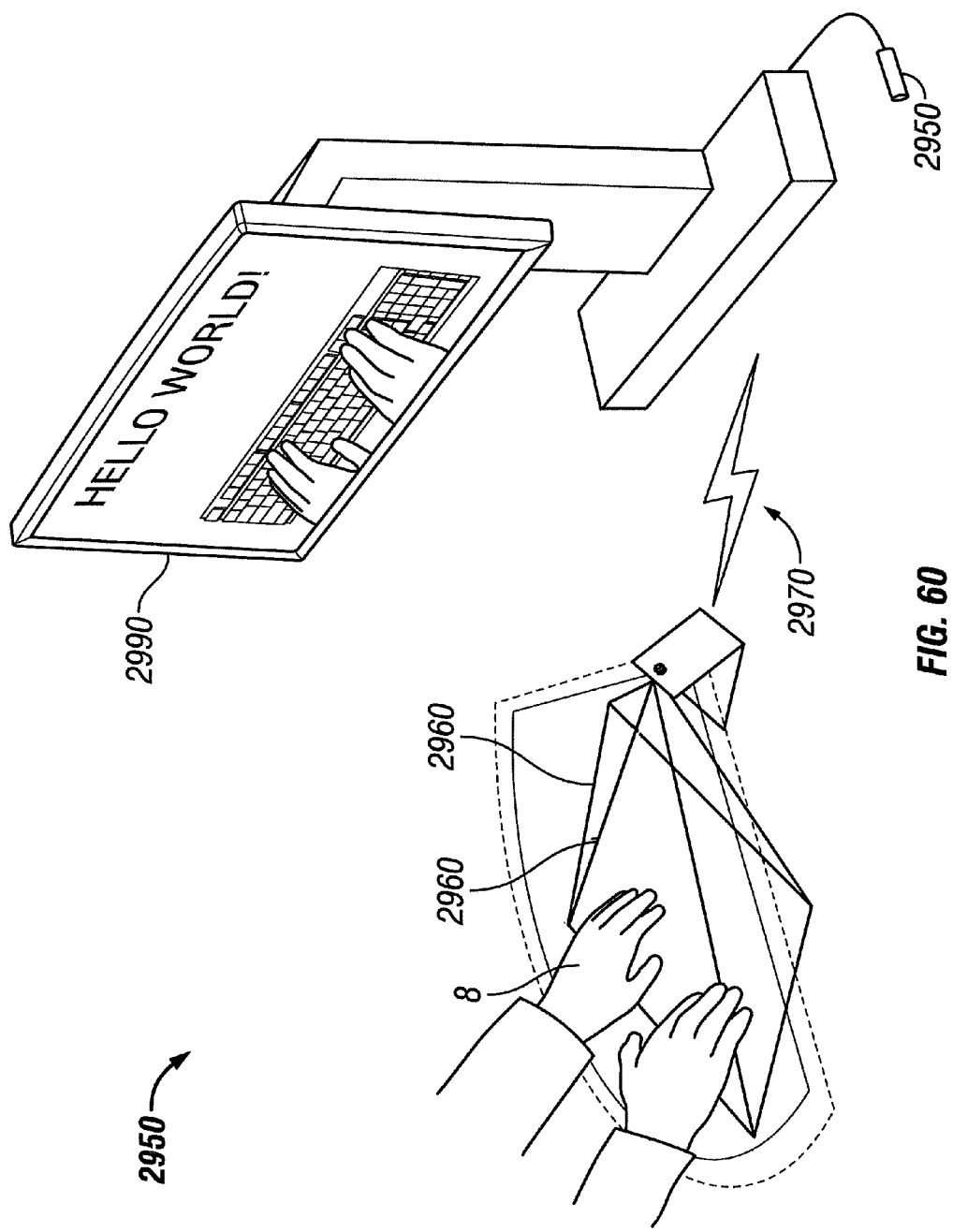
FIG. 60 illustrates a small pocket sized PDA, Smartphone and/or computer having a laser or LED.

FIG. 60 illustrates a small pocket sized PDA, Smartphone and/or computer having a laser 2950 or LED and/or other marking to outline a "frame" to outline an input area 2960 is for input such as drawing, typing, point-in-clicking, and gesturing with physics. This can be accompanied by simulated key click sounds or not, with the hands 8 being captured visually and combined with computer video output and then transmitted wirelessly 2970 to display output using, e.g., radio frequency, Wi-Fi, Bluetooth, infrared etc.

Figure 61:
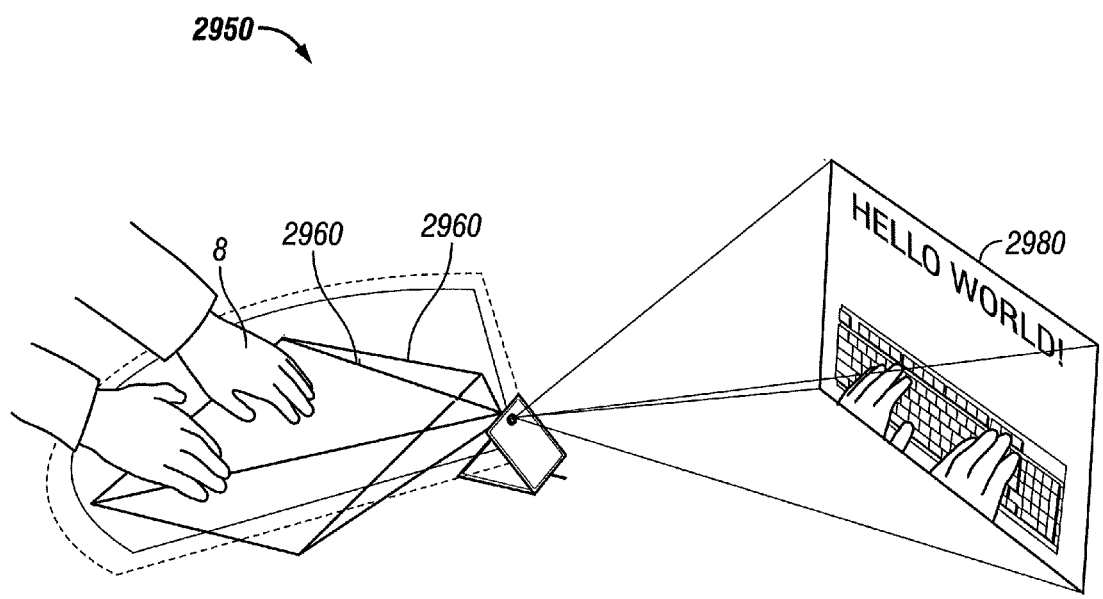
FIG. 61 illustrates a small pocket sized PDA, Smartphone and/or computer having a laser or LED with computer video output projected in space to a vertical planar surface.

FIG. 61 illustrates a small pocket sized PDA, Smartphone and/or computer having a laser 2950 or LED and/or other marking to outline a "frame" to outline an input area 2960 is for input such as drawing, typing, point-in-clicking, and gesturing with physics. This can be accompanied by simulated key click sounds or not, with the hands 8 being captured visually and combined with computer video output and then projected in space to a preferred vertical planar surface 2980.

Figure 62:
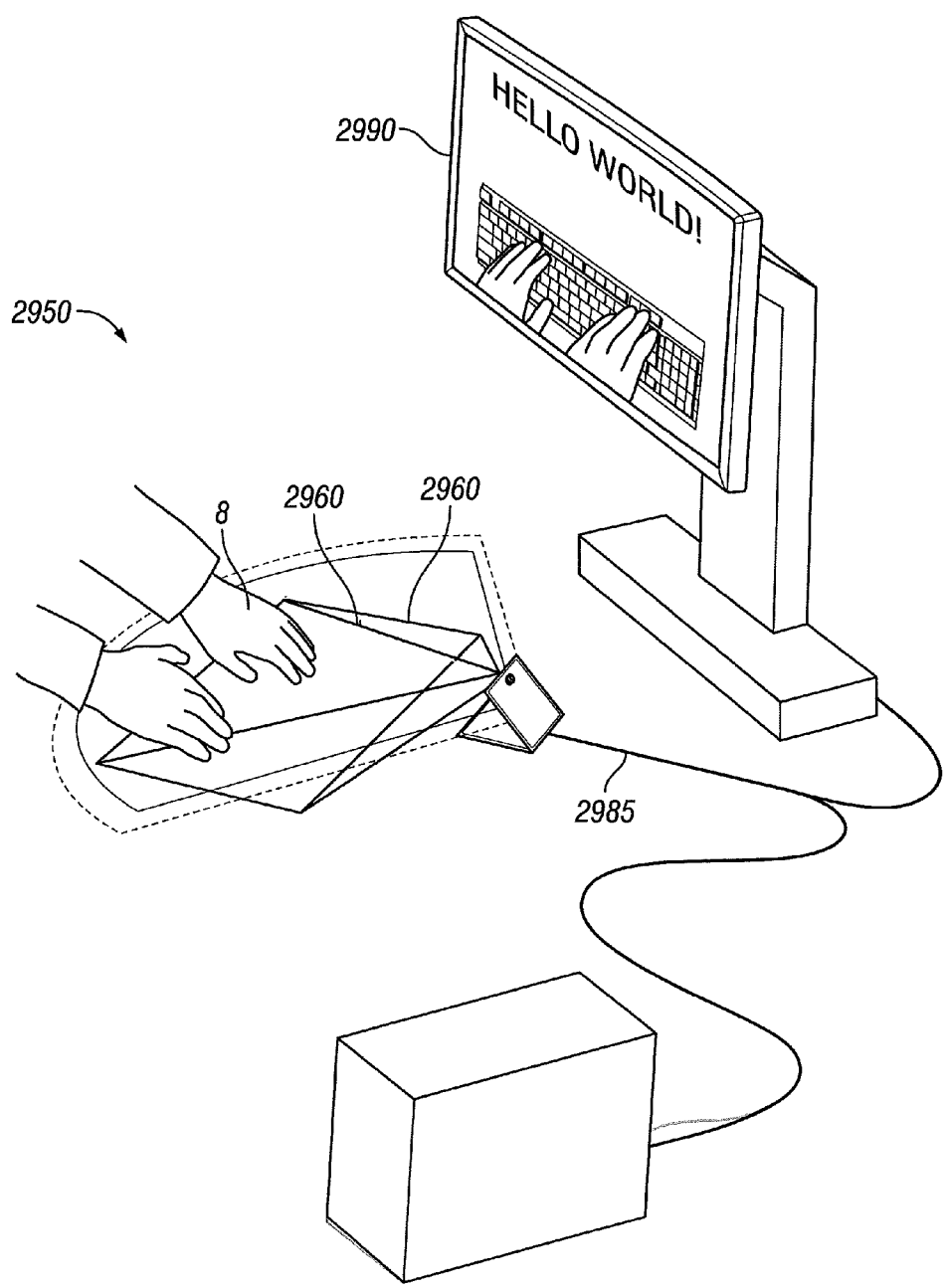
FIG. 62 illustrates a small pocket sized PDA, Smartphone and/or computer having a laser or LED, and a connectable temporary cable to a hard wired permanent signal cable display output.

FIG. 62 illustrates a small pocket sized PDA, Smartphone and/or computer having a laser 2950 or LED and/or other marking to outline a "frame" to outline an input area 2960 is for input such as drawing, typing, point-in-clicking, and gesturing with physics. This can be accompanied by simulated key click sounds or not, with the hands 8 being captured visually and combined with computer video output and then transmitted via a connectable temporary cable 2985 to a hard wired permanent signal cable display output 2990 such as HDMI, VGA, etc.

Figure 63:
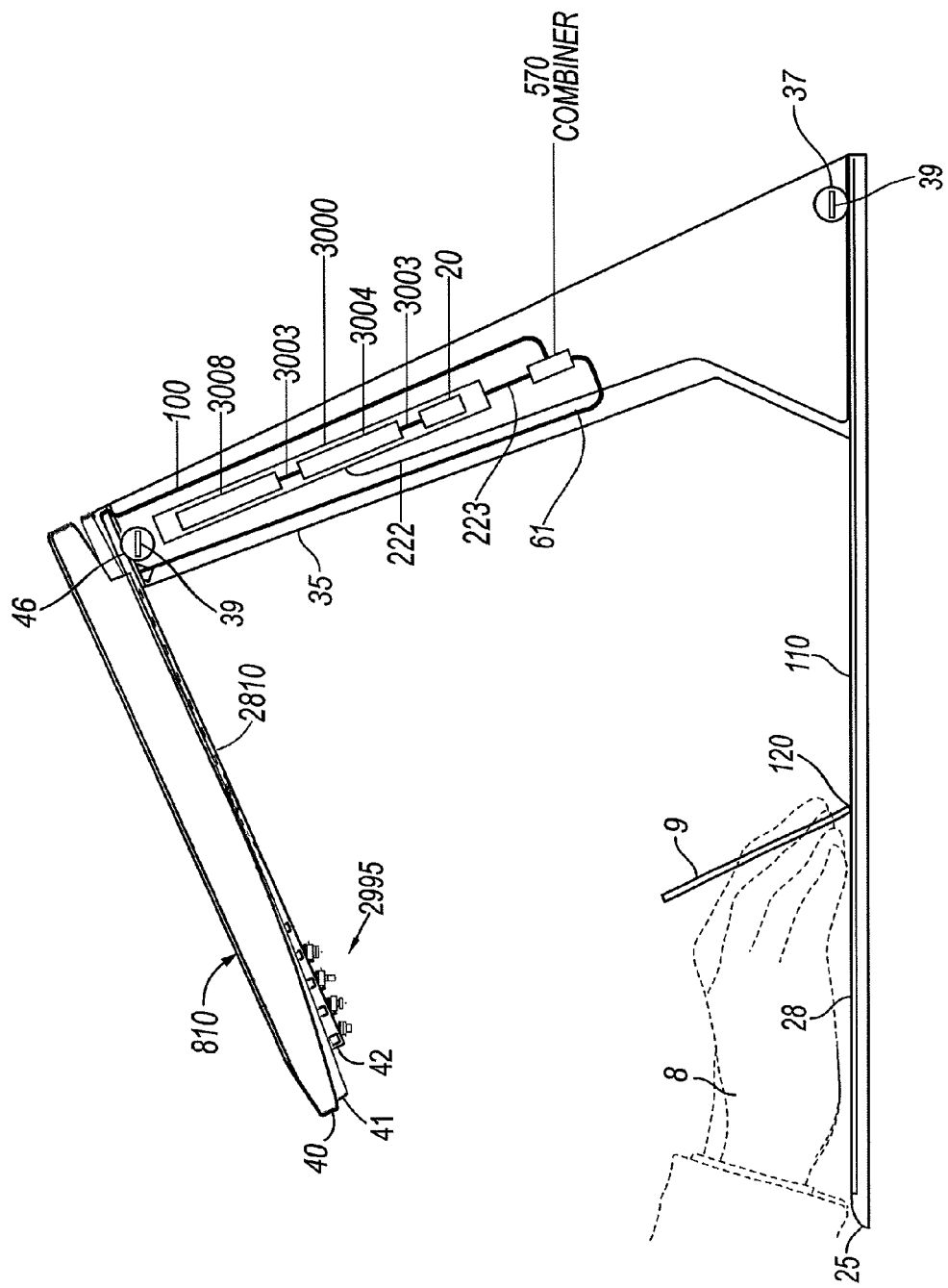
FIG. 63 illustrates an embodiment using only one image capturing device with no image transfer device.

FIG. 63 illustrates an embodiment using only one image capturing device (i.e. camera 2995) with no image transfer device (i.e. no mirror).

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 60. Various embodiments are described in terms of this example-computing module 3000. After reading this description, it will become apparent to a person skilled in the relevant art how to implement the invention using other computing modules or architectures.

Figure 64:
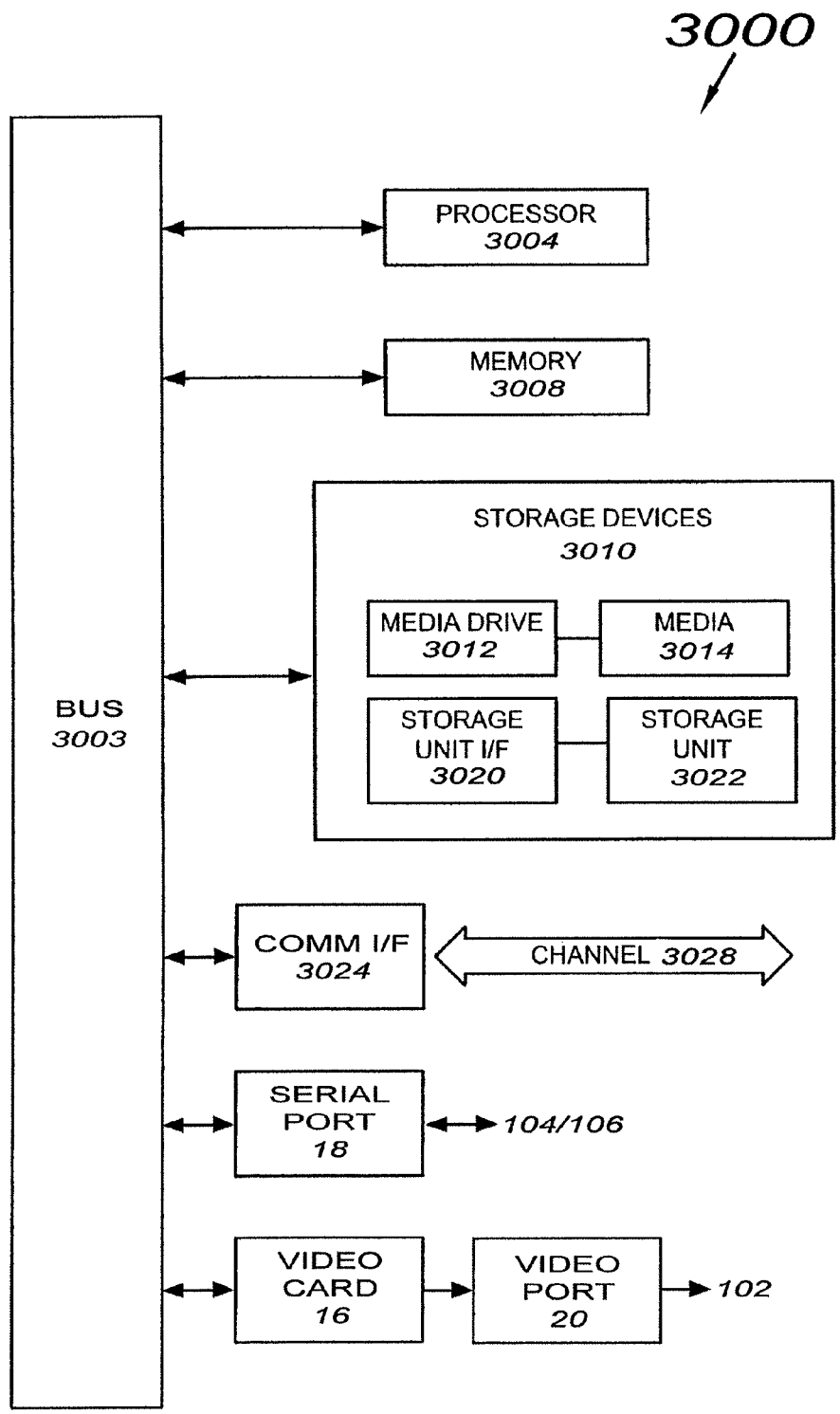
FIG. 64 is a diagram illustrating an example computing module for implementing various embodiments of the invention.

Referring now to FIG. 64, computing module 3000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 3000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 3000 might include, for example, one or more processors, controllers, control modules, or other processing devices, such as a processor 3004. Processor 3004 might be implemented using a general-purpose or special-purpose processing engine such as, for example, a microprocessor, controller, or other control logic. In the illustrated example, processor 3004 is connected to a bus 3002, although any communication medium can be used to facilitate interaction with other components of computing module 3000 or to communicate externally.

Computing module 3000 might also include one or more memory modules, simply referred to herein as main memory 3008. For example, preferably random access memory (RAM) or other dynamic memory, might be used for storing information and instructions to be executed by processor 3004. Main memory 3008 might also be used for storing temporary variables or other intermediate information during execution of instructions to be executed by processor 3004. Computing module 3000 might likewise include a read only memory ("ROM") or other static storage device coupled to bus 3002 for storing static information and instructions for processor 3004.

The computing module 3000 might also include one or more various forms of information storage mechanism 3010, which might include, for example, a media drive 3012 and a storage unit interface 3020. The media drive 3012 might include a drive or other mechanism to support fixed or removable storage media 3014. For example, a hard disk drive, a floppy disk drive, a magnetic tape drive, an optical disk drive, a CD or DVD drive (R or RW), or other removable or fixed media drive might be provided. Accordingly, storage media 3014 might include, for example, a hard disk, a floppy disk, magnetic tape, cartridge, optical disk, a CD or DVD, or other fixed or removable medium that is read by, written to or accessed by media drive 3012. As these examples illustrate, the storage media 3014 can include a computer usable storage medium having stored therein computer software or data.

In alternative embodiments, information storage mechanism 3010 might include other similar instrumentalities for allowing computer programs or other instructions or data to be loaded into computing module 3000. Such instrumentalities might include, for example, a fixed or removable storage unit 3022 and an interface 3020. Examples of such storage units 3022 and interfaces 3020 can include a program cartridge and cartridge interface, a removable memory (for example, a flash memory or other removable memory module) and memory slot, a PCMCIA slot and card, and other fixed or removable storage units 3022 and interfaces 3020 that allow software and data to be transferred from the storage unit 3022 to computing module 3000.

Computing module 3000 might also include a communications interface 3024. Communications interface 3024 might be used to allow software and data to be transferred between computing module 3000 and external devices. Examples of communications interface 3024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 3024 might typically be carried on signals, which can be electronic, electromagnetic (which includes optical) or other signals capable of being exchanged by a given communications interface 3024. These signals might be provided to communications interface 3024 via a channel 3028. This channel 3028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 3008, storage unit 3020, media 3014, and signals on channel 3028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 3000 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An input cueing system for simultaneously viewing in real time the image of a user's hands or fingers positioned over the input device that overlays a virtual input image, the system comprising:
 an electronic device;
 a processing device connected to the electronic device;
 a display connected to the electronic device and positioned in the user's field of view;
 an input device coupled to the electronic device, the input device includes an input area in which the user moves at least one hand or at least one finger that creates an input area signal that is transmitted to the electronic device;
 a software program configured to produces the virtual input image presentational on the display that uses the input area signal from the input device;
 an image capturing device coupled to the electronic device disposed below the direct field of view of the display thereby providing the user an unobstructed view of the display and above the input area that produces a realistic real time image of the user's hand or finger in the input area, the image capturing device includes at least 2 cameras as part of an array, that provide imagery of the input area or not or in combination of the input area and area that is not part of the input area, that is assembled as part of a composite view and, a combiner coupled to the electronic device configured to simultaneously present an overlying image of the user's hands or finger on the display that is aligned and registered over the virtual input image that allows the user to accurately and expediently input information into the electronic device.

2. The system of claim 1, wherein the array is a one dimensional array.

3. The system of claim 1, wherein the array is a two dimensional array.

4. The system of claim 1, wherein the array is a three dimensional array.

* * * * *